US007051146B2

(12) United States Patent
Nguyen et al.

(10) Patent No.: US 7,051,146 B2
(45) Date of Patent: May 23, 2006

(54) DATA PROCESSING SYSTEMS INCLUDING HIGH PERFORMANCE BUSES AND INTERFACES, AND ASSOCIATED COMMUNICATION METHODS

(75) Inventors: Hung T. Nguyen, Plano, TX (US); Shannon A. Wichman, McKinney, TX (US)

(73) Assignee: LSI Logic Corporation, Milpitas, CA (US)

( * ) Notice: Subject to any disclaimer, the term of this patent is extended or adjusted under 35 U.S.C. 154(b) by 296 days.

(21) Appl. No.: 10/603,303

(22) Filed: Jun. 25, 2003

(65) Prior Publication Data

US 2004/0268007 A1    Dec. 30, 2004

(51) Int. Cl.
    *G06F 13/14*    (2006.01)
(52) U.S. Cl. .................... 710/305; 710/110; 710/260
(58) Field of Classification Search ................ 710/110, 710/113, 305, 306, 308, 310, 260, 264, 266
    See application file for complete search history.

(56) References Cited

U.S. PATENT DOCUMENTS

| | | | | |
|---|---|---|---|---|
| 4,942,519 A | * | 7/1990 | Nakayama | ................ 710/110 |
| 5,237,322 A | * | 8/1993 | Heberle | ................ 340/870.13 |
| 5,327,121 A | * | 7/1994 | Antles, II | ............... 340/825.51 |
| 5,469,544 A | * | 11/1995 | Aatresh et al. | ............. 710/110 |
| 5,555,425 A | * | 9/1996 | Zeller et al. | ................ 710/110 |
| 5,699,460 A | | 12/1997 | Kopel et al. | |
| 5,729,703 A | * | 3/1998 | Onn et al. | ................... 710/306 |
| 6,044,453 A | | 3/2000 | Paver | |
| 6,081,860 A | * | 6/2000 | Bridges et al. | ............. 710/110 |
| 6,256,693 B1 | * | 7/2001 | Platko | ........................ 710/105 |
| 6,772,254 B1 | * | 8/2004 | Hofmann et al. | ........... 710/110 |

\* cited by examiner

*Primary Examiner*—Khanh Dang
(74) *Attorney, Agent, or Firm*—Hitt Gaines, P.C.

(57) ABSTRACT

A processor is disclosed that executes an instruction including a user-defined value (an address or a command) and provides the user-defined value during execution of the instruction. In one embodiment the processor includes a bus interface adapted for coupling to a bus, and the processor drives the user-defined address or command upon one or more signal lines of the bus via the bus interface during execution of the instruction. A described data processing system includes the processor coupled to a device including an addressable register. The device receives a user-defined address from the processor and accesses the addressable register in response to the user-defined address. Methods are disclosed for obtaining a value stored in an addressable register, providing a value stored in an addressable register, storing a value in an addressable register, and modifying a value stored in an addressable register.

41 Claims, 31 Drawing Sheets

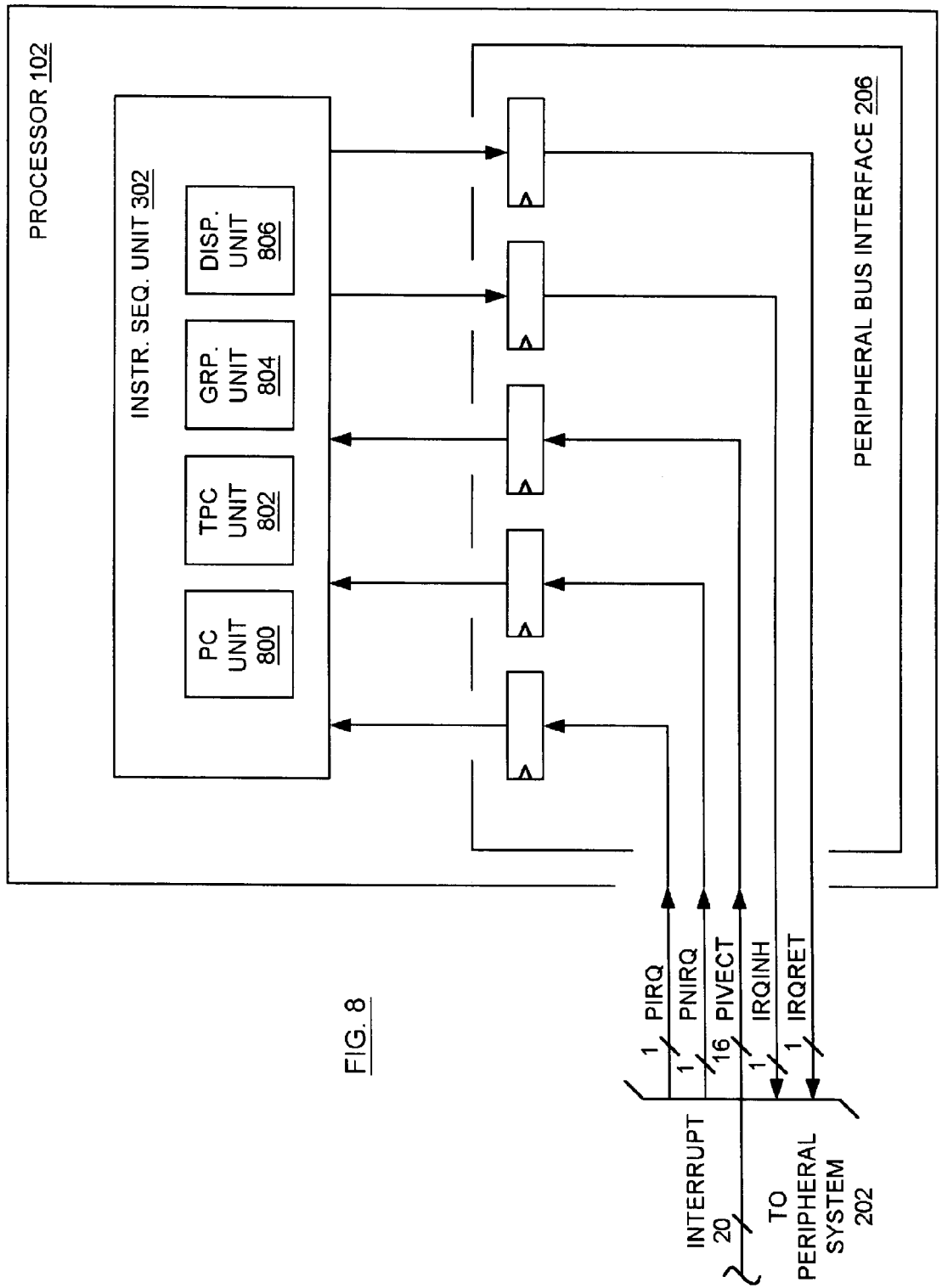

FIG. 27A

| OPCODE FIELD 2702 | SOURCE REG. 1 FIELD 2704 | SOURCE REG. 2 FIELD 2706 | USER COMMAND FIELD 2708 |
|---|---|---|---|
| 31  22 | 21  19 | 18  16 | 15  0 |

| OPCODE FIELD 2710 | SOURCE REGISTER FIELD 2712 | USER COMMAND FIELD 2714 |
|---|---|---|
| 31  22 | 21  16 | 15  0 |

| OPCODE FIELD 2716 | USER COMMAND FIELD 2718 |
|---|---|
| 31  16 | 15  0 |

2408

DATA PROCESSING SYSTEMS INCLUDING HIGH PERFORMANCE BUSES AND INTERFACES, AND ASSOCIATED COMMUNICATION METHODS

FIELD OF THE INVENTION

This invention relates generally to data processing systems and, more particularly, to data processing systems including devices coupled via buses.

BACKGROUND OF THE INVENTION

A typical data processing system includes a processor coupled to one or more devices. The devices may include, for example, peripheral devices. Peripheral devices typically have specific functions, and are often input/output (I/O) devices. For example, a typical personal computer (PC) system includes a processor coupled to a monitor, a mouse, a keyboard, and a printer. The monitor and the printer are output devices, while the mouse and the keyboard are input devices. A compact disk (CD) read-write drive is an example of a peripheral device that is both an input device and an output device.

A coprocessor is a special purpose processing unit that assists a processor in performing certain types of operations, particularly computationally demanding operations. For example, a data processing system may include a processor coupled to a math (numeric) coprocessor, wherein the math coprocessor performs certain mathematical computations, particularly floating-point operations. In addition to math coprocessors, graphics coprocessors for manipulating graphic images are also common.

In known data processing systems including processors coupled to coprocessors, the processor executes instructions from one instruction set (e.g., processor instructions of a processor instruction set), and the coprocessor executes instructions from another instruction set (e.g., coprocessor instructions of a coprocessor instruction set). Due to the special purpose nature of coprocessors, the processor and coprocessor instruction sets typically differ substantially, and are defined by manufacturers of the processor and coprocessor, respectively.

To take advantage of the coprocessor, software programs must be written to include coprocessor instructions of the coprocessor instruction set. When the processor is executing instructions of a software program and encounters a coprocessor instruction, the processor issues the coprocessor instruction to the coprocessor. The coprocessor executes the coprocessor instruction, and typically returns a result to the processor.

A bus is a set of wires, lines or connections used to transfer signals. Buses are commonly used to transfer data between components of electronic systems such as data processing systems. For example, the typical PC system includes a higher speed local bus to accommodate higher speed components (e.g., the monitor) and a lower speed expansion bus for lower speed devices (e.g., the mouse, the keyboard, and the printer).

Many modern processors employ a technique called pipelining to execute more software program instructions (instructions) per unit of time. In general, processor execution of an instruction involves fetching the instruction (e.g., from a memory system), decoding the instruction, obtaining needed operands, using the operands to perform an operation specified by the instruction, and saving a result. In a pipelined processor, the various steps of instruction execution are performed by independent units called pipeline stages. In the pipeline stages, corresponding steps of instruction execution are performed on different instructions independently, and intermediate results are passed to successive stages. By permitting the processor to overlap the executions of multiple instructions, pipelining allows the processor to execute more instructions per unit of time.

In general, a "scalar" processor issues instructions for execution one at a time, and a "superscalar" processor is capable of issuing multiple instructions for execution at the same time. A pipelined scalar processor concurrently executes multiple instructions in different pipeline stages; the executions of the multiple instructions are overlapped as described above. A pipelined superscalar processor, on the other hand, concurrently executes multiple instructions in different pipeline stages, and is also capable of concurrently executing multiple instructions in the same pipeline stage.

As used herein, the term "interrupt request signal," or simply "interrupt signal," refers to a control signal which indicates a high-priority request for service. For example, a peripheral device connected to a processor may assert an interrupt signal when ready to transmit data to the processor, or to receive data from the processor. It is noted that an interrupt signal generated external to a processor may not be synchronized with a clock signal of the processor.

The two general categories of types of interrupt signals are "non-maskable" and "maskable." The typical processor described above also has a non-maskable interrupt (NMI) terminal for receiving an NMI signal, and a maskable interrupt (IRQ) terminal for receiving an IRQ signal. The NMI signal is typically asserted when a catastrophic event has occurred or is about to occur. Examples of non-maskable interrupts include bus parity error, failure of a critical hardware component such as a timer, and imminent loss of electrical power.

In general, maskable interrupts are lower-priority requests for service that need not be tended to immediately. Maskable interrupts may be ignored by the processor under program control. A request for service from a peripheral device which is ready to transmit data to a processor, or receive data from the processor, is an example of a maskable interrupt. An interrupt controller (e.g., a programmable interrupt controller or PIC) connected to the processor typically receives maskable interrupt requests from devices connected to the processor, and prioritizes the interrupt requests.

When a processor receives an interrupt, application program execution stops, the contents of certain critical registers are saved (e.g., the internal state of the processor is saved), and internal control is transferred to an interrupt service routine (e.g., an interrupt handler) which corresponds to the type of interrupt received. In the case of a maskable or non-maskable interrupt, the interrupt controller typically identifies the interrupt to be serviced.

In a vectored interrupt system, the interrupt controller typically provides a number or instruction address assigned to the interrupt to an instruction sequencing module of the processor (e.g., during an interrupt acknowledge operation). A non-maskable interrupt is typically assigned a specific interrupt number. The processor uses the interrupt number as an index into the interrupt vector table to obtain the address of the appropriate interrupt service routine. When the interrupt service routine is completed, the saved contents of the critical registers are restored (e.g., the state of the processor is restored), and the processor resumes application program execution at the point where execution was interrupted.

SUMMARY OF THE INVENTION

A processor is disclosed that executes an instruction including a user-defined value, wherein the user-defined value is either an address or a command, and provides the user-defined value during execution of the instruction. In one embodiment the processor includes a bus interface adapted for coupling to a bus having multiple signal lines. The processor drives the user-defined address or command upon one or more signal lines of the bus via the bus interface during execution of the instruction.

A data processing system is described including the above described processor coupled to a device including an addressable register. The device receives the user-defined address from the processor and accesses the addressable register in response to the user-defined address.

A method is disclosed for obtaining a value stored in an addressable register. The method involves driving an address of the addressable register on multiple address signal lines of a bus, and an asserted read control signal on a read control signal line of the bus, during a first stage of an instruction execution pipeline. The value is received via multiple data signal lines of the bus when a corresponding ready signal driven on a ready signal line of the bus is asserted during a second stage of the instruction execution pipeline subsequent to the first stage.

A method is described for providing a value stored in an addressable register. The method involves receiving an address driven on multiple address signal lines of a bus when a read control signal driven on a read control signal line of the bus is asserted during a first stage of an instruction execution pipeline. If the address is an address of the addressable register, the contents of the addressable register are driven on multiple data signal lines of the bus, and an asserted ready signal on a ready signal line of the bus, during a second stage of the instruction execution pipeline subsequent to the first stage.

A method is disclosed for storing a value in an addressable register. The method: involves driving an address of the addressable register on multiple address signal lines of a bus, and an asserted write control signal on a write control signal line of the bus, during a first stage of an instruction execution pipeline. The value to be stored in the addressable register is driven on multiple data signal lines of the bus, and an asserted ready signal on a ready signal line of the bus, during a second stage of the instruction execution pipeline subsequent to the first stage.

Another method is described for storing a value in an addressable register. The method involves receiving an address driven on multiple address signal lines of a bus when a write control signal driven on a write control signal line of the bus is asserted during a first stage of an instruction execution pipeline. If the address is an address of the addressable register, the value is received via multiple data signal lines of the bus when a corresponding ready signal driven on a ready signal line of the peripheral bus is asserted during a second stage of the instruction execution pipeline subsequent to the first stage. The value is stored in the addressable register.

A method is disclosed for modifying a value stored in an addressable register. The method involves driving an address of the addressable register on multiple address signal lines of a bus, an asserted read control signal on a read control signal line of the bus, and an asserted write control signal on a write control signal line of the bus during a first stage of an instruction execution pipeline. The value is received via a first set of data signal lines of the bus when a corresponding ready signal driven on a ready signal line of the bus is asserted during a second stage of the instruction execution pipeline subsequent to the first stage. The value is modified during a third stage of the instruction execution pipeline subsequent to the second stage. The modified value is driven on a second set of data signal lines of the bus, and an asserted ready signal on a ready signal line of the bus, during a fourth stage of the instruction execution pipeline subsequent to the third stage.

BRIEF DESCRIPTION OF THE DRAWINGS

The invention may be understood by reference to the following description taken in conjunction with the accompanying drawings, in which like reference numerals identify similar elements, and in which:

FIG. 8 is a diagram illustrating component signals of the INTERRUPT signal of FIG. 2 and logic of one embodiment of the instruction sequencing unit of FIG. 3;

FIGS. 26A–27C illustrate exemplary embodiments of the coprocessor instruction of FIG. 24;

DETAILED DESCRIPTION OF THE PREFERRED EMBODIMENTS

In the following disclosure, numerous specific details are set forth to provide a thorough understanding of the present invention. However, those skilled in the art will appreciate that the present invention may be practiced without such specific details. In other instances, well-known elements have been illustrated in schematic or block diagram form in order not to obscure the present invention in unnecessary detail. Additionally, for the most part, details concerning network communications, electromagnetic signaling techniques, and the like, have been omitted inasmuch as such details are not considered necessary to obtain a complete understanding of the present invention, and are considered to be within the understanding of persons of ordinary skill in the relevant art. It is further noted that all functions described herein may be performed in either hardware or software, or a combination thereof, unless indicated otherwise. Certain terms are used throughout the following description and claims to refer to particular system components. As one skilled in the art will appreciate, components may be referred to by different names. This document does not intend to distinguish between components that differ in name, but not function. In the following discussion and in the claims, the terms "including" and "comprising" are used in an open-ended fashion, and thus should be interpreted to mean "including, but not limited to . . . ". Also, the term "couple" or "couples" is intended to mean either an indirect or direct electrical or communicative connection. Thus, if a first device couples to a second device, that connection may be through a direct connection, or through an indirect connection via other devices and connections.

Figure 1:
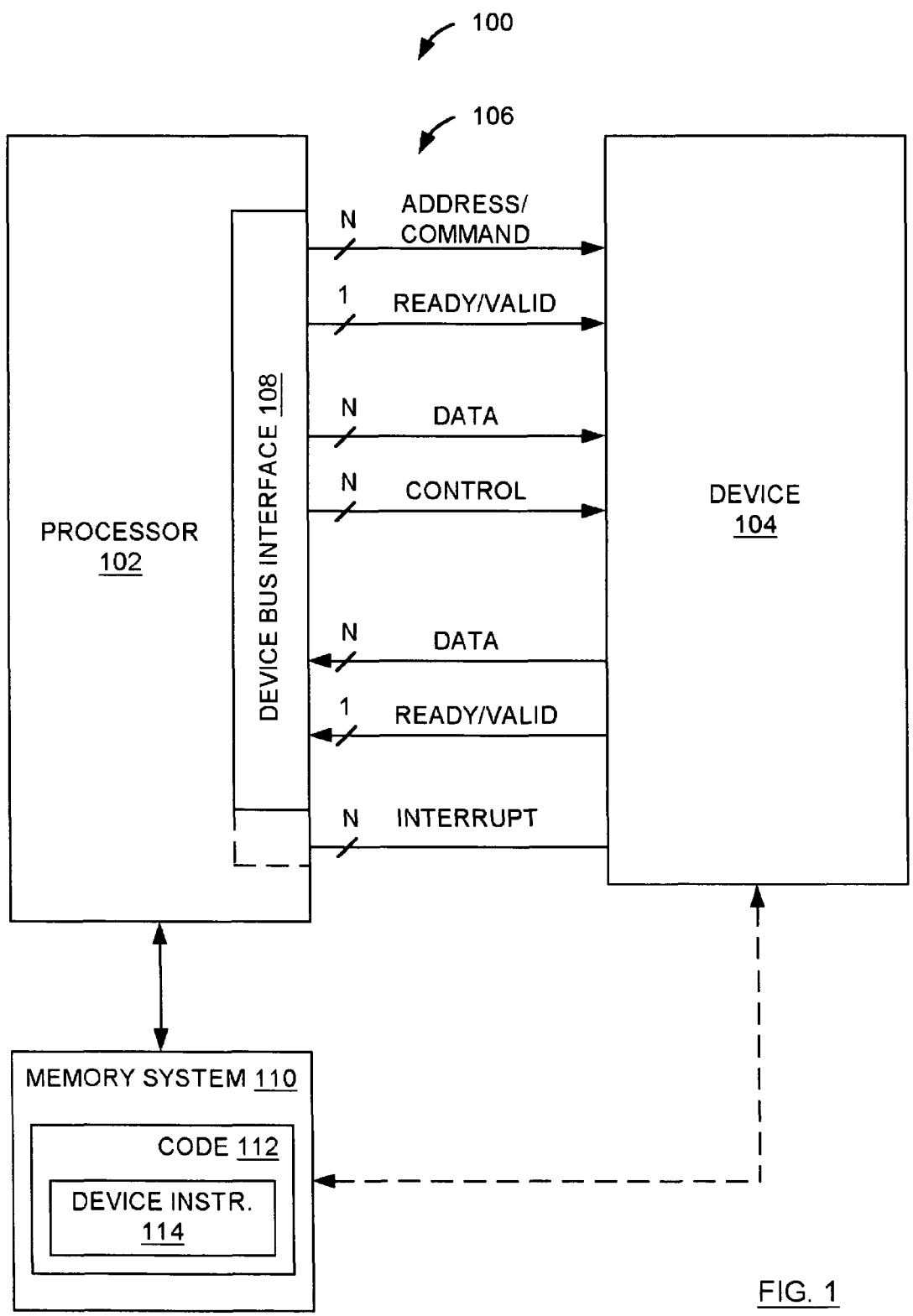
FIG. 1 is a diagram of one embodiment of a data processing system including a processor coupled to a device via a device bus, and to a memory system.

FIG. 1 is a diagram of one embodiment of a data processing system. 100 including a processor 102 coupled to, and in communication with, a device 104 via a device bus 106. The device bus 106 includes multiple signal lines for conveying signals between the processor 102 and the device 104. In general, the processor 102 and the device 104 cooperate to achieve a desired result. Embodiments of the processor 102 and the device 104 are described below. The device 104 may be, for example, a peripheral system including one or more peripheral devices. Alternately, the device 104 may be a coprocessor that extends or augments a computational capability of the processor 102.

In the embodiment of FIG. 1, the processor 102 includes a device bus interface 108 adapted for coupling to the signal lines of the device bus 106. In the embodiment of FIG. 1, the signal signals conveyed between the processor 102 and the device 104 via the device bus 106 include an n-bit "ADDRESS/COMMAND" signal (n>1), a first 1-bit "READY/VALID" signal, a first n-bit "DATA" signal, n "CONTROL" signals, a second n-bit "DATA" signal, a second 1-bit "READY/VALID" signal, and an m-bit "INTERRUPT" signal (m>1).

In general, the n-bit ADDRESS/COMMAND signal is used to convey an n-bit address or an n-bit command from the processor 102 to the device 104. In some embodiments, the n-bit ADDRESS/COMMAND signal is used to convey an n-bit address from the processor 102 to the device 104. As described below, the n-bit address may be, for example, an address of an addressable register of the device 104. In general, an "addressable" register has a corresponding value known as an address and is accessed via the address. In general, a hardware address includes multiple ordered bits. Addresses of addressable registers may be assigned by a user.

In other embodiments, the n-bit ADDRESS/COMMAND signal is used to convey an n-bit, user-defined command from the processor 102 to the device 104. In general, the user-defined command includes multiple ordered bits, wherein the values of the bits are assigned by a user. The device 104 may be configured to interpret the user-defined command specified by the n-bit COMMAND signal, and to perform a corresponding function.

In some embodiments, the first READY/VALID signal corresponds to the n-bit ADDRESS/COMMAND signal, and indicates whether the n-bit ADDRESS/COMMAND signal is valid. In other embodiments, the first READY/VALID signal corresponds to the first n-bit DATA signal, and indicates whether the n-bit DATA signal is valid.

The first n-bit DATA signal is used to convey n bits of data from the processor 102 to the device 104, and the second n-bit DATA signal is used to convey n bits of data from the device. 104 to the processor 102. Such unidirectional signals simplify the device bus interface 108.

For example, when the first READY/VALID signal corresponds to the first n-bit DATA signal and the first READY/VALID signal and a write control signal are asserted, the peripheral system 202 may respond by writing data conveyed by the first n-bit DATA signal to an addressable register of the peripheral system 202 having the address specified by the n-bit ADDRESS/COMMAND signal.

Alternately, in response to a valid n-bit ADDRESS/COMMAND signal conveying an n-bit user-defined command, the device 104 may perform a function on data conveyed by the first n-bit DATA signal, thereby producing a result. The device 104 may convey the result to the processor 102 via the second n-bit DATA signal.

The second READY/VALID signal corresponds to the second n-bit DATA signal, and indicates whether the second n-bit DATA signal is valid. In general, the m-bit INTERRUPT signal conveys interrupt request information. As indicated in FIG. 1, the device interface bus 108 may or may not receive the m-bit INTERRUPT signal from the device 104 via the device bus 106. As described below, in some embodiments of the data processing system 100, an interrupt control unit may reside in the device 104. In this situation, m may be greater than 1, and the device interface bus 108 may receive the multiple INTERRUPT signals from the device 104. In other embodiments of the data processing system 100, the interrupt control unit may reside in the processor 102, the device 104 may assert a single INTERRUPT signal when the device 104 needs service (e.g., when the device 104 needs to communicate with the processor 102), and the device interface bus 108 may not receive the single INTERRUPT signal from the device 104.

In the embodiment of FIG. 1, the device bus interface 108 of the processor 102 drives the n-bit ADDRESS/COMMAND signal, the first READY/VALID signal, the first n-bit DATA signal, and the n CONTROL signals on corresponding signal lines of the device bus 106, and receives the second n-bit DATA signal and the second READY/VALID signal via corresponding signal lines of the device bus 106. The device 104 receives the n-bit ADDRESS/COMMAND signal, the first READY/VALID signal, the first n-bit DATA signal, and the n CONTROL signals via the corresponding signal lines of the device bus 106, and drives the second n-bit DATA signal and the second READY/VALID signal on the corresponding signal lines of the device bus 106.

In the embodiment of FIG. 1, the processor 102 is coupled to a memory system 110. In general, the processor 102 fetches and executes instructions of a predefined instruction set stored in the memory system 110. As illustrated in FIG. 1, the memory system 110 includes a software program (i.e., code) 112 including instructions from the instruction set. The code 112 includes a device instruction 114 of the instruction set. In general, execution of the device instruction 114 by the processor 102 causes the processor 102 to communicate with (i.e., send data to and/or receive data from) the device 104.

For example, as described below, the device instruction 114 may include address information. During execution of the device instruction 114, the processor 102 may read data from and/or write data to an addressable register of the device 104 specified by the address information. Alternately, the device instruction 114 may include a user-defined command. During execution of the device instruction 114, the processor 102 may provide the user-defined command to the device 104. In response to the user-defined command, the device 104 may perform a predetermined function.

As indicated in FIG. 1, the device 104 may be coupled to the memory system 110, and may access the memory system 110 directly (e.g., in "loosely coupled" embodiments of the data processing system 100). Alternately, the device 104 may not be coupled to the memory system 110, and may depend on the processor 102 to access the memory system 110 and to provide data from the memory system 110 to the device 104 (e.g., in "tightly coupled" embodiments of the data processing system 100).

Figure 2:
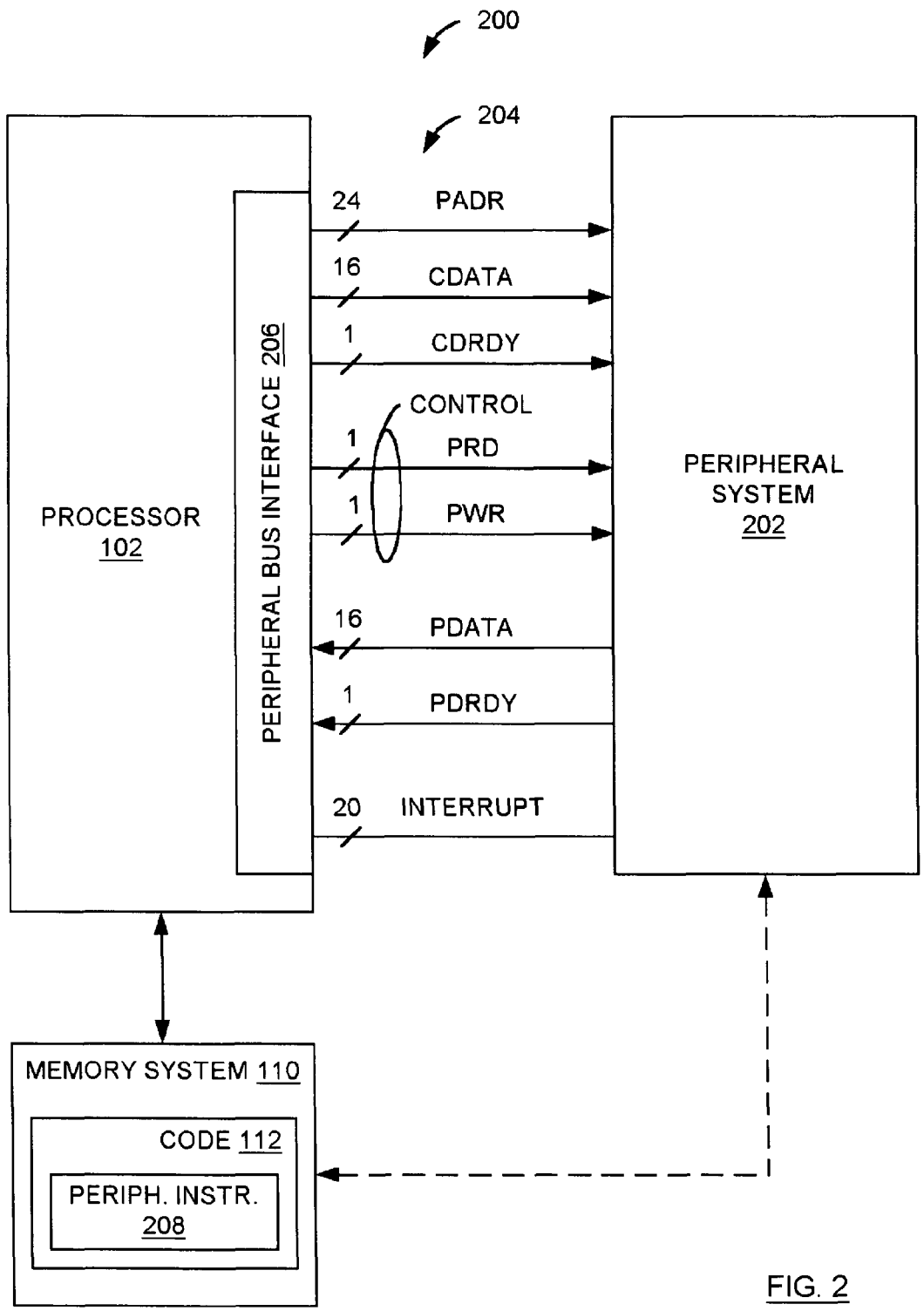
FIG. 2 is a diagram of one embodiment of data processing system of FIG. 1 wherein the processor is coupled to a peripheral system via a peripheral bus, and wherein the memory system stores a peripheral instruction, and wherein the processor includes a peripheral bus interface adapted for coupling to signal lines of the peripheral bus, and wherein the peripheral bus conveys an INTERRUPT signal.

FIG. 2 is a diagram of one embodiment of a data processing system 200, wherein the data processing system 200 is one embodiment of the data processing system 100 of FIG. 1. In the data processing system 200, the processor 102 is coupled to, and in communication with, a peripheral system 202 via a peripheral bus 204. In general, the processor 102 and the peripheral system 202 cooperate to achieve a desired result, and the peripheral system 202 includes one or more peripheral devices. Embodiments of the processor 102 and the peripheral system 202 are described below.

In the embodiment of FIG. 2, the processor 102 includes a peripheral bus interface 206 adapted for coupling to signal lines of the peripheral bus 204. In the embodiment of FIG. 2, signal lines of the peripheral bus 204 are used to convey several signals between the processor 102 and the peripheral system 202, including an 24-bit address signal "PADR,", a 16-bit data signal "CDATA," a 1-bit ready signal "CDRDY," a 1-bit read control signal "PRD," a 1-bit write control signal "PWR," a 16-bit data signal "PDATA," a 1-bit ready signal "PDRDY," and a 20-bit interrupt signal "INTERRUPT."

In the embodiment of FIG. 2, the PADR signal is used to convey an 24-bit address from the processor 102 to the peripheral system 202. The 24-bit address may be, for example, the address of an addressable register of the peripheral system 202 as described below. The 16-bit CDATA signal is used to convey 16 bits of data from the processor 102 to the peripheral system 202. The CDRDY signal corresponds to the CDATA signal, and indicates whether the CDATA signal is valid.

The read control signal PRD is asserted when the peripheral system 202 is to perform a read operation, and the write control signal PWR is asserted when the peripheral system 202 is to perform a write operation. The 16-bit PDATA signal is used to convey 16 bits of data from the peripheral system 202 to the processor 102. Again, uni-directional signals simplify the peripheral bus interface 206. The ready signal PDRDY corresponds to the PDATA signal, and indicates whether the PDATA signal is valid.

For example, when the write control signal PWR and the ready signal CDRDY are asserted, the peripheral system 202 may respond by writing data conveyed by the CDATA signal to an addressable register of the peripheral system 202 having the address specified by the PADR signal.

In general, the 20-bit INTERRUPT signal conveys interrupt information. In the embodiment of FIG. 2, an interrupt control unit resides in the peripheral system 202, and the device interface bus 108 receives the 20-bit INTERRUPT signal from the peripheral system 202 via the peripheral bus 204. The component signals making up the 20-bit INTERRUPT signal are described below.

In the embodiment of FIG. 2, the peripheral bus interface 206 of the processor 102 drives the PADR signal, the CDATA signal, the CDRDY signal, the PRD and PWR control signals, and a portion of the component signals making up the INTERRUPT signal on corresponding signal lines of the peripheral bus 204, and receives the PDATA signal, the PDRDY signal, and a remainder of the component signals making up the INTERRUPT signal via corresponding signal lines of the peripheral bus 204. The peripheral system 202 receives the PADR signal, the CDATA signal, the CDRDY signal; the PRD and PWR control signals, and the portion of the component signals making up the INTERRUPT signal via the corresponding signal lines of the peripheral bus 204, and drives the PDATA signal, the PDRDY signal, and the remainder of the component signals making up the INTERRUPT signal on the corresponding signal lines of the peripheral bus 204.

In the embodiment of FIG. 2, the code 112 stored within the memory system 110 includes a peripheral instruction 208 of the instruction set. In general, execution of the peripheral instruction 208 by the processor 102 causes the processor 102 to communicate with (i.e., send data to and/or receive data from) the peripheral system 202.

For example, the peripheral instruction 208 may include address information. During execution of the peripheral instruction 206, the processor 102 may read data from or write data to an addressable register of the peripheral system 202 specified by the address information.

As indicated in FIG. 2, the peripheral system 202 may be coupled to the memory system 110, and may access the memory system 110 directly (e.g., in loosely coupled embodiments of the data processing system 200). Alternately, the peripheral system 202 may not be coupled to the memory system 110, and may depend on the processor 102 to access the memory system 110 and to provide data from the memory system 110 to the peripheral system 202 (e.g., in tightly coupled embodiments of the data processing system 200).

Figure 3:
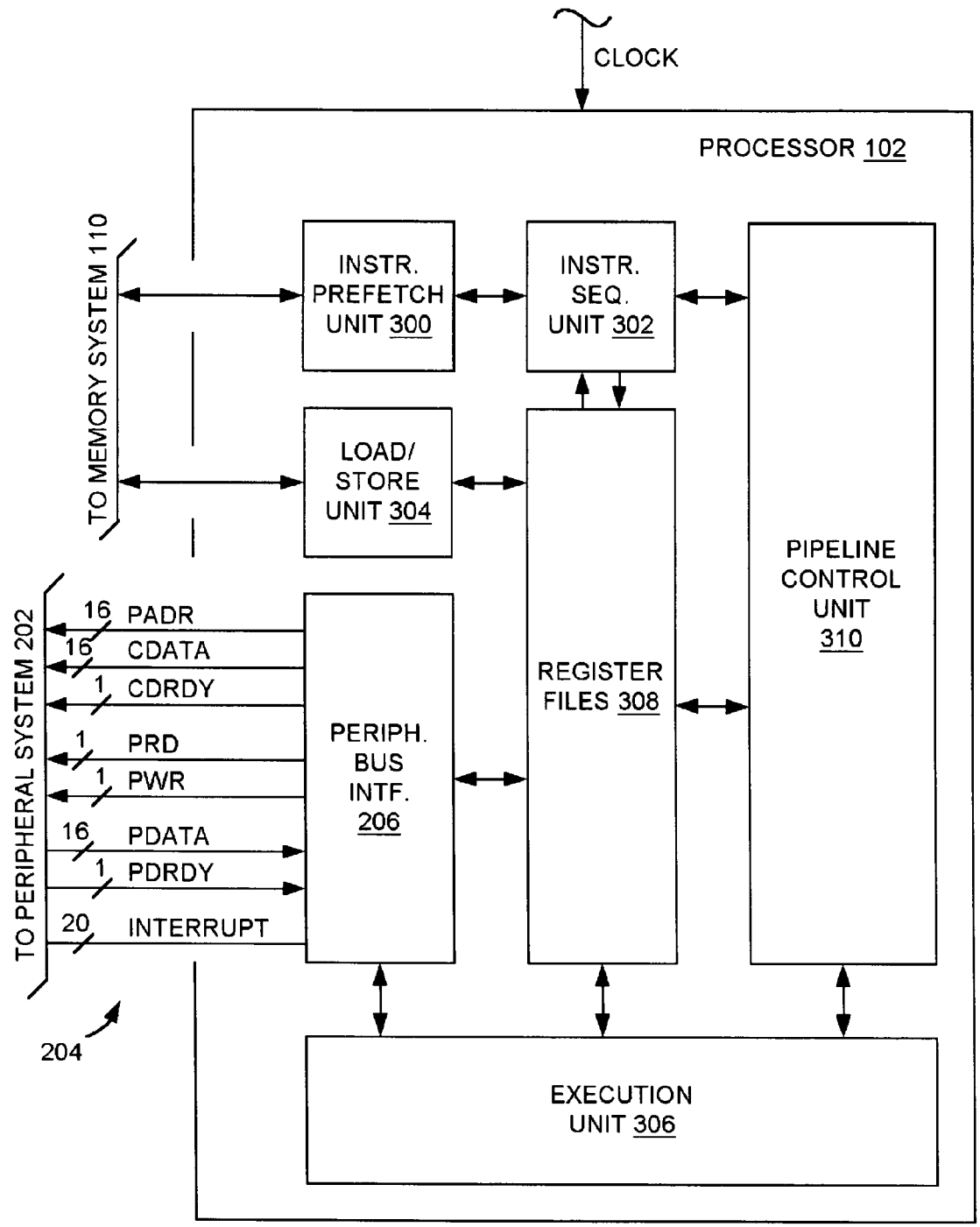
FIG. 3 is a diagram of one embodiment of the processor of FIG. 2, wherein the processor includes an instruction sequencing unit and a load/store unit.

FIG. 3 is a diagram of one embodiment of the processor 102 of FIG. 2. As indicated in FIG. 3, the processor 102 receives a clock signal "CLOCK" and executes instructions dependent upon the CLOCK signal. More specifically, the processor 102 includes several functional units described below, and operations performed within the functional units are synchronized by the CLOCK signal.

In the embodiment of FIG. 3, in addition to the peripheral bus interface 206 of FIG. 2, the processor 102 includes an instruction prefetch unit 300, an instruction sequencing unit 302, a load/store unit (LSU) 304, an execution unit 306, register files 308, and a pipeline control unit 310. The instruction prefetch unit 300, the instruction sequencing unit 302, the load/store unit (LSU) 304, the execution unit 306, the register files 308, and the pipeline control unit 310 may be considered functional units of the processor 102, and may contain other functional units.

In the embodiment of FIG. 3, the processor 102 is a pipelined superscalar processor core. That is, the processor 102 implements an instruction execution pipeline including multiple pipeline stages, concurrently executes multiple instructions in different pipeline stages, and is also capable of concurrently executing multiple instructions in the same pipeline stage.

In general, the instruction prefetch unit 300 fetches instructions from the memory system 110 of FIG. 1, and provides the fetched instructions to the instruction sequencing unit 302. In one embodiment, the instruction prefetch unit 300 is capable of fetching up to 8 instructions at a time from the memory system 110, partially decodes and aligns the instructions, and stores the partially decoded and aligned instructions in an instruction cache within the instruction prefetch unit 300.

The instruction sequencing unit 302 receives (or retrieves) partially decoded instructions from the instruction cache of the instruction prefetch unit 300, fully decodes the instructions, and stores the fully decoded instructions in an instruction queue. In one embodiment, the instruction sequencing unit 302 is capable of receiving (or retrieving) multiple partially decoded instructions from the instruction cache of the instruction prefetch unit 300, and decoding the multiple partially decoded instructions, during a single cycle of the CLOCK signal.

In one embodiment, the instruction sequencing unit 302 translates instruction operation codes (i.e., opcodes) into native opcodes for the processor. The instruction sequencing unit 302 checks the multiple decoded instructions using grouping and dependency rules, and provides (i.e., issues) one or more of the decoded instructions conforming to the grouping and dependency rules as a group to the to the load/store unit (LSU) 304 and/or the execution unit 306 for simultaneous execution.

The load/store unit (LSU) 304 is used to transfer data between the processor 102 and the memory system 110. In one embodiment, the load/store unit (LSU) 304 includes 2 independent load/store units. Each of the 2 independent load/store units accesses the memory system 110 via separate load/store buses, and includes a separate address generation unit (AGU) for generating and translating address signals needed to access values stored in the memory system 110.

The execution unit 306 is used to perform operations specified by instructions (and corresponding decoded instructions). In one embodiment, the execution unit 306 includes 2 independent arithmetic logic units (ALUs), and 2 independent multiply/accumulate units (MAUs).

In general, the register files 308 include one or more register files of the processor 102. In one embodiment, the register files 308 includes an address register file and a general purpose register file. The address register,file includes 8 32-bit address registers, and the general purpose register file includes 16 16-bit general purpose registers. The 16 16-bit registers of the general purpose register file can be paired to form 8 32-bit general purpose registers. The registers of the register files 308 may, for example, be accessed via read/write enable signals from the pipeline control unit 310.

In general, the pipeline control unit 310 controls an instruction execution pipeline implemented within the processor 102 and described in more detail below.

Figure 4:
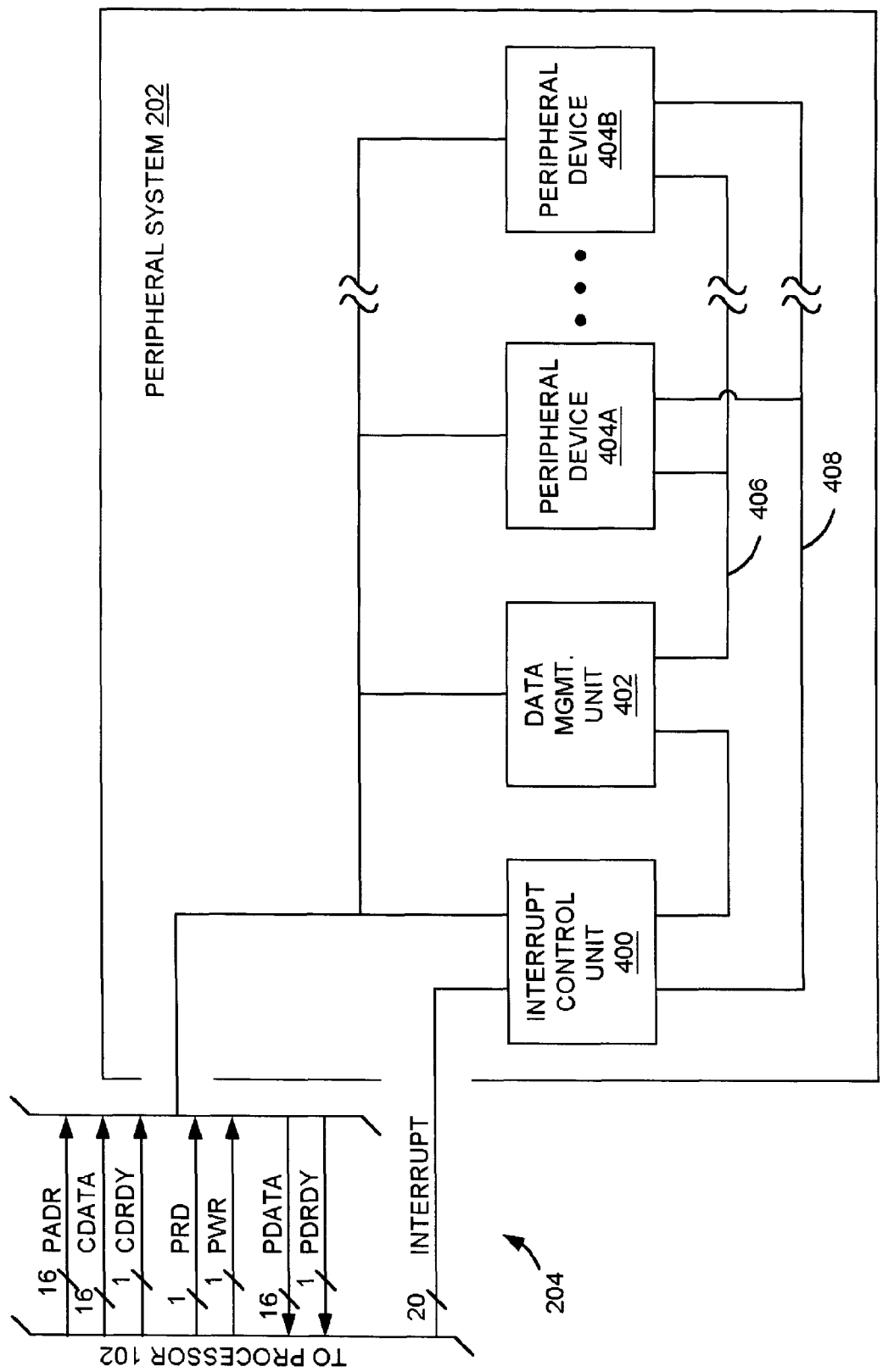
FIG. 4 is a diagram of one embodiment of the peripheral system of FIG. 2, wherein the peripheral system includes multiple peripheral devices.

FIG. 4 is a diagram of one embodiment of the peripheral system 202 of FIG. 2. In the embodiment of FIG. 4, the peripheral system 202 includes an interrupt control unit 400, a data management unit 402, and multiple peripheral devices represented by peripheral devices 404A and 404B. The peripheral device 404A may be, for example, a timer, a serial port, or a parallel port. Similarly, the peripheral device 404B may be, for example, a timer; a serial port, or a parallel port. Herein below, the multiple peripheral devices represented by peripheral-devices 404A and 404B, will be referred to collectively as the peripheral devices 404.

As indicated in FIG. 4, the PADR signal, the CDATA signal, the CDRDY signal, the PRD and PWR control signals driven on the peripheral bus 204 by the peripheral bus interface 206 of the processor 102 are received by the interrupt control unit 400, the data management unit 402, and the peripheral devices 404. The interrupt control unit 400, the data management unit 402, and the peripheral devices 404 respond to the PADR signal, the CDATA signal, the CDRDY signal, the PRD and PWR control signals independently.

The data management unit 402 is coupled to each of the peripheral devices 404 via a peripheral read data bus 406, and receives read data from the peripheral devices 404 via a peripheral read data bus 406. The data management unit 402 is also coupled to the interrupt control unit 400 and receives read data from the interrupt control unit 400. The data management unit 402 uses the received read data to generate the PDATA and PDRDY signals, and drives the PDATA and PDRDY signals on the corresponding signal lines of the peripheral bus 204.

The interrupt control unit 400 is coupled to each of the peripheral devices 404 via a peripheral interrupt bus 408, and receives interrupt signals from the peripheral devices 404 via a peripheral interrupt bus 406. The interrupt control unit 400 is also coupled to the data management unit 402, and receives an interrupt signal from the data management unit 402. The interrupt control unit 400 also receives component signals making up the INTERRUPT signal from the, processor 102 via the peripheral bus 204. The component signals making up the INTERRUPT signal are described below. In general, and as described below, the interrupt control unit 400 uses the received interrupt signals and the component signals making up the INTERRUPT signal received from the processor 102 to generate a portion of the component signals making up the INTERRUPT signal, and drives the portion of the component signals making up the INTERRUPT signal on corresponding signal lines of the peripheral bus 204.

More specifically, the interrupt control unit 400 helps to implement a vectored priority interrupt system in the data processing system 200 of FIG. 2 in which higher priority interrupts are handled (i.e., serviced) first. A non-maskable interrupt (NMI) signal has the highest priority of all the interrupt signals. In one embodiment, the interrupt control unit 400 includes a 16-bit interrupt request register having bit locations corresponding to 2 non-maskable interrupt signals and 14 maskable interrupt bit locations. The 2 non-maskable interrupt signals include the, NMI signal and a device emulation interrupt (DEI) signal. When an interrupt signal is received, the corresponding bit location in the interrupt request register is set to '1'. Each bit location in the interrupt request register is cleared only when the processor 102 services the corresponding interrupt signal, or explicitly by software.

In one embodiment, the interrupt control unit 400 also includes an interrupt mask register containing mask bit locations for each of the 14 maskable interrupts. A mask bit value of '0' (i.e., a cleared bit) prevents the corresponding interrupt from being serviced (i.e., masks the corresponding interrupt signal). The INTERRUPT signal may be one of the 14 maskable interrupt signals.

In one embodiment, the interrupt control unit 400 also includes two 16-bit interrupt priority registers. Consecutive bit locations in each of the interrupt priority registers are used to store user-defined priority levels associated with the 14 maskable interrupt signals. Software programs may write to the bit locations of the interrupt priority registers. User-defined interrupt priorities may range from 0b00 (i.e., decimal '0') to 0b11 (i.e., decimal '3'), with 0b00 being the lowest and 0b11 being the highest. (The NMI signal has a fixed priority level of decimal '5', and the DEI signal has a fixed priority level of decimal '4'.)

Once the interrupt control unit 400 decides to service an interrupt, the interrupt control unit 400 generates component signals of the INTERRUPT signal, and drives the component signals of the INTERRUPT signal on corresponding signal lines of the peripheral bus 204. As described below, the component signals of the INTERRUPT signal are received by the instruction, sequencing unit 302 of the processor 102 of FIG. 2. In response to the component signals of the INTERRUPT signal received from the interrupt control unit 400, the instruction sequencing unit 302 stops grouping and issuing instructions in an interrupted program, and instructions of an interrupt service routine are fetched and executed.

In the embodiment of FIG. 4 each of the peripheral devices 404 includes at least one addressable register. As described above, an addressable register has a corresponding value known as an address and is accessed via the address. Common types of addressable registers include control registers, status registers, and data registers.

Figure 5:
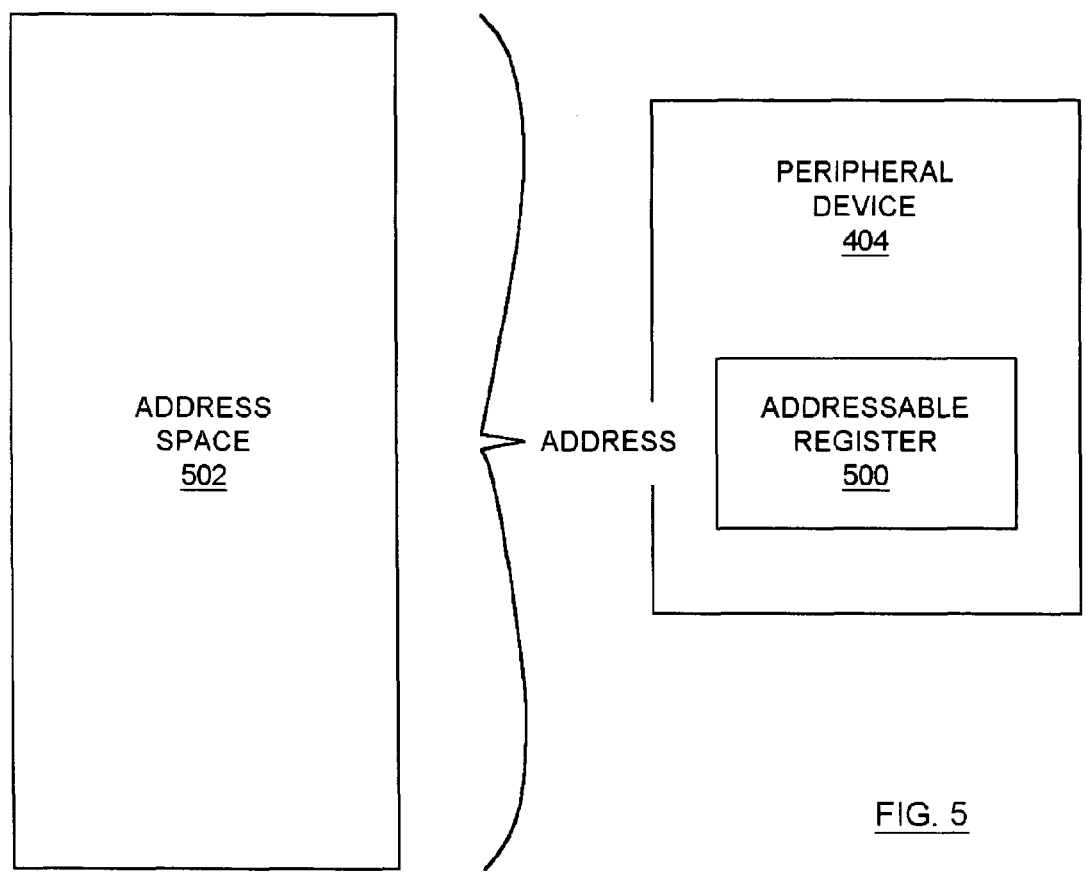
FIG. 5 is a diagram illustrating a representative one of the peripheral devices of FIG. 4, wherein the representative peripheral device includes an addressable register having an address within an address space of the processor of FIGS. 2 and 3.

FIG. 5 is a diagram illustrating a representative one of the peripheral devices 404 of FIG. 4. As indicated in FIG. 5, the representative peripheral device 404 includes an addressable register 500. An address of the addressable register 500 resides in an address space.502 of the processor 102 of FIGS. 2 and 3. In general, the address space of a processor is defined by a number of bits in address signals. For example, in the embodiments of FIGS. 2 and 3, the address signal PADR is a 24-bit signal. Accordingly, in the embodiment of FIG. 2, the address space 500 of the processor 102 includes $2^{24}$ (16,777,216) different values (i.e., addresses) ranging from 0 to $2^{24}-1$ (16,777,215).

Figure 6:
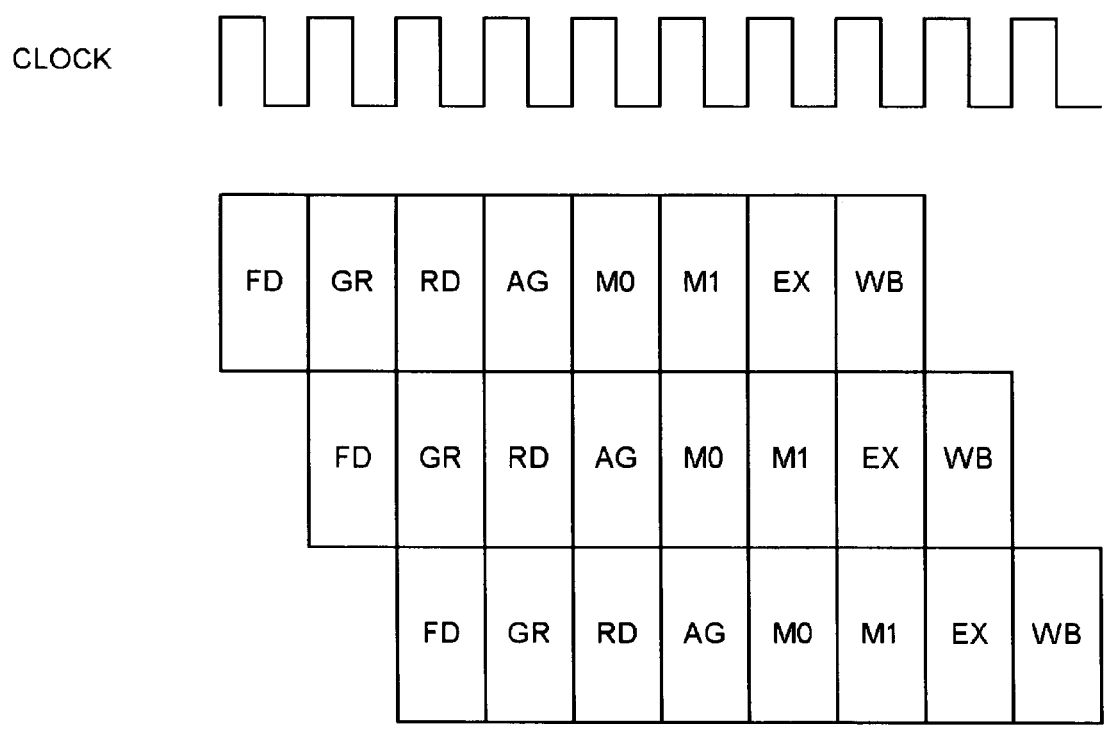
FIG. 6 is a diagram illustrating one embodiment of an instruction execution pipeline implemented within the processor of FIGS. 2 and 3.

FIG. 6 is a diagram illustrating one embodiment of the instruction execution pipeline implemented within the processor 102 of FIGS. 2 and 3 and controlled by the pipeline control unit 310 of FIG. 3. The instruction execution pipeline (pipeline) allows overlapped execution of multiple instructions. In the embodiment of FIG. 6, the pipeline includes 8 stages: a fetch/decode (FD) stage, a grouping (GR) stage, an operand read (RD) stage, an address generation (AG) stage, a memory access 0 (M0) stage, a memory access 1 (M1) stage, an execution (EX) stage, and a write back (WB) stage. As indicated in FIG. 6, operations in each of the 8 pipeline stages are completed during a single cycle of the CLOCK signal.

Referring to FIGS. 2 and 3, the instruction fetch unit 300 fetches several instructions (e.g., up to 8 instructions) from the memory system 110 during the fetch/decode (FD) pipeline stage, partially decodes and aligns the instructions, and provides the partially decoded instructions to the instruction sequencing unit 302. The instruction sequencing unit 302 fully decodes the instructions and stores the fully decoded instructions in an instruction queue (described more fully later). The instruction sequencing unit 302 also translates the opcodes into native opcodes for the processor.

During the grouping (GR) stage, the instruction sequencing unit 302 checks the multiple decoded instructions using grouping and dependency rules, and passes one or more of the decoded instructions conforming to the grouping and dependency rules on to the read operand (RD) stage as a group. During the read operand (RD) stage, any operand values, and/or values needed for operand address generation, for the group of decoded instructions are obtained from the register files 308.

During the address generation (AG) stage, any values needed for operand address generation are provided to the load/store unit (LSU) 304, and the load/store unit (LSU) 304 generates internal addresses of any operands located in the memory system 110. During the memory address 0 (M0) stage, the load/store unit (LSU) 304 translates the internal addresses to external memory addresses used within the memory system 110.

During the memory address 1 (M1) stage, the load/store unit (LSU) 304 uses the external memory addresses to obtain any operands located in the memory system 110. During the execution (EX) stage, the execution unit 306 uses the operands to perform operations specified by the one or more instructions of the group. During a final portion of the execution (EX) stage, valid results (including qualified results of any conditionally executed instructions) are stored in registers of the register files 308.

During the write back (WB) stage, valid results (including qualified results of any conditionally executed instructions) of store instructions, used to store data in the memory system 110 as described above, are provided to the load/store unit (LSU) 304. Such store instructions are typically used to copy values stored in registers of the register files 308 to memory locations of the memory system 110.

Figure 7A:
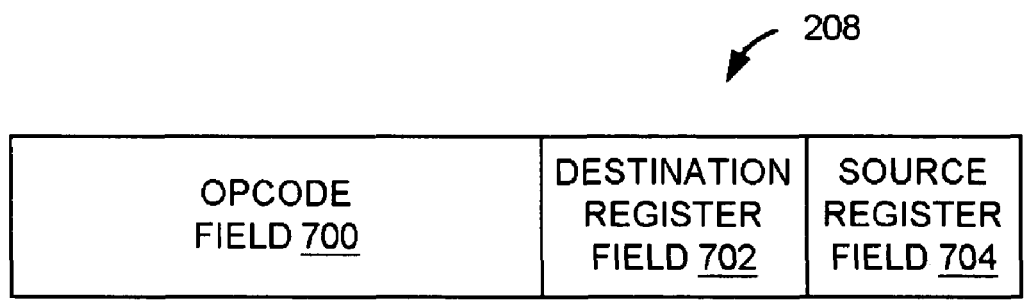
FIGS. 7A–7B illustrate exemplary embodiments of the peripheral instruction of FIG. 2.
Figure 7B:
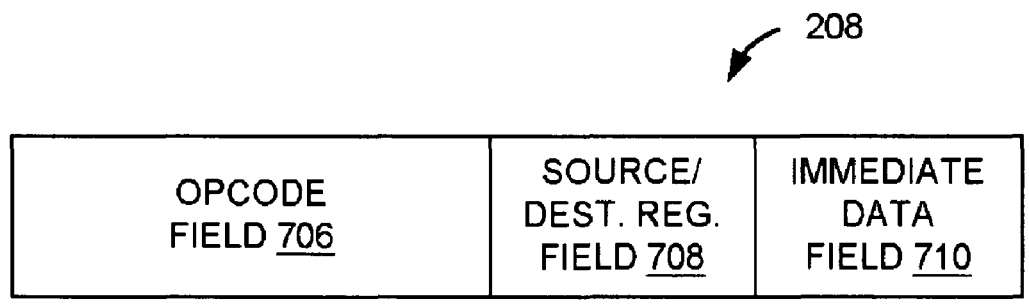

FIGS. 7A–7B illustrate exemplary embodiments of the peripheral instruction 208 of FIG. 2. FIG. 7A is a diagram of one embodiment of the peripheral instruction 208 of FIG. 2 wherein the peripheral instruction 208 includes an opcode field 700, a destination register field 702, and a source register field 704. The opcode field 700 contains a value identifying the instruction as a peripheral instruction directed to the peripheral system 202 of FIG. 2 and specifying the particular peripheral instruction format of FIG. 7A. The destination register field 702 identifies a destination register into which the value is to be saved, and the source register field 704 identifies a source register from which a value is to be obtained. The destination register field 702 and the source register field 704 each specify either: (i) a register of the register files 308, or (ii) an address of an addressable register of the peripheral system 202.

For example, in the assembly language move instruction 'mov % padr, rY' the value 'padr' is an immediate data value, the source register is the 'rY' general purpose register of the register files 308 of FIG. 2, and the destination register is the addressable register of the peripheral system 202 having address 'padr'. Translation of the assembly language instruction 'mov % padr, rY' expectedly results in a machine language instruction having the format of FIG. 7A.

Execution of the resulting machine language instruction by the processor 102 of FIGS. 2 and 3 expectedly results in the processor 102 initiating a write transaction to the peripheral system 202 of FIG. 2 with the address signal PADR equal the value 'padr', the data signal CDATA equal to a value stored in the 'rY' general purpose register of the register files 308, the write control signal PWR asserted, and the ready signal CDRDY asserted. The peripheral system 202 expectedly responds to the write transaction by writing the data conveyed by the CDATA signal (i.e., the value from the 'rY' general purpose register of the register files 308) to the addressable register having address 'padr' specified by the PADR signal. Such write transactions are described in more detail below.

Similarly, in the assembly language move instruction 'mov rX, % padr' the source register is the addressable register of the peripheral system 202 having address 'padr' and the destination register is the 'rX' general purpose register of the register files 308 of FIG. 2. Translation of the assembly language instruction 'mov rX, % padr' expectedly results in a machine language instruction having the format of FIG. 7A.

Execution of the resulting machine language instruction by the processor 102 of FIGS. 2 and 3 expectedly results in the processor 102 initiating a read transaction to the peripheral system, 202 of FIG. 2 with the address signal PADR equal the value 'padr' and the read control signal PRD asserted. The peripheral system 202 expectedly responds to the read transaction by reading the value stored in the addressable register having address 'padr' specified by the PADR signal, and providing the value to the processor 102 by generating the PDATA signal equal to the value, asserting the PDRDY signal, and driving the PDATA and PDRDY signals on the corresponding signal lines of the peripheral bus 204 of FIG. 2. Such read transactions are described in more detail below.

FIG. 7B is a diagram of another embodiment of the peripheral instruction 208 of FIG. 2 wherein the peripheral instruction 208 includes an opcode field 706, a source/destination register field 708, and an immediate data field 710. The opcode field 706 contains a value identifying the instruction as a peripheral instruction directed to the peripheral system 202 of FIG. 2 and specifying the particular peripheral instruction format of FIG. 7B. The source/destination register field 708 identifies a register from which an operand value is to be obtained, and to which a result value is to be saved. The source/destination register field 708 specifies either: (i) a register of the register files 308, or (ii) an address of an addressable register of the peripheral system 202.

For example, in the assembly language bit set instruction 'bits % padr, y' the value 'padr' is an immediate data value, the source/destination register is the addressable register of the peripheral system 202 of FIG. 2 having address 'padr', and the bit number to be set is 'y'. Translation of the assembly language instruction 'bits % padr, y' expectedly results in a machine language instruction having the format of FIG. 7B.

Execution of the resulting machine language instruction by the processor 102 of FIGS. 2 and 3 expectedly results in the processor 102 initiating a read-modify-write transaction to the peripheral system 202 of FIG. 2. During the read-modify-write transaction, the processor obtains the value stored in the addressable register of the peripheral system 202 of FIG. 2 having address 'padr', sets bit 'y' of the value, and provides the modified value to the peripheral system 202. Such read-modify-write transactions are described in more detail below.

Similarly, translations of a bit clear assembly language instruction 'bitc % padr, y' and a bit invert assembly language instruction 'biti % padr, y' expectedly result in machine language instructions having the format of FIG. 7B. During executions of the resulting machine language instructions, the processor 102 expectedly initiates a read-modify-write transaction to the peripheral system 202 of FIG. 2. During the read-modify-write transactions, the processor obtains the value stored in the addressable register of the peripheral system 202 of FIG. 2 having address 'padr', modifies bit 'y' of the value, and provides the modified value to the peripheral system 202.

FIG. 8 is a diagram illustrating component signals of the INTERRUPT signal of FIG. 2 and logic of one embodiment of the instruction sequencing unit 302 of FIG. 3. In the embodiment of FIG. 8, several signals make up the 20-bit INTERRUPT signal, including a 1-bit interrupt request signal "PIRQ," a 1-bit new interrupt request signal "PNIRQ," a 16-bit peripheral interrupt vector signal "PIVECT," a 1-bit interrupt inhibit signal "IRQINH," and a 1-bit interrupt return signal "IRQRET."

In the embodiment of FIG. 8, the processor 102 generates the interrupt return signal IRQRET and the interrupt inhibit signal IRQINH. The peripheral bus interface 206 of the processor 102 registers the interrupt return signal IRQRET and the interrupt inhibit signal IRQINH and drives the interrupt return signal IRQRET and the interrupt inhibit signal IRQINH on the corresponding signal lines of the peripheral bus 204. The interrupt control unit 400 of FIG. 4 generates the interrupt request signals PIRQ and PNIRQ and the interrupt vector signal PIVECT, and drives the interrupt request signals PIRQ and PNIRQ and the interrupt vector signal PIVECT on the corresponding signal lines of the peripheral bus 204. The peripheral bus interface 206 of the processor 102 registers the received interrupt request signals PIRQ and PNIRQ and interrupt vector signal PIVECT.

The interrupt request signal PIRQ is asserted by the interrupt control unit 400 of FIG. 4 when a functional unit (e.g., a peripheral device) of the peripheral system 202 of FIGS. 2 and 4 requires service. In response to an interrupt request signal, the processor 102 executes instructions of an interrupt service routine. The last instruction of each interrupt service routine is an interrupt return instruction. The processor 102 asserts the interrupt return signal IRQRET when the interrupt return instruction is grouped for execution. The processor 102 asserts the interrupt inhibit signal IRQINH to inhibit interrupts.

The new interrupt request signal PNIRQ is asserted by the interrupt control unit 400 of FIG. 4 when a lower priority interrupt request is received while a higher priority interrupt is being handled by the processor 102. In this situation, the processor 102 services the lower priority interrupt after handling the higher priority interrupt.

The data processing system 200 of FIG. 2 supports nested interrupts. That is, higher priority interrupts can interrupt service routines of lower priority interrupts. The 16-bit peripheral interrupt vector signal PIVECT is used to specify a priority of a corresponding interrupt request. When by the interrupt control unit 400 of FIG. 4 asserts the interrupt request signals PIRQ and PNIRQ, the interrupt control unit 400 generates the interrupt vector signal PIVECT with the priority associated with the interrupt request, and drives the interrupt vector signal PIVECT on the corresponding signal lines of the peripheral bus 204.

As described above, in one embodiment, the interrupt control unit 400 includes two 16-bit interrupt priority registers. Consecutive bit locations in each of the interrupt priority registers are used to store user-defined priority levels associated with the 14 maskable interrupt signals. Software programs may write to the bit locations of the interrupt priority registers. User-defined interrupt priorities may range from 0b00 (i.e., decimal '0') to 0b11 (i.e., decimal '3'), with 0b00 being the lowest and 0b11 being the highest. (The NMI signal has a fixed priority level of decimal '5', and the DEI signal has a fixed priority level of decimal '4'.)

As indicated in FIG. 8, the component signals of the INTERRUPT signal are generated and received by the instruction sequencing unit 302. In the embodiment of FIG. 8, the instruction sequencing unit 302 includes a program counter (PC) unit 800, a trap program counter (TPC) unit 802, a grouping unit 804, and a dispatch unit 806.

The program counter (PC) unit 800 stores and maintains a program counter for the processor 102. The program counter is stored in a register, and specifies an address of a next instruction to be fetched in the memory system 110 of FIGS. 1 and 2. The next instruction to be fetched may reside, for example, in the code 112 of FIGS. 1 and 2.

The trap program counter (TPC) unit 802 includes multiple registers forming a last-in-first-out (LIFO) stack for storing values of the program counter. The last-in-first-out (LIFO) stack of the trap program counter (TPC) unit 802 allows the data processing system 200 of FIG. 2 to handle nested interrupt requests. Operation of the trap program counter (TPC) unit 802 during interrupt requests is described in detail below.

In the grouping (GR) stage of the pipeline, fully decoded instructions (e.g., from an instruction queue) are provided to the grouping unit 804. The grouping unit 804 performs dependency checks on the fully decoded instructions by applying a predefined set of dependency rules (e.g., write-after-write, read-after-write, write-after-read, etc.). The set of dependency rules determine which instructions can be grouped together for simultaneous execution (e.g., execution in the same cycle of the CLOCK signal).

During the instruction decoding process, instruction opcodes are translated to internal representations called "native opcodes." The dispatch unit 806 queues native opcodes and other relevant information such as read control signals and register addresses for use by the execution unit 306 of FIG. 3, the register files 308 of FIG. 3, and/or the load/store unit 304 of FIG. 3 at appropriate times during instruction execution.

In response to an asserted interrupt request signal PIRQ, the grouping unit 804 stops grouping instructions for simultaneous execution. Instructions fetched by the processor 102 and partially decoded up to and including those in the grouping (GR) stage are flushed. Executions of instructions in the operand read (RD) stage, the address generation (AG) stage, the memory access 0 (M0) stage, the memory access 1 (M1) stage, and the execution (EX) stage are completed normally. Subsequently, the value of the program counter is pushed on the stack of the trap program counter (TPC) unit 802, and the program counter is loaded with an address of a first instruction of an interrupt service routine corresponding to the interrupt request. As a result, instructions of the interrupt service routine are fetched and executed.

As described above, the last instruction of every interrupt service routine is an interrupt return instruction. When the grouping unit 804 groups the interrupt return instruction for execution, logic of the instruction sequencing unit 302 asserts the interrupt return signal IRQRET. During the subsequent operand read (RD) stage of the execution pipeline, the peripheral bus interface 206 drives the asserted interrupt return signal IRQRET on the-corresponding signal line of the peripheral bus 204 of FIG. 2. At the same time, the logic of the instruction sequencing unit 302 pops a saved program counter value from the top of the stack of the trap program counter (TPC) unit 802, and stores the value of the program counter in the register of the program counter (PC) unit 800 reserved for the program counter. As a result, the fetching of instructions of the interrupted program is resumed during the next cycle of the CLOCK signal at the point where the program was interrupted.

Figure 9:
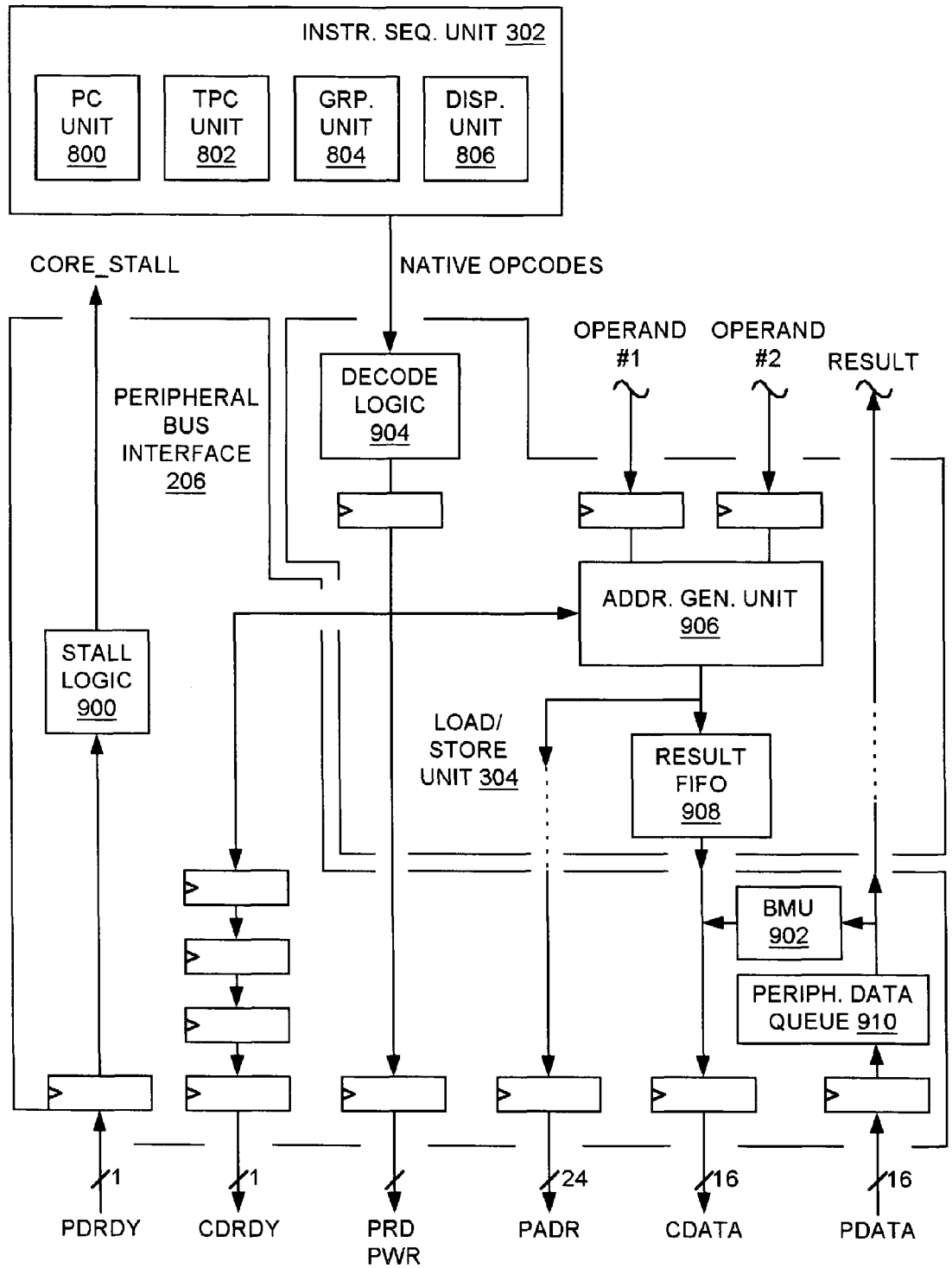
FIG. 9 is a diagram illustrating logic within the embodiment of the instruction sequencing unit of FIG. 8 and embodiments of the peripheral bus interface of FIG. 2 and the load/store unit of FIG. 3.

FIG. 9 is a diagram illustrating logic within the embodiment of the instruction sequencing unit 302 of FIG. 8 and embodiments of the peripheral bus interface 206 of FIG. 2 and the load/store unit 304 of FIG. 3. In FIG. 9, the peripheral bus interface 206 includes several registers for storing signals, stall logic 900, and a bit manipulation unit (BMU) 902. As indicated in FIG. 9, the ready signal PDRDY received from the peripheral system 202 of FIG. 2 is first registered within the peripheral bus interface 206, then provided to the stall logic 900. The stall logic uses the ready signal PDRDY and other stall signals to produce a "CORE_STALL" signal. More specifically, if the ready signal PDRDY is not asserted when expected, the stall logic 900 asserts the CORE_STALL signal. The CORE_STALL signal is distributed to logic within the processor 102. When the CORE_STALL signal is asserted, the execution pipeline implemented within the processor 102 is stalled until the CORE_STALL signal is deasserted.

The bit manipulation unit (BMU) 902 is used during read-modify-write operations (e.g., bit set instructions, bit clear instructions, and bit invert instructions) specifying an addressable register of the peripheral system 202 of FIG. 2. Exemplary bit manipulation instructions specifying addressable registers of the peripheral system 202 of FIG. 2 are described above with regard to FIG. 7B.

During a read portion of a read-modify-write transaction carried out in response to a bit manipulation instruction specifying an addressable registers of the peripheral system 202, the bit manipulation unit (BMU) 902 receives the data signal PDATA from the peripheral system 202 as input (e.g., as an operand). The data signal PDATA conveys the value stored in the addressable register of the peripheral system 202. During a modify portion of the read-modify-write transaction, the bit manipulation unit (BMU) 902 carries out the bit manipulation operation specified by the bit manipulation instruction, thereby producing a result. During a write portion of the read-modify-write transaction, the result produced by the bit manipulation unit (BNMU 902 is provided to the peripheral system 202 via the data signal CDATA.

In FIG. 9 the load/store unit 304 includes several registers for storing values, decode logic 904, an address generation unit 906, and a result first-in-first-out (FIFO) buffer 908. As indicated in FIG. 9, the decode logic 904 receives the native opcodes of instructions grouped for simultaneous execution from the dispatch unit 806 of the instruction sequencing unit 302. The decode logic 904 generates the ready signal CDRDY, the read control signal PRD, the write control signal PWR, and one or more control signals dependent upon the native opcodes.

The load/store unit 304 first registers the ready signal CDRDY, the read control signal PRD, the write control signal PWR, and the control signals, then provides the control signals to the address generation unit 906, and provides the ready signal CDRDY, the read control signal PRD, and the write control signal PWR to the peripheral bus interface 206.

The address generation unit 906 receives an "OPERAND #1," an "OPERAND #2," and the controls signals produced by the decode logic 904, and produces a result (e.g., an address value) dependent upon the OPERAND #1, the OPERAND #2, and the controls signals. As indicated in FIG. 9, logic of the load/store unit 304 may provide the result produced by the address generation unit 906 to the peripheral bus interface 206. In this situation, the peripheral bus interface 206 first registers the result produced by the address generation unit 906, then drives the result produced by the address generation unit 906 on the peripheral bus 204 as the address signal PADR.

Alternately, the logic of the load/store unit 304 may provide the result produced by the address generation unit 906 to the result first-in-first-out (FIFO) buffer 908 as indicated in FIG. 9. At some later time, the result first-in-first-out (FIFO) buffer 908 may provide the result to the peripheral bus interface 206. In this situation, the peripheral bus interface 206 first registers the result, then drives the result on the peripheral bus 204 as the data signal CDATA.

As indicated in FIG. 9, the peripheral bus interface 206 first buffers the data signal PDATA received from the peripheral system 202. The peripheral bus interface 206 may provide the data signal PDATA to the load/store unit 304, and the load/store unit 304 may provide the data signal PDATA as a "RESULT" signal to other logic within the processor 102.

In the embodiment of FIG. 9, the peripheral bus interface 206 includes a peripheral data queue 910 used to store the data signal PDATA while the processor 102 is stalled. The peripheral data queue 910 may include, for example, multiple storage elements operated in a first-in-first-out (FIFO) manner.

Figure 10:
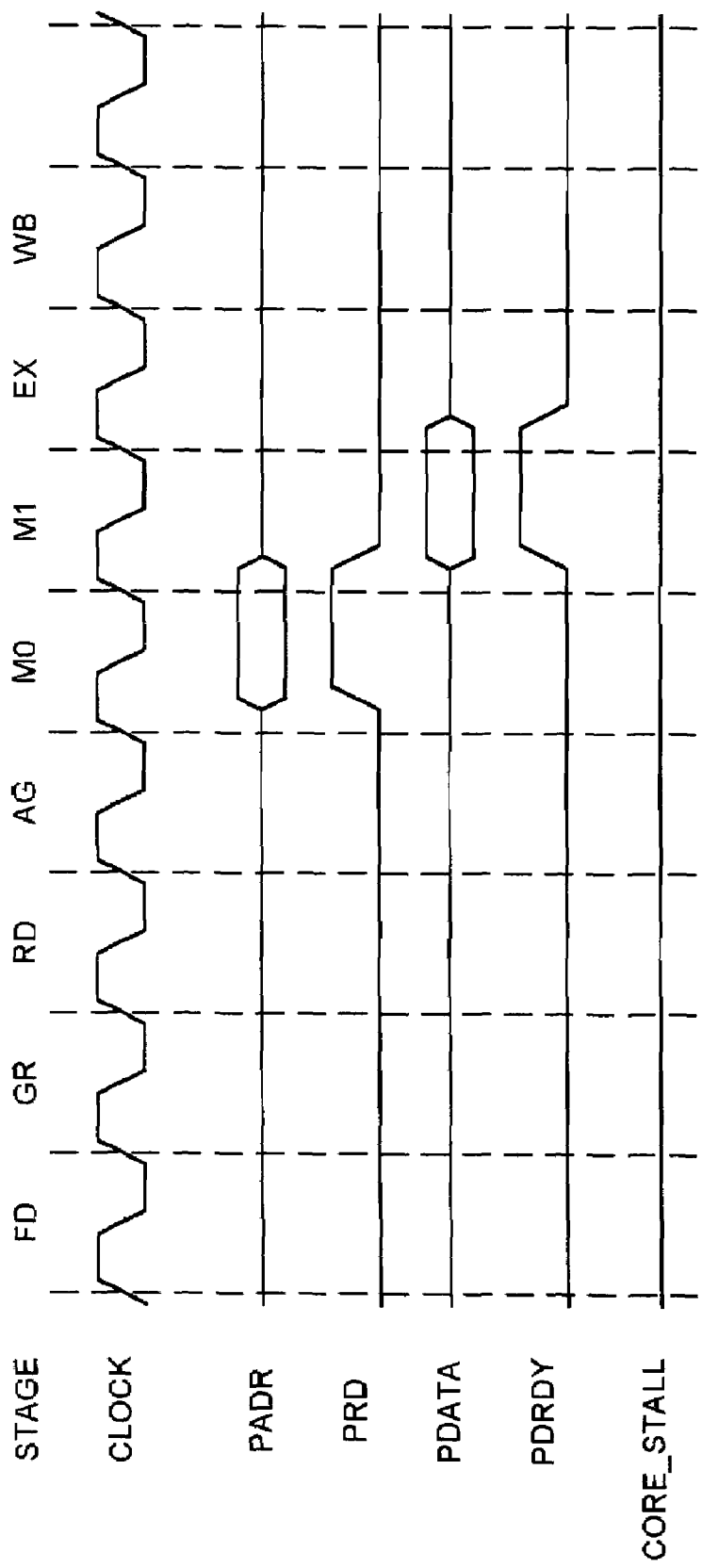
FIG. 10 is a timing diagram depicting voltages of signals driven on the peripheral bus of FIG. 2 versus time during an exemplary read transaction.

FIG. 10 is a timing diagram depicting voltages of signals driven on the peripheral bus 204 of FIG. 2 versus time during an exemplary read transaction. During the read transaction of FIG. 10, the CORE_STALL signal is not asserted, and the execution pipeline implemented within the processor 102 of FIG. 2 is not stalled.

In FIG. 10, the address signal PADR and the asserted read control signal PRD are driven on the corresponding signal lines of the peripheral bus 204 by the peripheral bus interface 206 of FIG. 9 during the memory read 0 (M0) stage of the execution pipeline. As described above, the address signal PADR specifies an address of an addressable register of the peripheral system 202 of FIG. 2. During the subsequent memory read 1 (M1) stage of the execution pipeline, the data signal PDATA and the asserted ready signal PDRDY are driven on the corresponding signal lines of the peripheral bus 204 by the peripheral system 202 of FIG. 2. The data signal PDATA expectedly conveys a value stored in the addressable register of the peripheral system 202.

Figure 11:
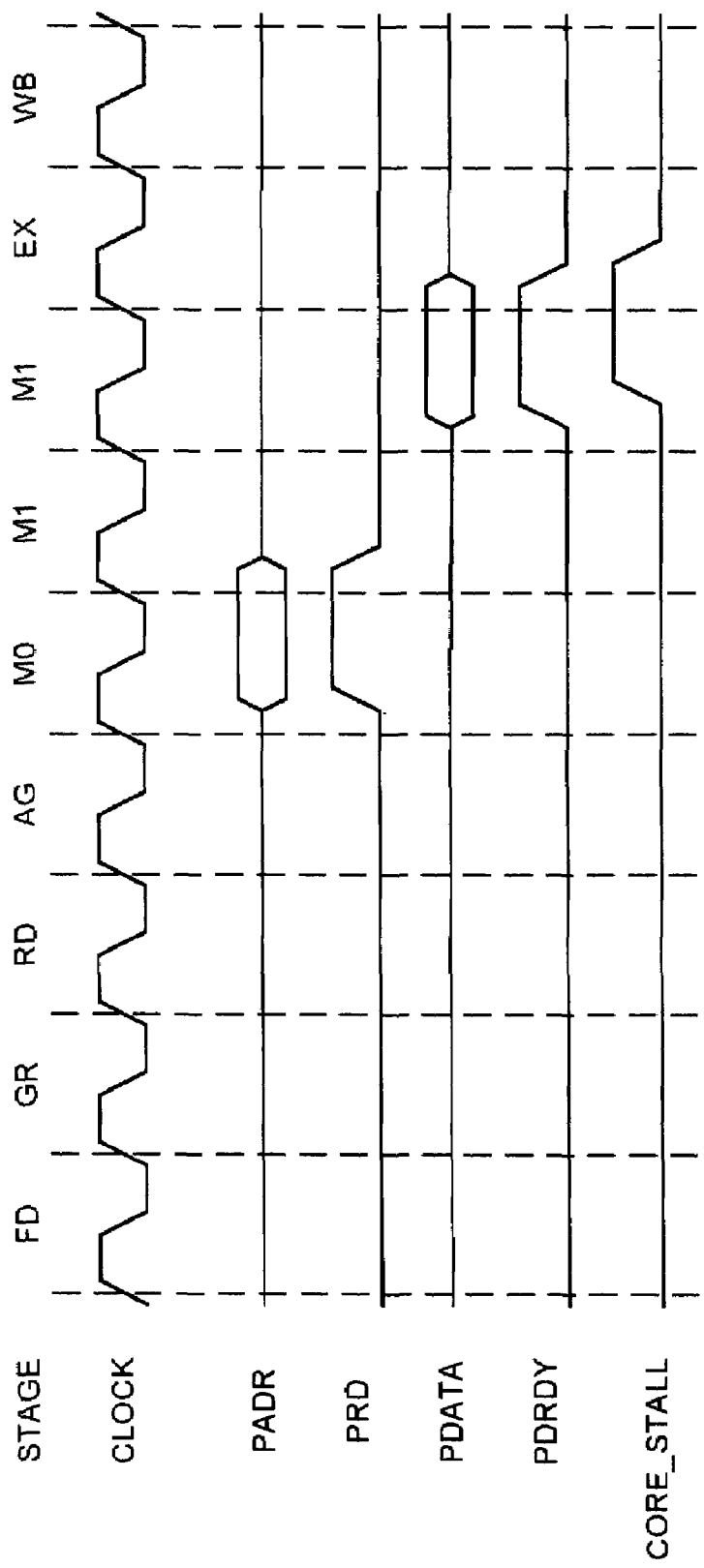
FIG. 11 is a timing diagram depicting voltages of signals driven on the peripheral bus of FIG. 2 versus time during another read transaction.

FIG. 11 is a timing diagram depicting voltages of signals driven on the peripheral bus 204 of FIG. 2 versus time during another read transaction. During the read transaction of FIG. 11, the CORE_STALL signal is asserted, and the execution pipeline implemented within the processor 102 of FIG. 2 is stalled for one cycle of the CLOCK signal.

As in FIG. 10, the address signal PADR and the asserted read control signal PRD are driven on the corresponding signal lines of the peripheral bus 204 by the peripheral bus interface 206 of FIG. 9 during the memory read 0 (M0) stage of the execution pipeline. As described above, the address signal PADR specifies an address of an addressable register of the peripheral system 202 of FIG. 2.

In FIG. 11, during the subsequent memory read 1 (M1) stage of the execution pipeline, the data signal PDATA is not driven on the corresponding signal lines of the peripheral bus 204 and the ready signal PDRDY is not asserted by the peripheral system 202 of FIG. 2. As a result, the stall logic 900 of FIG. 9 asserts the CORE_STALL signal during the next cycle of the CLOCK signal. As a result, the execution pipeline implemented within the processor 102 of FIG. 2 is stalled as indicated in FIG. 11.

During the same cycle of the CLOCK signal, the data signal PDATA is driven on the corresponding signal lines of the peripheral bus 204 and the ready signal PDRDY is asserted by the peripheral system 202 of FIG.2. In response, the stall logic 900 of FIG. 9 deasserts the CORE_STALL signal. As a result, the memory read 1 (M1) stage of the execution pipeline is effectively extended by one cycle of the CLOCK signal as indicated in FIG. 11. As described above, the data signal PDATA expectedly conveys a value stored in the addressable register of the peripheral system 202.

Figure 12:
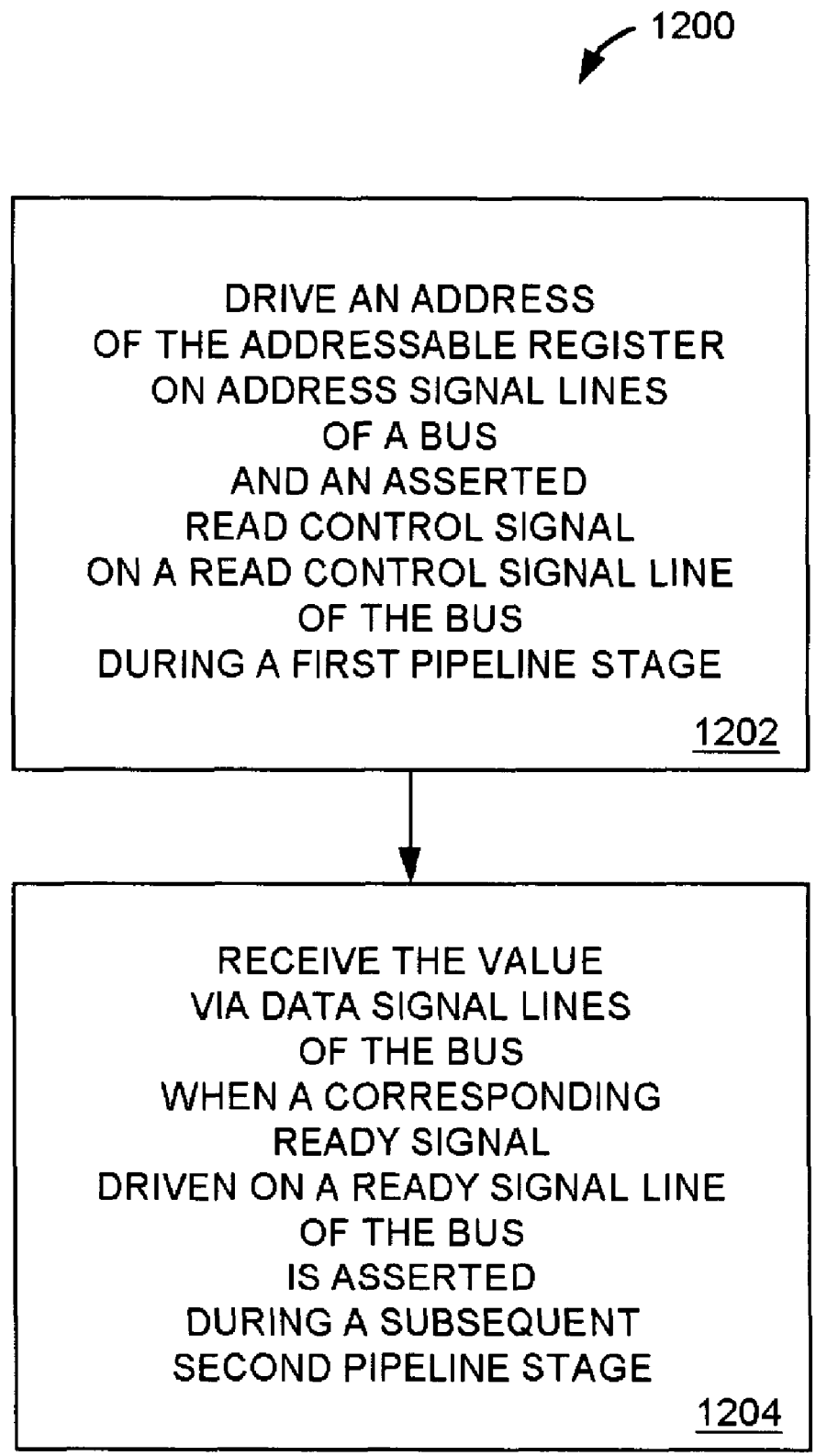
FIG. 12 is a flow chart of one embodiment of a method for obtaining a value stored in an addressable register.

FIG. 12 is a flow chart of one embodiment of a method 1200 for obtaining a value stored in an addressable register. The method 1200 may, for example, be embodied within the logic of the peripheral bus interface 206 of FIGS. 2 and 9. During a first step 1202 of the method 1200, the address of the addressable register is driven on address signal lines of a bus (e.g., the peripheral bus 204), and an asserted read control signal is driven on a read control signal line of the bus, during a first pipeline stage.

During a step 1204, the value is received via data signal lines of the bus when a corresponding ready signal driven on a ready signal line of the bus is asserted during a second pipeline stage subsequent to the first pipeline stage.

Figure 13:
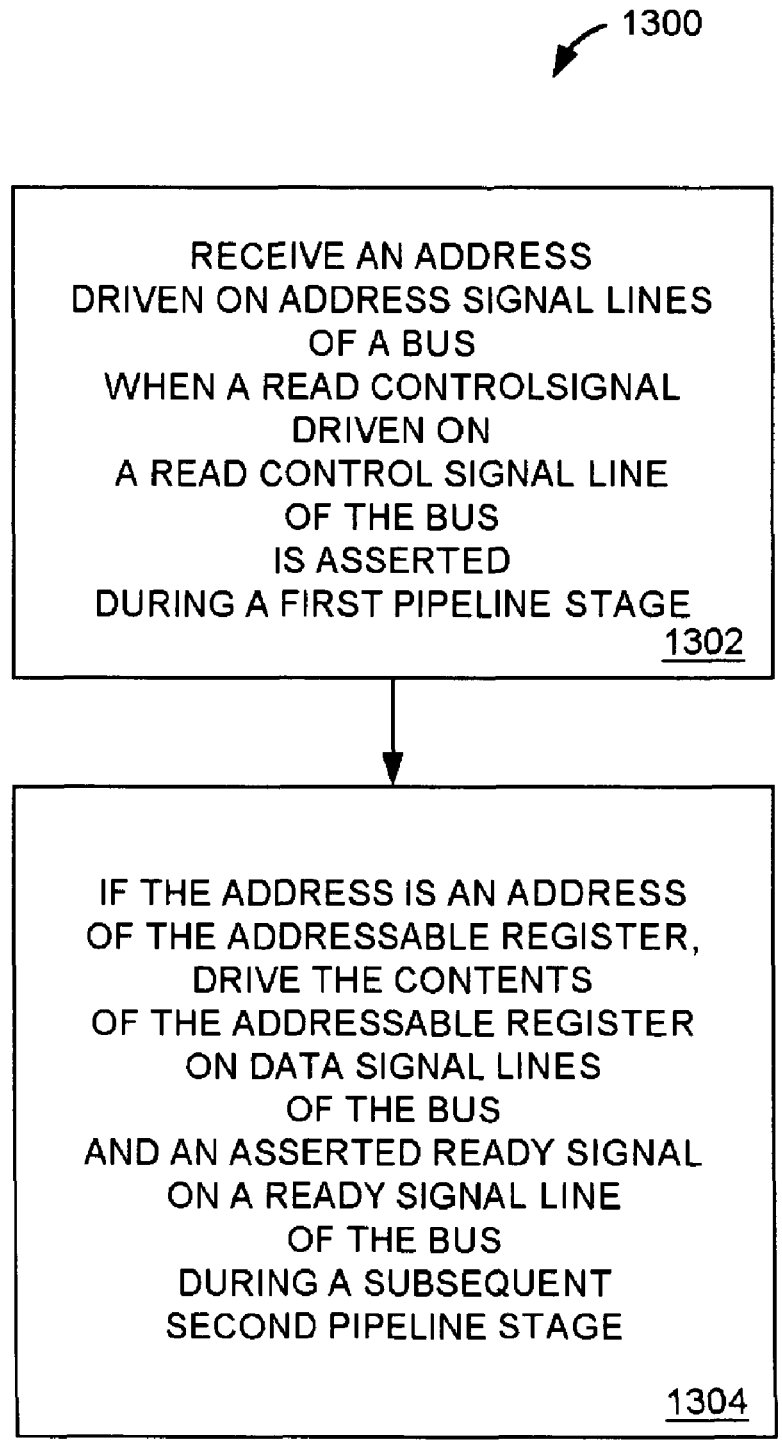
FIG. 13 is a flow chart of one embodiment of a method for providing a value stored in an addressable register.

FIG. 13 is a flow chart of one embodiment of a method 1300 for providing a value stored in an addressable register. The method 1300 may, for example, be embodied within the logic of the peripheral system 202 of FIGS. 2 and 4. During a first step 1302 of the method 1300, an address driven on address signal lines of a peripheral bus is received when a read control signal driven on a read control signal line of a bus (e.g., the peripheral bus 204) is asserted during a first pipeline stage.

During a step 1304, if the address is an address of the addressable register, the contents of the addressable register are driven on data signal lines of the bus, and an asserted ready signal is., driven on a ready signal line of the bus during a second pipeline stage subsequent to the first pipeline stage.

Figure 14:
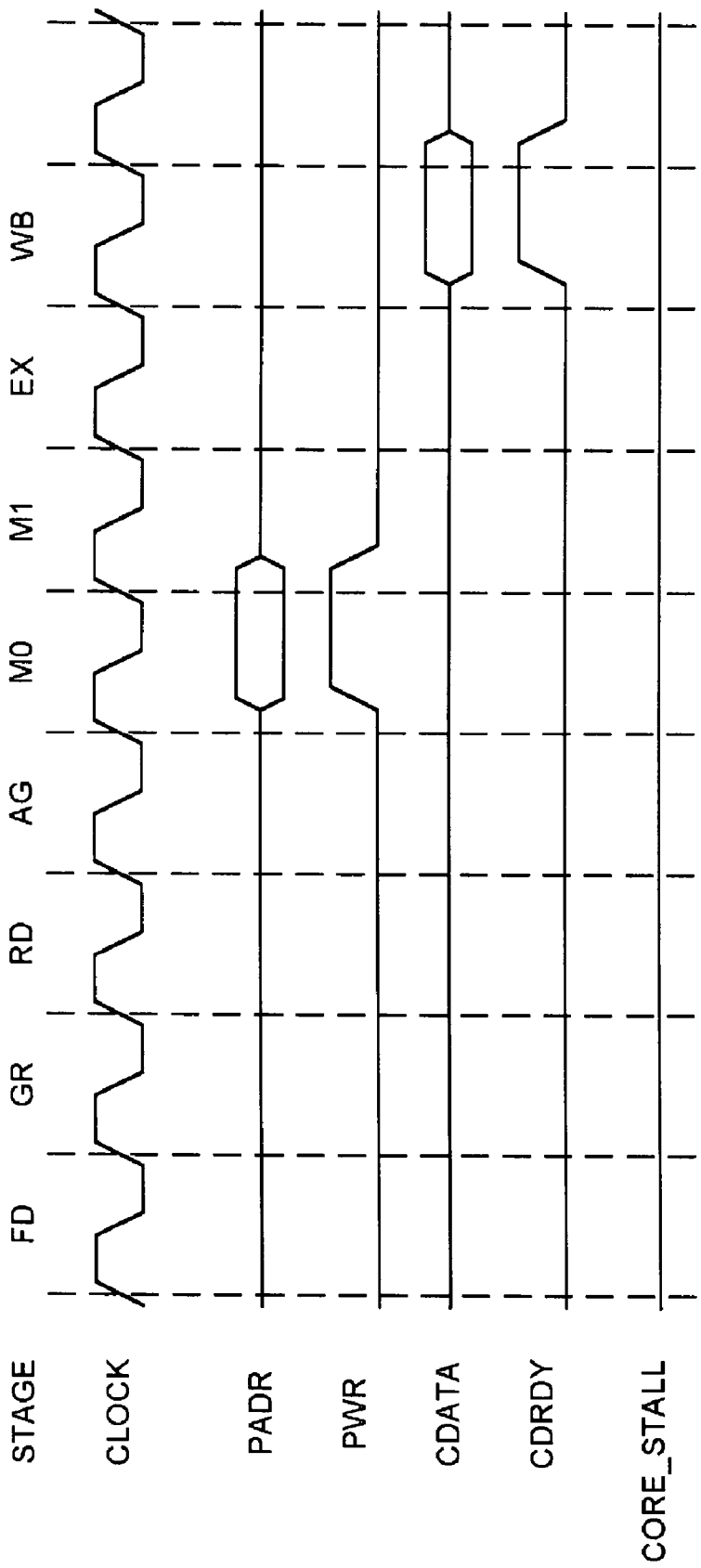
FIG. 14 is a timing diagram depicting voltages of signals driven on the peripheral bus of FIG. 2 versus time during an exemplary write transaction.

FIG. 14 is a timing diagram depicting voltages of signals driven on the peripheral bus 204 of FIG. 2 versus time during an exemplary write transaction. During the write transaction of FIG. 14, the CORE_STALL signal is not asserted, and the execution pipeline implemented within the processor 102 of FIG. 2 is not stalled.

In FIG. 14, the address signal PADR and the asserted write control signal PWR are driven on the corresponding signal lines of the peripheral bus 204 by the peripheral bus interface 206 of FIG. 9 during the memory read 0 (M0) stage of the execution pipeline. As described above, the address signal PADR specifies an address of an addressable register of the peripheral system 202 of FIG. 2.

During the subsequent write back (WB) stage of the execution pipeline, the data signal CDATA and the asserted ready signal CDRDY are driven on the corresponding signal lines of the peripheral bus 204 by the peripheral bus interface 206 of FIG. 9. The data signal CDATA is expectedly generated during the execution (EX) stage of the pipeline, and conveys a value to be stored in the addressable register of the peripheral system 202.

Figure 15:
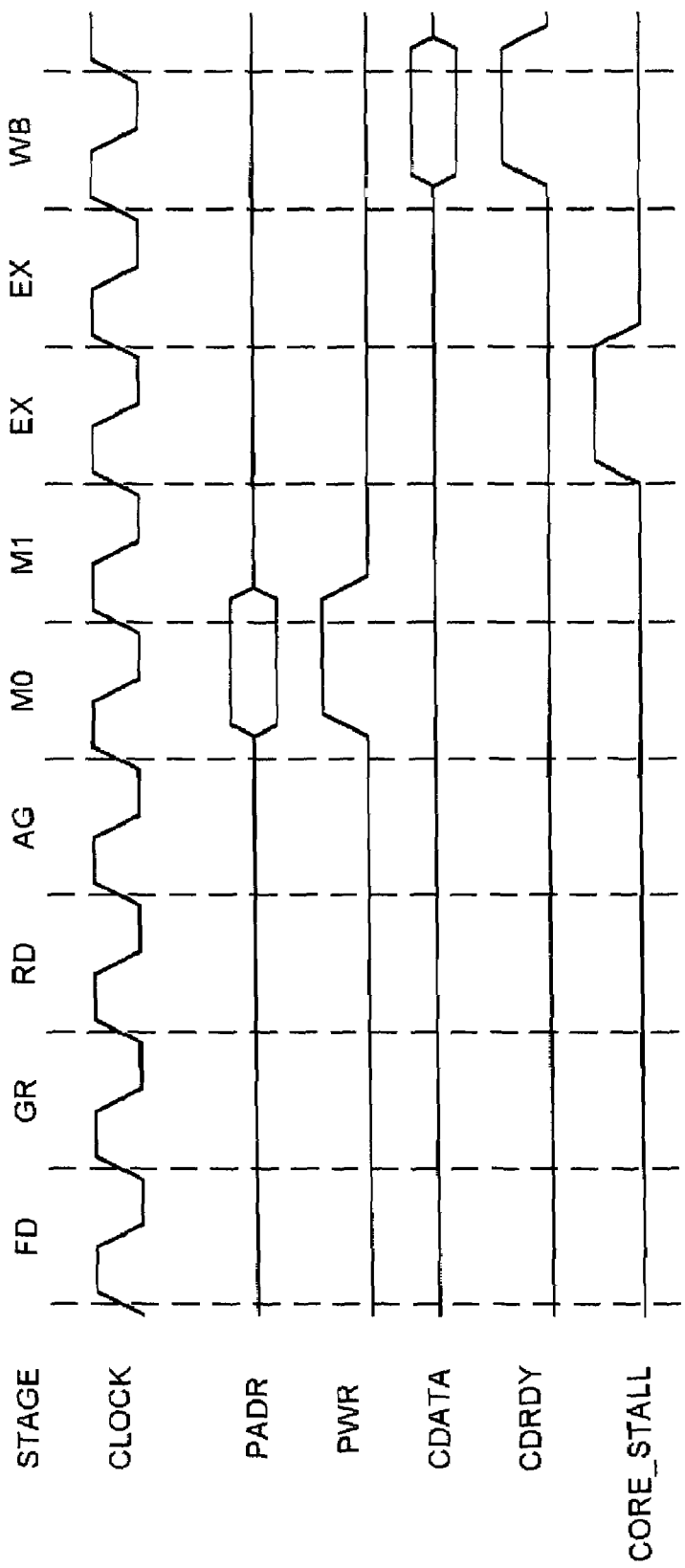
FIG. 15 is a timing diagram depicting voltages of signals driven on the peripheral bus of FIG. 2 versus time during another write transaction.

FIG. 15 is a timing diagram depicting voltages of signals driven on the peripheral bus 204 of FIG. 2 versus time during another write transaction. During the write transaction of FIG. 15, the CORE_STALL signal is asserted, and the execution pipeline implemented within the processor 102 of FIG. 2 is stalled for one cycle of the CLOCK signal.

As in FIG. 14, the address signal PADR and the asserted write control signal PWR are driven on the corresponding signal lines of the peripheral bus 204 by the peripheral bus interface 206 of FIG. 9 during the memory read 0 (M0) stage of the execution pipeline. As described above, the address signal PADR specifies an address of an addressable register of the peripheral system 202 of FIG. 2.

In FIG. 15, during the subsequent execution (EX) stage of the execution pipeline, a stall condition occurs within the processor core 102 (by a condition other than assertion of the PDRDY signal). As a result, the stall logic 900 of FIG. 9 asserts the CORE_STALL signal during the execution (EX) stage. During the next cycle of the CLOCK signal, the stall condition no longer exists within the processor 102, and the stall logic 900 of FIG. 9 deasserts the CORE_STALL signal. As in FIG. 14, during the subsequent write back (WB) stage of the execution pipeline, the data signal CDATA and the asserted ready signal CDRDY are driven on the corresponding signal lines of the peripheral bus 204 by the peripheral bus interface 206 of FIG. 9.

As a result of the stall condition within the processor core 102, the write data to be sent to the peripheral system 202 is not available in the expected cycle of the CLOCK signal. The peripheral system 202 relies on the CDRDY signal to capture the data signal CDATA during the next cycle of the CLOCK signal. In FIG. 15, the execution (EX) stage of the execution pipeline is effectively extended by one cycle of the CLOCK signal as indicated in FIG. 15. As described above, the data signal CDATA is expectedly generated during the execution (EX) stage of the pipeline, and conveys a value to be stored in the addressable register of the peripheral system 202.

Figure 16:
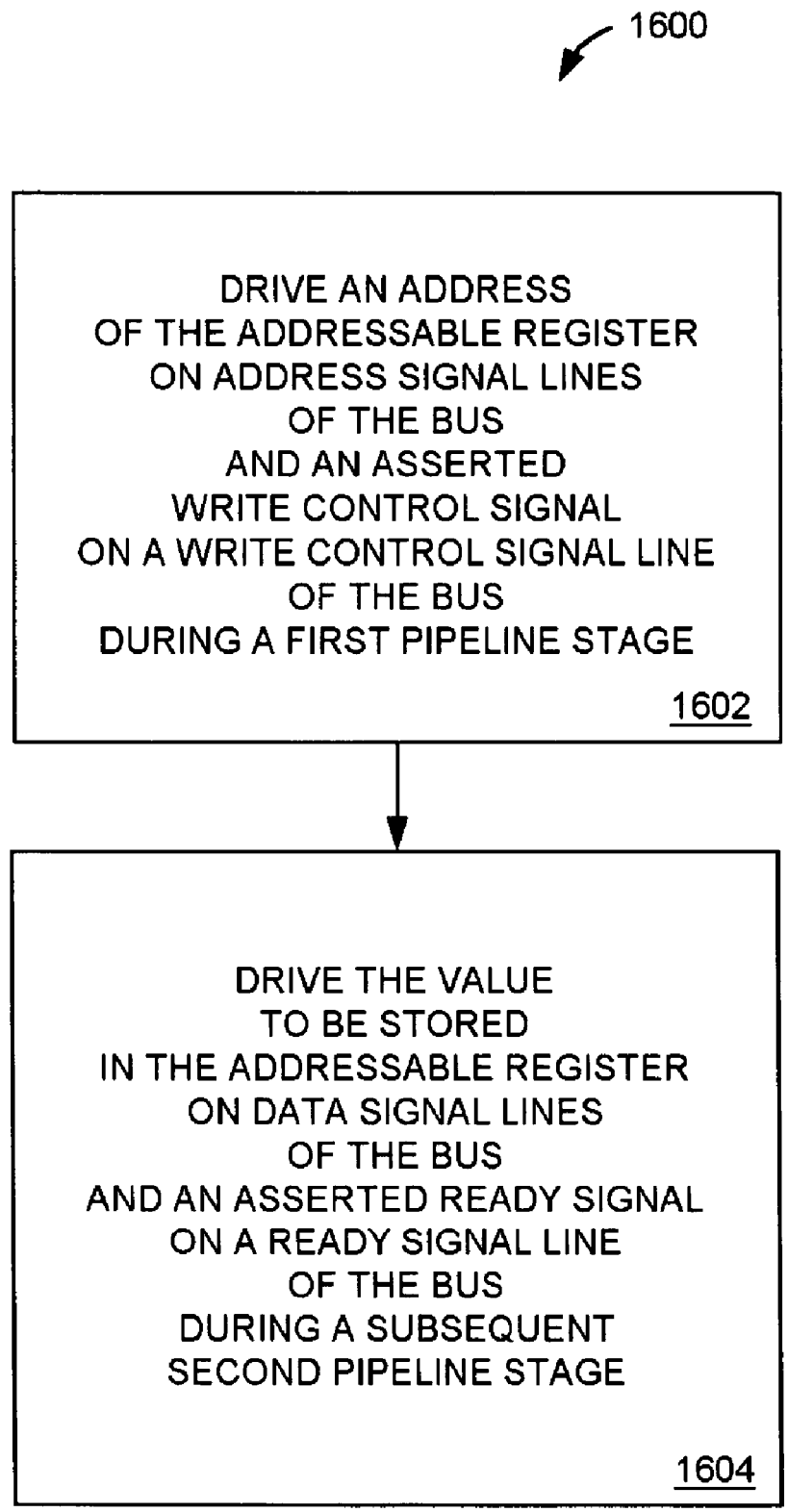
FIG. 16 is a flow chart of one embodiment of a method for storing a value in an addressable register.

FIG. 16 is a flow chart of one embodiment of a method 1600 for storing a value in an addressable register. The method 1600 may, for example, be embodied within the logic of the peripheral bus interface 206 of FIGS. 2 and 9.

During a first step 1602 of the method 1600, the address of the addressable register is driven on address signal lines of a peripheral bus, and an asserted write control signal is driven on a write control signal line of the bus (e.g., the peripheral bus 204) during a first pipeline stage.

During a step 1604, the value to be stored in the addressable register is driven on data signal lines of the bus, and an asserted ready signal is driven on a ready signal line of the bus, during a second pipeline stage subsequent to the first pipeline stage.

Figure 17:
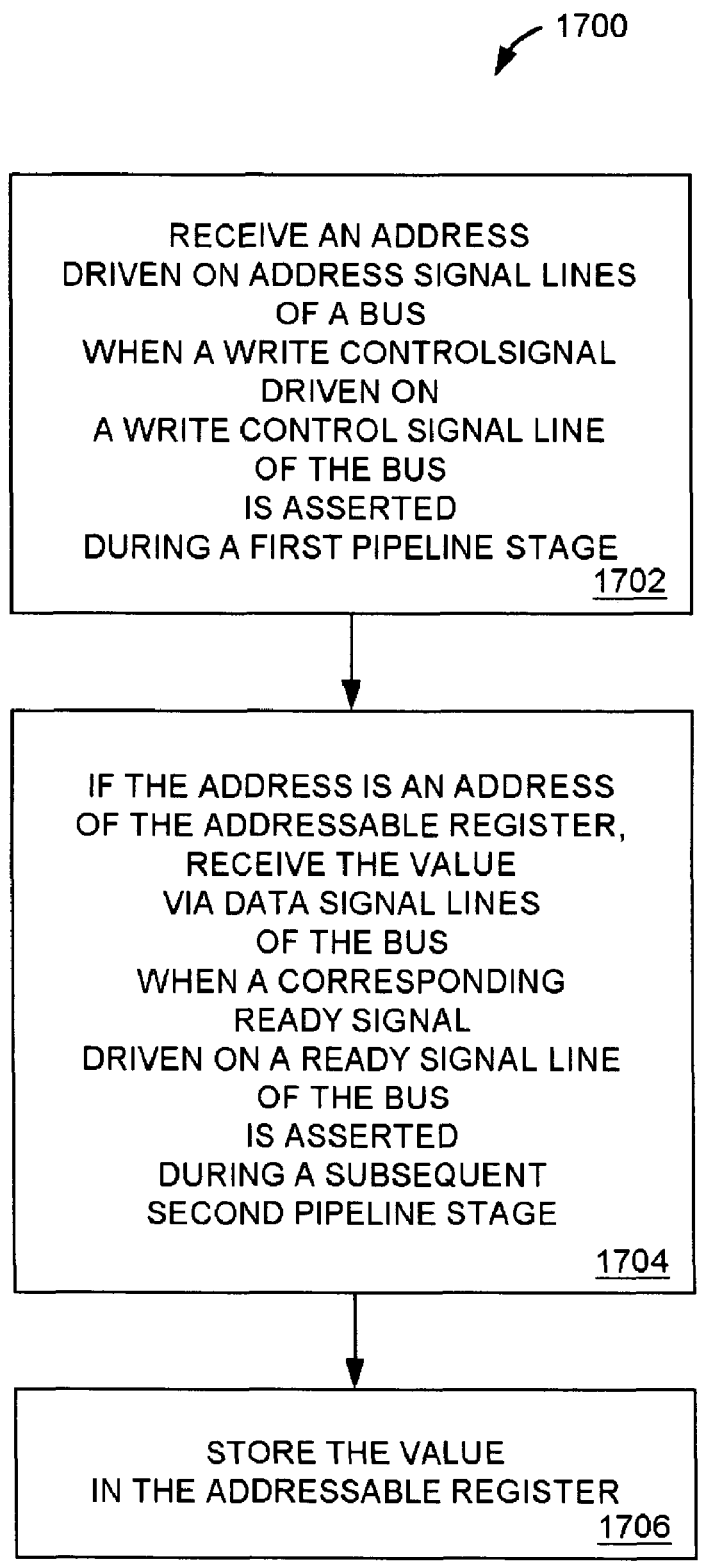
FIG. 17 is a flow chart of one embodiment of another method for storing a value in an addressable register.

FIG. 17 is a flow chart of one embodiment of a method 1700 for storing a value in an addressable register. The method 1700 may, for example, be embodied within the logic of the peripheral system 202 of FIGS. 2 and 4. During a first step 1702 of the method 1300, an address driven on address signal lines of a bus (e.g., the peripheral bus 204) is received when a write control signal driven on a write control signal line of the bus is asserted during a first pipeline stage.

During a step 1704, if the address is an address of the addressable register, a value driven on data signal lines of the bus is received when a corresponding ready signal driven on a ready signal line of the bus is asserted during a second pipeline stage subsequent to the first pipeline stage. The value is stored in the addressable register during a step 1706.

Figure 18:
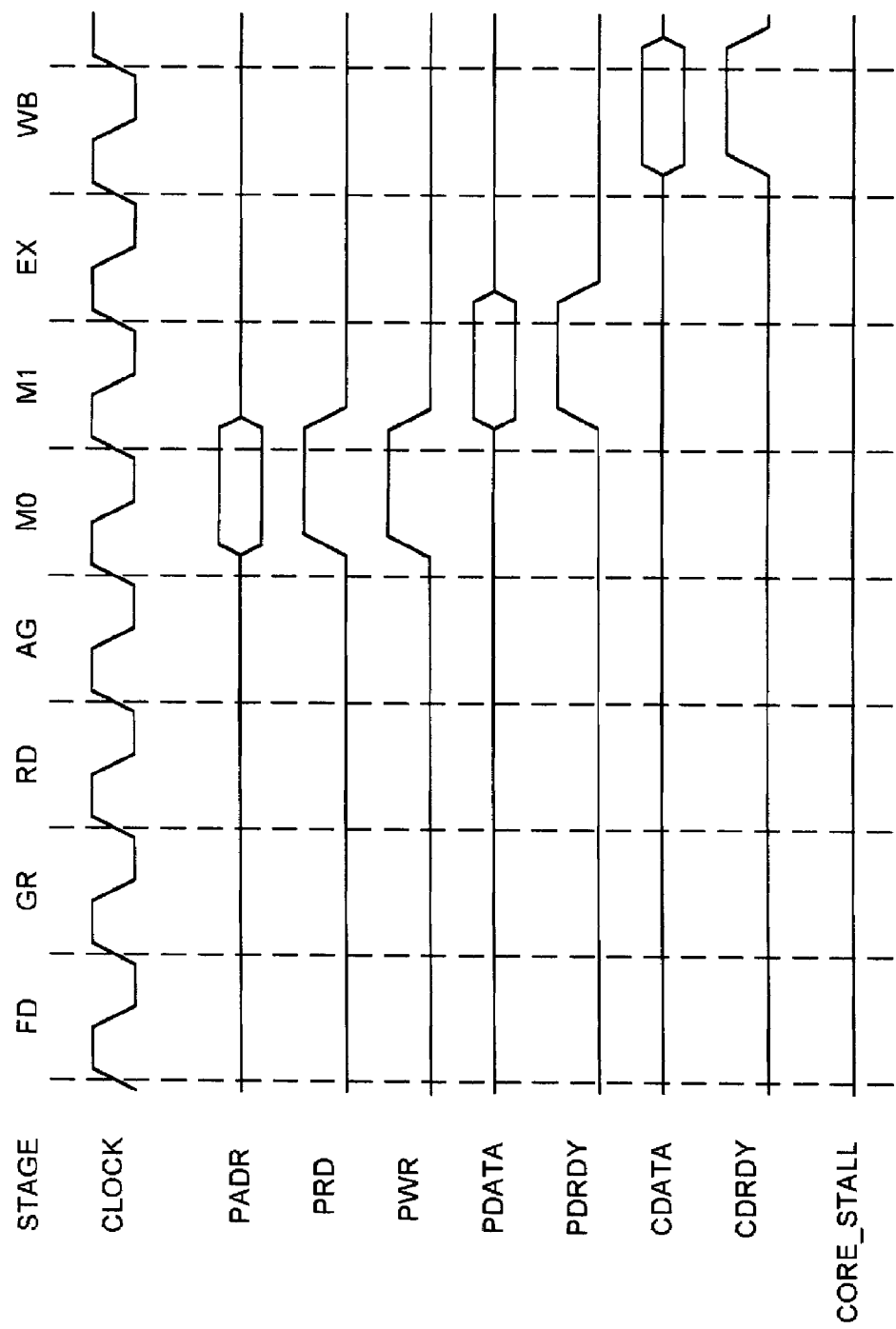
FIG. 18 is a timing diagram depicting voltages of signals driven on the peripheral bus of FIG. 2 versus time during an exemplary read-modify-write transaction.

FIG. 18 is a timing diagram depicting voltages of signals driven on the peripheral bus 204 of FIG. 2 versus time during an exemplary-read-modify-write transaction. During the read-modify-write transaction of FIG. 18, the CORE_STALL signal is not asserted, and the execution pipeline implemented within the processor 102 of FIG. 2 is not stalled.

In FIG. 18, the address signal PADR, the read control signal PDR, and the write control signal PWR are all driven on the corresponding signal lines of the peripheral bus 204 by the peripheral bus interface 206 of FIG. 9 during the memory read 0 (M0) stage of the execution pipeline. As described above, the address signal PADR specifies an address of an addressable register of the peripheral system 202 of FIG. 2.

During the subsequent memory read 1 (M1) stage of the execution pipeline, the data signal PDATA and the asserted ready signal PDRDY are driven on the corresponding signal lines of the peripheral bus 204 is asserted by the peripheral system 202 of FIG. 2. The data signal PDATA expectedly conveys a value obtained from the addressable register of the peripheral system 202.

During the subsequent execution (EX) stage of the execution pipeline, the bit manipulation unit (BMU) 902 of the peripheral bus interface 206 of FIG. 9 expectedly modifies the value obtained from the addressable register of the peripheral system 202 as described above. During the subsequent write back (WB) stage of the execution pipeline, the data signal CDATA and the asserted ready signal CDRDY are driven on the corresponding signal lines of the peripheral bus 204 by the peripheral bus interface 206 of FIG. 9. The data signal CDATA expectedly conveys the modified value produced by the bit manipulation unit (BMU) 902 of the peripheral bus interface 206.

Figure 19A:
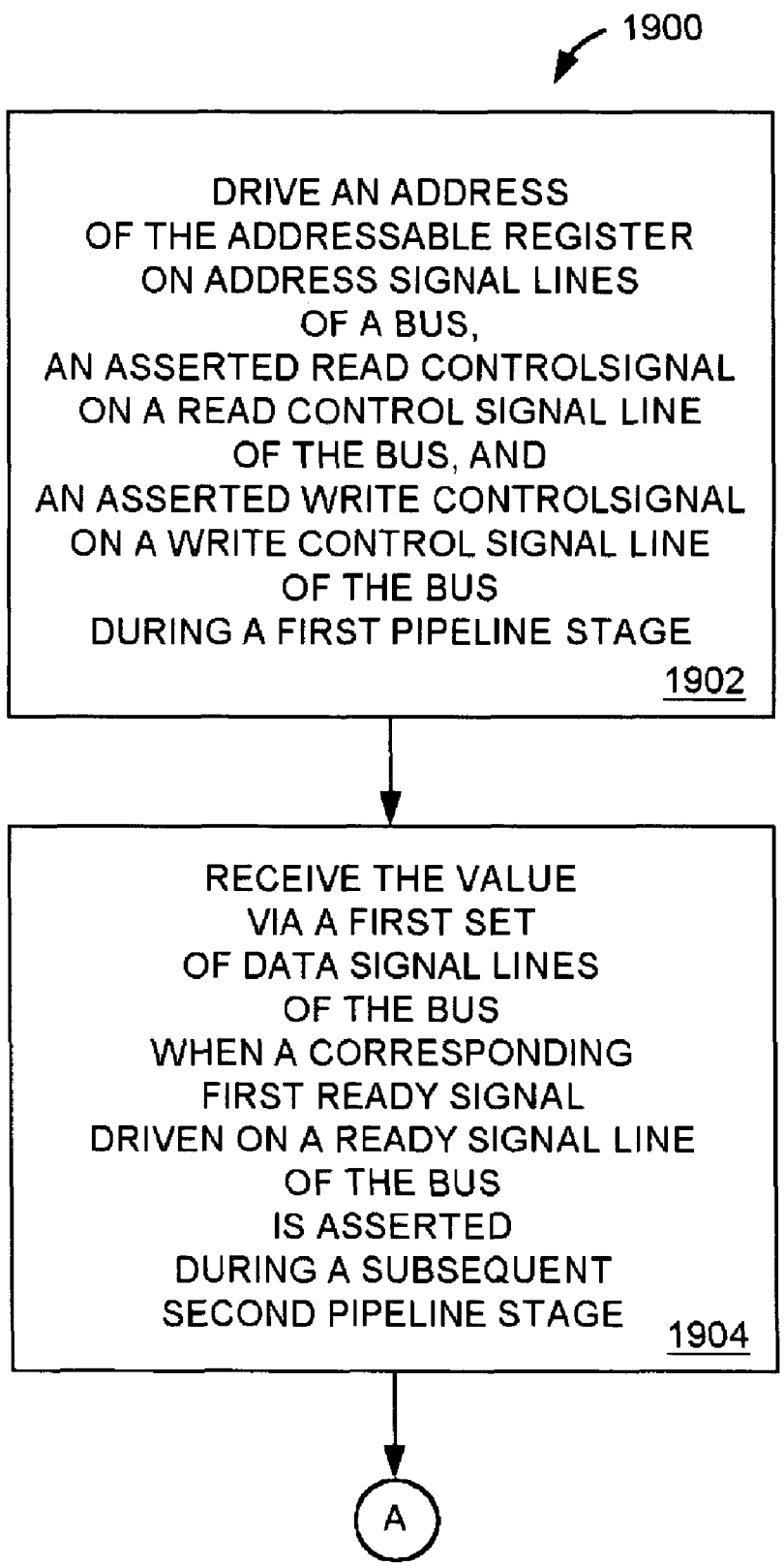
FIGS. 19A and 19B in combination form a flow chart of one embodiment of a method for modifying a value stored in an addressable register.
Figure 19B:
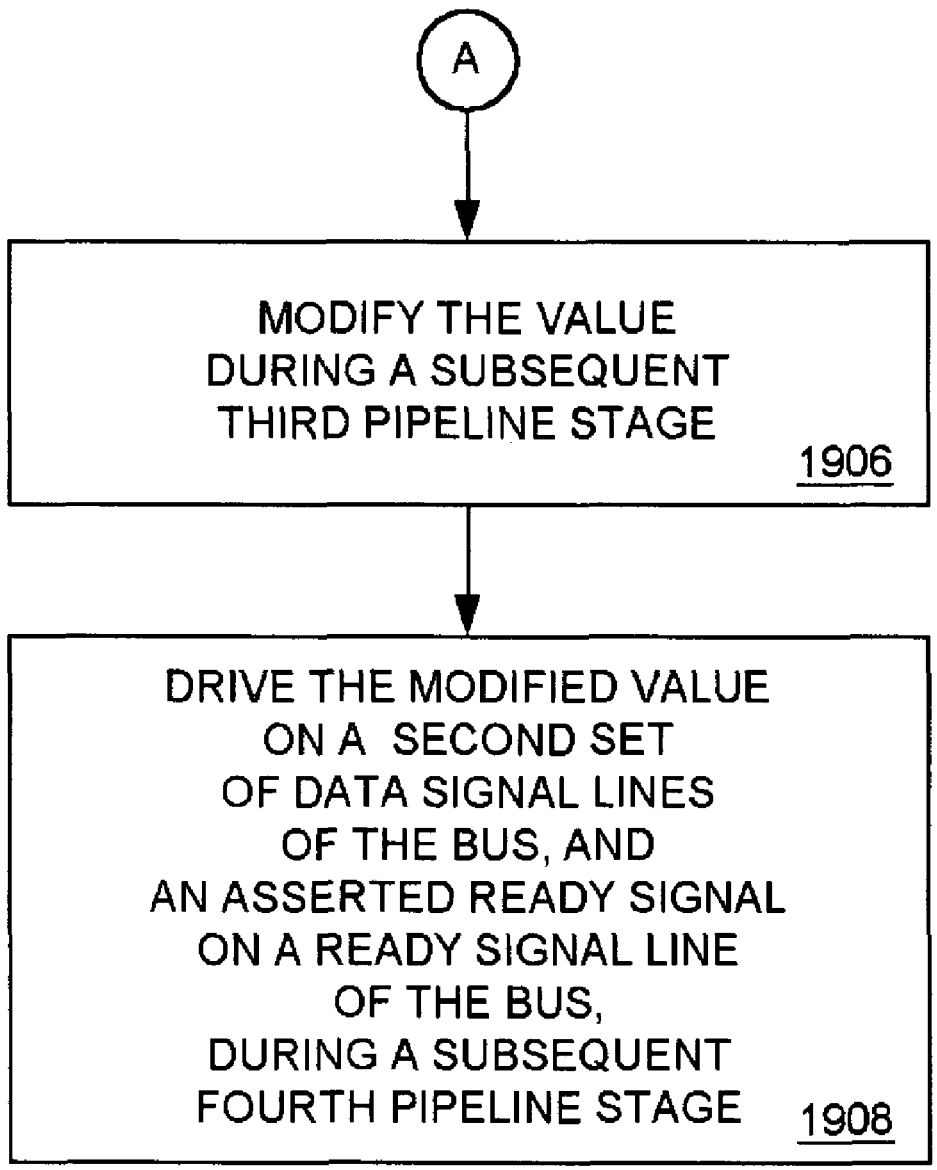

FIGS. 19A and 19B in combination form a flow chart of one embodiment of a method 1900 for modifying a value stored in an addressable register. The method 1900 may, for example, be embodied within the logic of the peripheral bus interface 206 of FIGS. 2 and 9. During a first step 1902 of the method 1900, an address of the addressable register is driven on address signal lines of a bus (e.g., the peripheral bus 204), an asserted read control signal is driven on a read control signal line of the bus, and an asserted write control signal is driven on a write control signal line of the bus during a first pipeline stage.

During a step 1904, a value driven on data signal lines of the bus is received as a value stored in the addressable register when a corresponding first ready signal driven on a ready signal line of the bus is asserted during a second pipeline stage subsequent to the first pipeline stage.

During a step 1906, the value stored in the addressable register is modified during a third pipeline stage subsequent to the second pipeline stage.

During a step 1908, the modified value is driven on data signal lines of the bus, and an asserted ready signal is driven on a ready signal line of the bus, during a fourth pipeline stage subsequent to the third pipeline stage.

Figure 20:
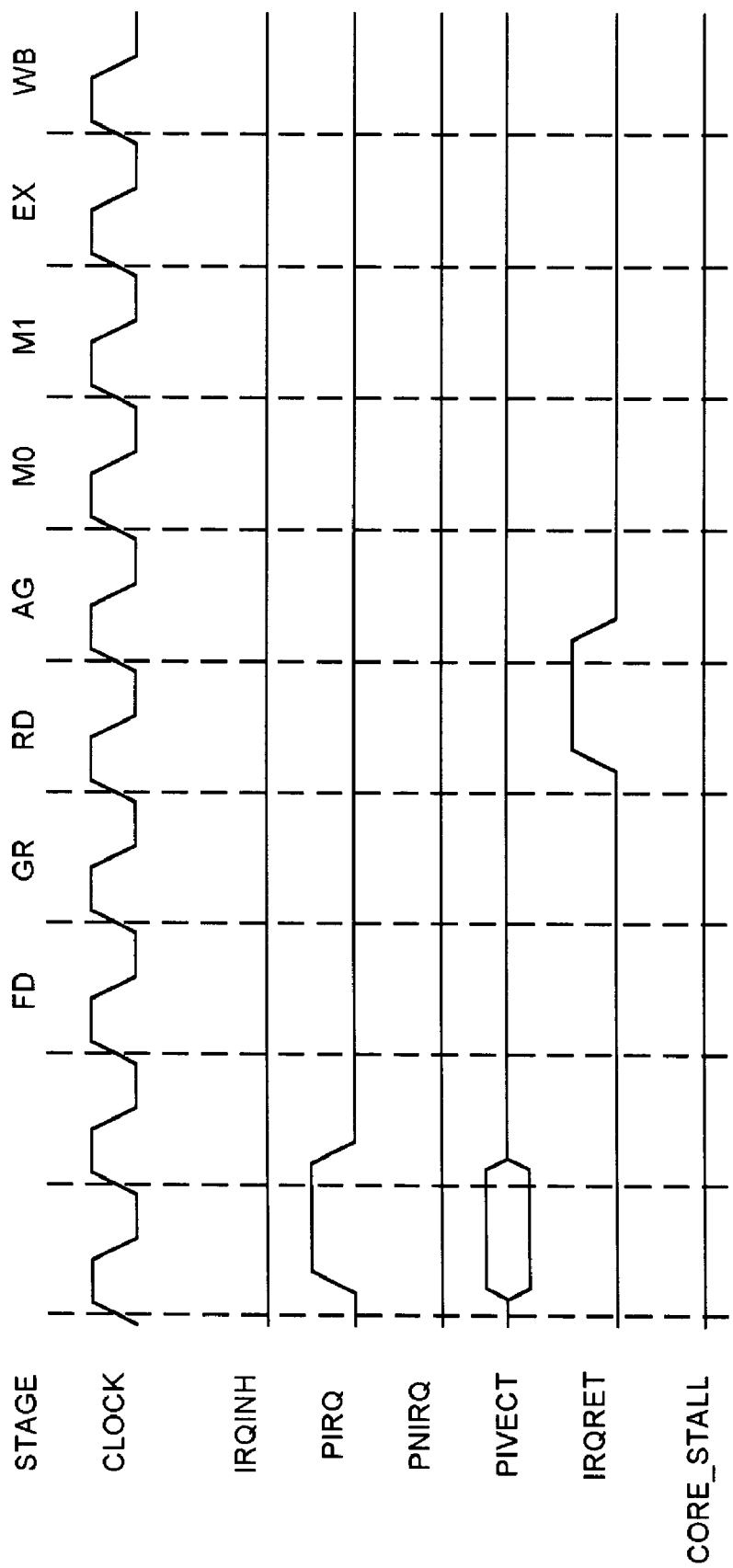
FIG. 20 is a timing diagram depicting voltages of signals driven on the peripheral bus of FIG. 2 versus time during an exemplary interrupt request.

FIG. 20 is a timing diagram depicting voltages of signals driven on the peripheral bus 204 of FIG. 2 versus time during an exemplary interrupt request. During the interrupt request of FIG. 20, the interrupt inhibit signal IRQINH is not asserted.

In FIG. 20, the asserted interrupt request signal PIRQ and the corresponding interrupt vector signal PIVECT are driven on the corresponding signal lines of the peripheral bus 204 by the interrupt control unit 400 of the peripheral system 202 of FIG. 4 during a cycle of the CLOCK signal. During the next cycle of the CLOCK signal, the logic of the instruction sequencing unit 302 of FIGS. 8 and 9 pushes the program counter onto the stack of the trap program counter (TPC) unit 802 of FIGS. 8 and 9, and stores an address of a first instruction of an interrupt service routine associated with the interrupt request in the register of the program counter (PC) unit 800 of FIGS. 8 and 9 reserved for the program counter. During the subsequent cycle of the CLOCK signal, the processor 102 starts fetching instructions of an interrupt service routine associated with the first interrupt request.

In FIG. 20, the interrupt return instruction of the interrupt service routine is grouped for execution during the grouping (GR) stage of the execution pipeline, and the interrupt return signal IRQRET is asserted by the logic of the instruction sequencing unit 302 of FIGS. 8 and 9 as described above.

During the subsequent operand read (RD) stage of the execution pipeline, the interrupt return signal IRQRET is driven on the corresponding signal line of the peripheral bus 204 by the peripheral bus interface 206 of FIG. 9 as described above. During the operand read (RD) stage, the logic of the instruction sequencing unit 302 of FIGS. 8 and 9 pops the stack of the trap program counter (TPC) unit 802 of FIGS. 8 and 9 and stores the resultant value in the register of the program counter (PC) unit 800 of FIGS. 8 and 9 reserved for the program counter as described above. This value is the address of the next instruction of the program that was interrupted by the first interrupt request. The processor 102 starts fetching and executing instructions of the interrupted program during the next cycle of the CLOCK signal.

It is noted that the timing diagrams of FIGS. 10–11, 14–15, and 18–20 reflect the embodiment of the peripheral bus interface 206 and the load/store unit 304 of FIG. 9. In the embodiment of FIG. 9, the decode logic 904 decodes the native opcodes during the operand read (RD) stage, the address generation unit 906 produces the address of the addressable register during the address generation (AG) stage, and the peripheral bus interface 206 drives the address signal PADR on the corresponding signal lines of the peripheral bus 204 during the memory read 0 (M0) stage. Other embodiments of the peripheral bus interface 206 and/or the load/store unit 304 are possible and may have different corresponding timing diagrams.

Figure 21:
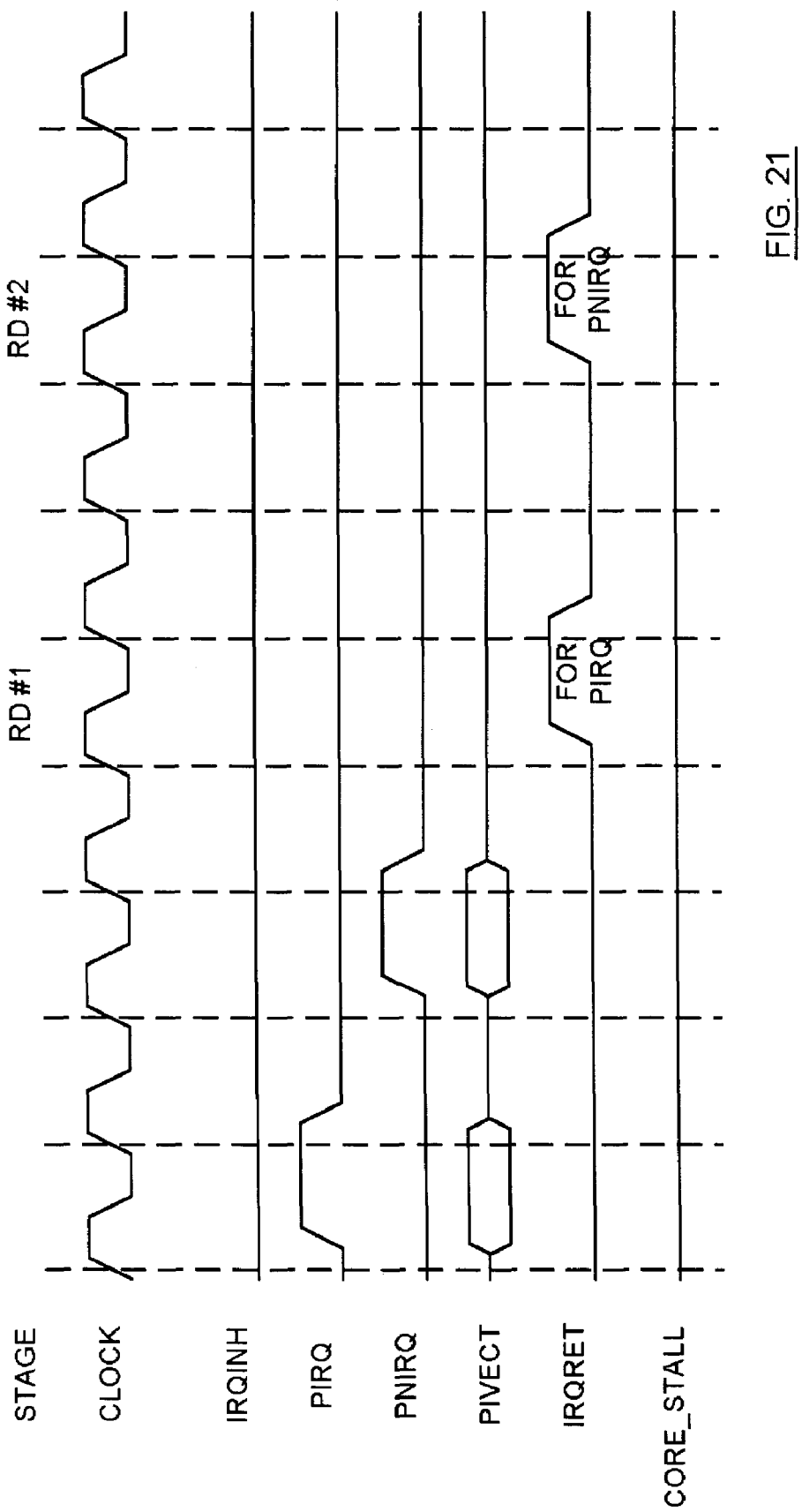
FIG. 21 is a timing diagram depicting voltages of signals driven on the peripheral bus of FIG. 2 versus time during an exemplary nested interrupt request.

FIG. 21 is a timing diagram depicting voltages of signals driven on the peripheral bus 204 of FIG. 2 versus time during an exemplary nested interrupt request. During the nested interrupt request of FIG. 21, the interrupt inhibit signal IRQINH is not asserted, and while a first interrupt request is being handled, a second interrupt request is received, wherein the first interrupt request has a higher priority than the second interrupt request;

In FIG. 21, the asserted interrupt request signal PIRQ and the corresponding interrupt vector signal PIVECT are driven on the corresponding signal lines of the peripheral bus 204 by the interrupt control unit 400 of the peripheral system 202 of FIG. 4 during a cycle of the CLOCK signal. During the next cycle of the CLOCK signal, the logic of the instruction sequencing unit 302 of FIGS. 8 and 9 pushes the program counter onto the stack of the trap program counter (TPC) unit 802 of FIGS. 8 and 9, and stores an address of a first instruction of an interrupt service routine associated with the first interrupt request in the register of the program counter (PC) unit 800 of FIGS. 8 and 9 reserved for the program counter.

During the subsequent cycle of the CLOCK signal, the processor 102 starts fetching instructions of the interrupt service routine associated with the first interrupt request. During the same cycle of the CLOCK signal, the asserted new interrupt request signal PNIRQ and the corresponding interrupt vector signal PIVECT associated with the second interrupt request are driven on the corresponding signal lines of the peripheral bus 204 by the interrupt control unit 400 of the peripheral system 202 of FIG. 4. As the second interrupt request has a lower priority than the first interrupt request, the logic of the instruction sequencing unit 302 of FIG. 8 pushes an address of a first instruction of an interrupt service routine associated with the second interrupt request on the stack of the trap program counter (TPC) unit 802 of FIGS. 8 and 9 and continues to execute the instructions of the interrupt service routine associated with the first interrupt request.

The interrupt return instruction of the interrupt service routine associated with the first interrupt request is grouped for execution during the grouping (GR) stage of the execution pipeline, and the interrupt return signal IRQRET is asserted by the logic of the instruction sequencing unit 302 of FIGS. 8 and 9 as described above. During the subsequent operand read (RD) stage of the execution pipeline, the asserted interrupt return signal IRQRET is driven on the corresponding signal line of the peripheral bus 204 by the peripheral bus interface 206 of FIG. 9. This first asserted interrupt return signal IRQRET driven on the peripheral bus 204 is associated with the interrupt signal PIRQ (i.e., with the first interrupt request) as indicated in FIG. 21.

During the operand read (RD) stage labeled "RD #1" in FIG. 21, the logic of the instruction sequencing unit 302 of FIGS. 8 and 9 pops the stack of the trap program counter (TPC) unit 802 of FIGS. 8 and 9 and stores the resultant value in the register of the program counter (PC) unit 800 of FIGS. 8 and 9 reserved for the program counter as described above. This value is the address of the first instruction of the interrupt service routine associated with the second interrupt request, and the processor 102 starts fetching and executing instructions of the interrupt service routine associated with the second interrupt request during the next cycle of the CLOCK signal.

The interrupt return instruction of the interrupt service routine associated with the first interrupt request is grouped for execution during the grouping (GR) stage of the execution pipeline, and the interrupt return signal IRQRET is asserted by the logic of the instruction sequencing unit 302 of FIGS. 8 and 9 as described above. During the subsequent operand read (RD) stage of the execution pipeline, the asserted interrupt return signal IRQRET is driven on the corresponding signal line of the peripheral bus 204 by the peripheral bus interface 206 of FIG. 9. This second asserted interrupt return signal IRQRET driven on the peripheral bus 204 is associated with the interrupt signal PNIRQ (i.e., with the second interrupt request) as indicated in FIG. 21.

During the operand read (RD) stage labeled "RD #2" in FIG. 21, the logic of the instruction sequencing unit 302 of FIGS. 8 and 9 pops the stack of the trap program counter (TPC) unit 802 of FIGS. 8 and 9 and stores the resultant value in the register of the program counter (PC) unit 800 of FIGS. 8 and 9 reserved for the program counter as described above. This value is the address of the next instruction of the program that was interrupted by the first interrupt request. The processor 102 starts fetching and executing instructions of the interrupted program during the next cycle of the CLOCK signal.

Figure 22:
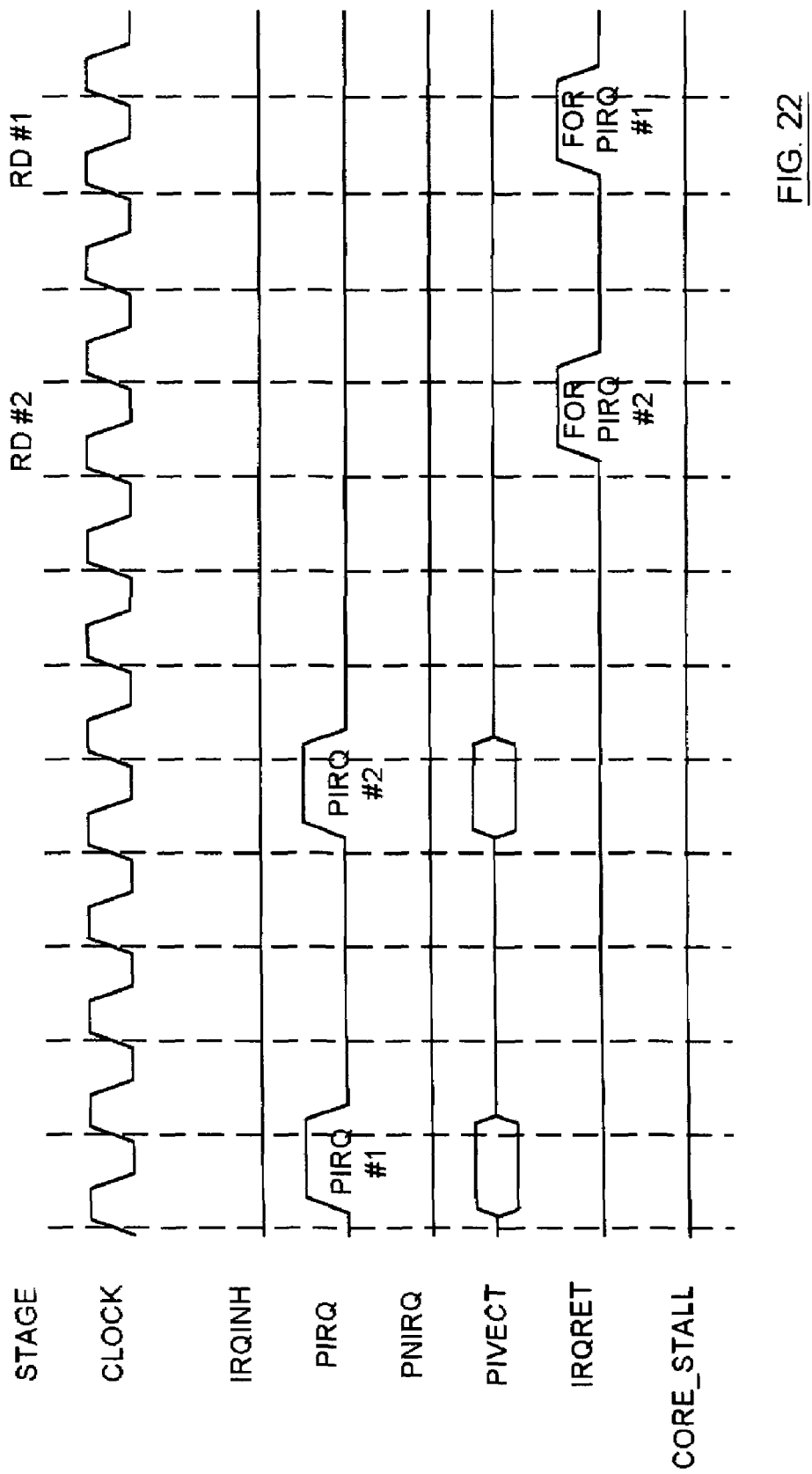
FIG. 22 is a timing diagram depicting voltages of signals driven on the peripheral bus of FIG. 2 versus time during another nested interrupt request.

FIG. 22 is a timing diagram depicting-voltages of signals driven on the peripheral bus 204 of FIG. 2 versus time during another nested interrupt request. During the nested interrupt request of FIG. 22, the interrupt inhibit signal IRQINM is not asserted, and while a first interrupt request is being handled, a second interrupt request is received, wherein the first interrupt request has a lower priority than the second interrupt request.

In FIG. 22, the asserted interrupt request signal PIRQ and the corresponding interrupt vector signal PIVECT are driven on the corresponding signal lines of the peripheral bus 204 by the interrupt control unit 400 of the peripheral system 202 of FIG. 4 during a cycle of the CLOCK signal. During the next cycle of the CLOCK signal, the logic of the instruction sequencing unit 302 of FIGS. 8 and 9 pushes the program counter onto the stack of the trap program counter (TPC) unit 802 of FIGS. 8 and 9, and stores an address of a first instruction of an interrupt service routine associated with the first interrupt request in the register of the program counter (PC) unit 800 of FIGS. 8 and 9 reserved for the program counter. During the subsequent cycle of the CLOCK signal, the processor 102 starts fetching instructions of the interrupt service routine associated with the first interrupt request.

Two cycles of the CLOCK signal later, the asserted interrupt request signal PIRQ and the corresponding interrupt vector signal PIVECT associated with the second interrupt request are driven on the corresponding signal lines of the peripheral bus 204 by the interrupt control unit 400 of the peripheral system 202 of FIG. 4. As the second interrupt request has a higher priority than the first interrupt request, the logic of the instruction sequencing unit 302 of FIG. 8 pushes an address of a next instruction of the first interrupt service routine on the stack of the trap program counter (TPC) unit 802 of FIGS. 8 and 9, and stores an address of a first instruction of an interrupt service routine associated with the second interrupt request in the register of the program counter (PC) unit 800 of FIGS. 8 and 9 reserved for the program counter. During the subsequent cycle of the CLOCK signal, the processor 102 starts fetching instructions of the interrupt service routine associated with the second interrupt request.

The interrupt return instruction of the interrupt service routine associated with the second interrupt request is grouped for execution during the grouping (GR) stage of the execution pipeline, and the interrupt return signal IRQRET is asserted by the logic of the instruction sequencing unit 302 of FIGS. 8 and 9 as described above. During the subsequent operand read (RD) stage of the execution pipeline, the asserted interrupt return signal IRQRET is driven on the corresponding signal line of the peripheral bus 204 by the peripheral bus interface 206 of FIG. 9. This first asserted interrupt return signal IRQRET driven on the peripheral bus 204 is associated with the second interrupt signal PIRQ (i.e., with the second interrupt request) as indicated in FIG. 22.

During the operand read (RD) stage labeled "RD #2" in FIG. 22, the logic of the instruction sequencing unit 302 of FIGS. 8 and 9 pops the stack of the trap program counter (TPC) unit 802 of FIGS. 8 and 9 and stores the resultant value in the register of the program counter (PC) unit 800 of FIGS. 8 and 9 reserved for the program counter as described above. This value is the address of the next instruction of the interrupt service routine associated with the first interrupt request, and the processor 102 starts fetching and executing instructions of the interrupt service routine associated with the first interrupt request again during the next cycle of the CLOCK signal.

The interrupt return instruction of the interrupt service routine associated with the first interrupt request is grouped for execution during the grouping (GR) stage of the execution pipeline, and the interrupt return signal IRQRET is asserted by the logic of the instruction sequencing unit 302 of FIGS. 8 and 9 as described above. During the subsequent operand read (RD) stage of the execution pipeline, the asserted interrupt return signal IRQRET is driven on the corresponding signal line of the peripheral bus 204 by the peripheral bus interface 206 of FIG. 9. This second asserted interrupt return signal IRQRET driven on the peripheral bus 204 is associated with the first interrupt signal PIRQ (i.e., with the first interrupt request) as indicated in FIG. 22.

During the operand read (RD) stage labeled "RD #1" in FIG. 21, the logic of the instruction sequencing unit 302 of FIGS. 8 and 9 pops the stack of the trap program counter (TPC) unit 802 of FIGS. 8 and 9 and stores the resultant value in the register of the program counter (PC) unit 800 of FIGS. 8 and 9 reserved for the program counter as described above. This value is the address of the next instruction of the program that was interrupted by the first interrupt request. The processor 102 starts fetching and executing instructions of the interrupted program during the next cycle of the CLOCK signal.

Figure 23A:
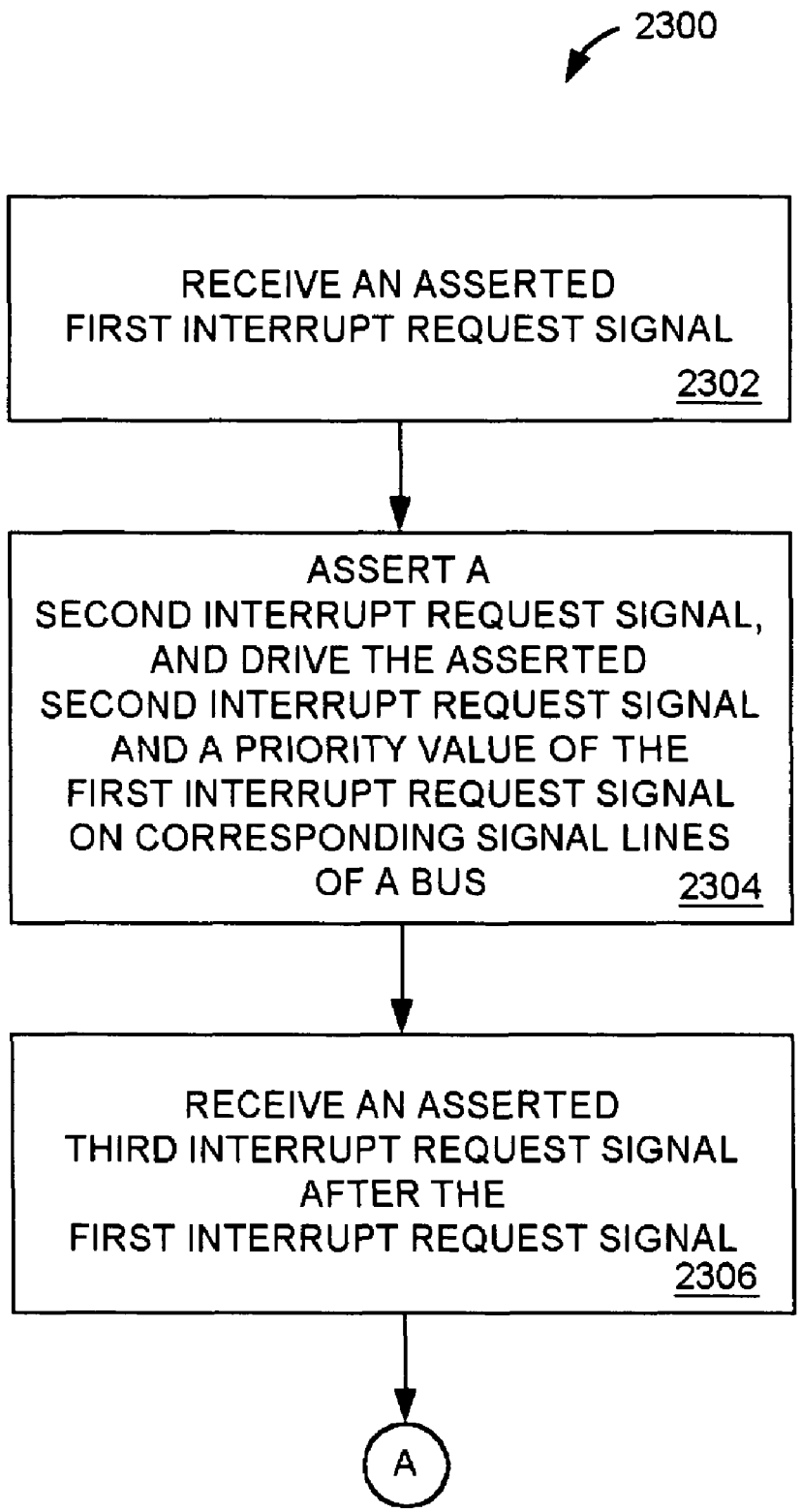
FIGS. 23A and 23B in combination form a flow of one embodiment of a method for handling an interrupt request.
Figure 23B:
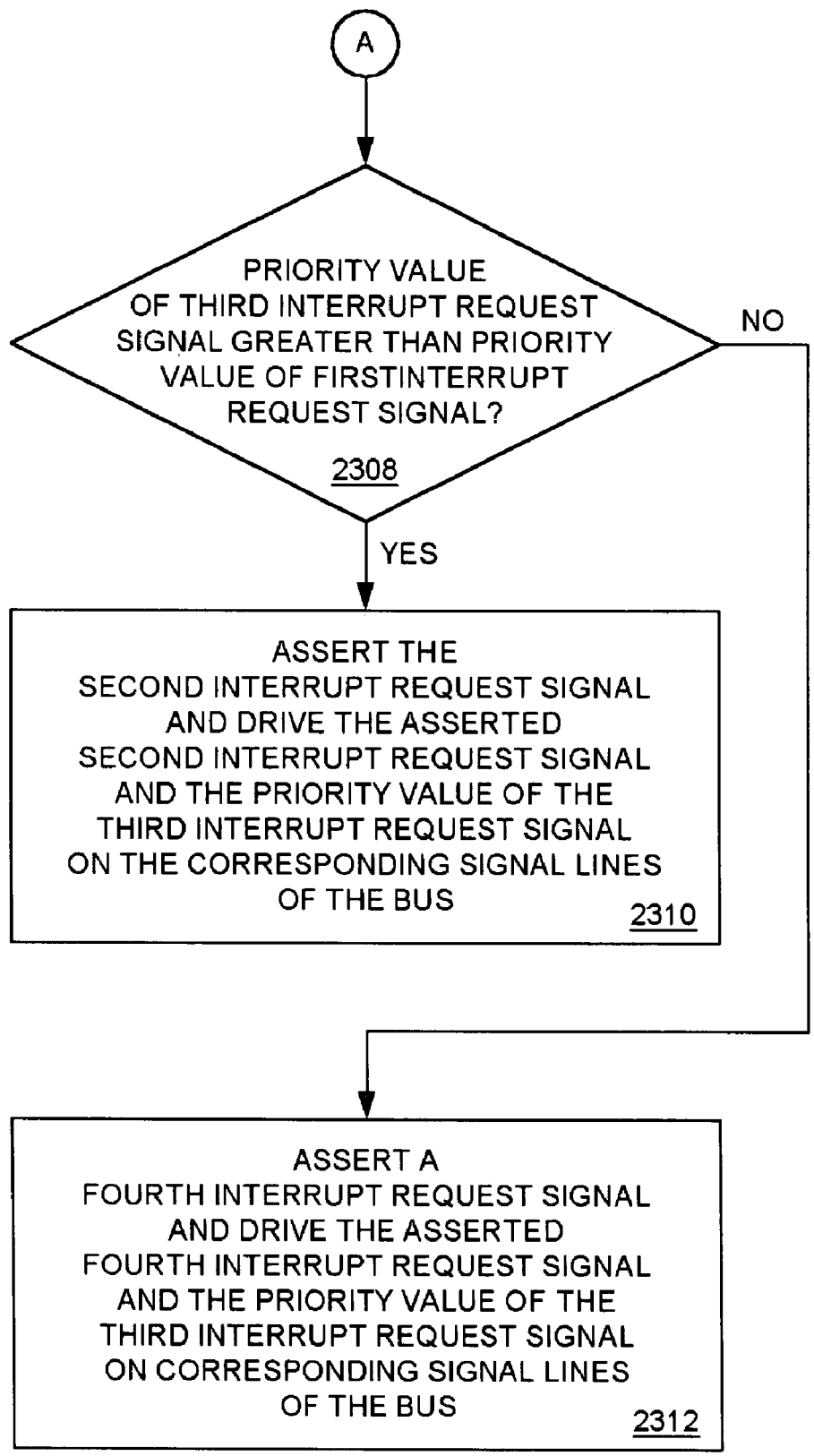

FIGS. 23A and 23B in combination form a flow of one embodiment of a method 2300 for handling an interrupt request. The method 2300 may be, for example, embodied within the interrupt control unit 400 of FIG. 4. During a first step 2302 of the method 2300, an asserted first interrupt request signal is received (e.g., from one of the peripheral devices 404 of FIG. 4). During a step 2304, a second interrupt request signal (e.g., the interrupt request signal PIRQ of FIGS. 20 22) is asserted, and the asserted second interrupt request signal and a priority value of the first interrupt request signal are driven on corresponding signal lines of a bus (e.g., the corresponding interrupt signal lines of the peripheral bus 204 of FIGS. 2–4 and 8).

During a step 2306, an asserted third interrupt request signal is received after the first interrupt request signal is received (e.g., from one of the peripheral devices 404 of FIG. 4). During a decision step 2308, a priority value of the third interrupt request signal is compared to the priority value of the first interrupt request signal. If the priority value of the third interrupt request signal is greater than that the priority value of the first interrupt request signal, a step 2310 is performed. On the other hand, if the priority value of the third interrupt request signal is less than that the priority value of the first interrupt request signal, a step 2312 is performed.

During the step 2310, the second interrupt request signal (e.g., the interrupt request signal PIRQ of FIGS. 20–22) is asserted, and the asserted second interrupt request signal and the priority value of the third interrupt request signal are driven on corresponding signal lines of the bus. (See FIG. 22 and the above description of FIG. 22.)

During the step 2312, a fourth interrupt request signal (e.g., the new interrupt request signal PNIRQ of FIGS. 20–22) is asserted, and the asserted fourth interrupt request signal and the priority value of the third interrupt request signal are driven on corresponding signal lines of the bus. (See FIG. 21 and the above description of FIG. 21.)

Figure 24:
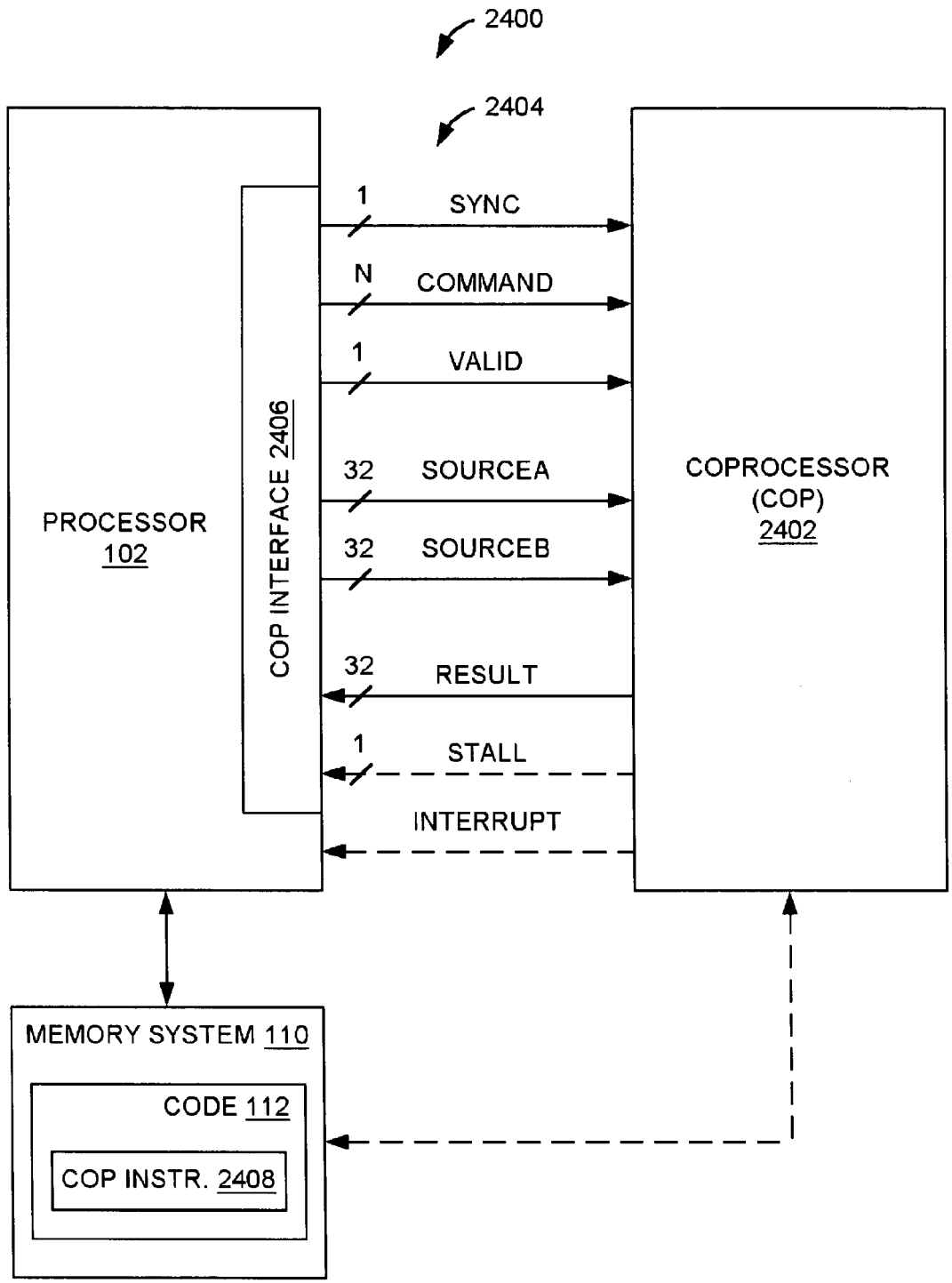
FIG. 24 is a diagram of another embodiment of the data processing system of FIG. 1 wherein the processor is coupled to a coprocessor via a coprocessor bus, and wherein the memory system stores a coprocessor instruction.

FIG. 24 is a diagram of one embodiment of a data processing system 2400, wherein the data processing system 2400 is one embodiment of the data processing system 100 of FIG. 1. In the data processing system 2400, the processor 102 is coupled to, and in communication with, a coprocessor 2402 via a coprocessor bus 2404. As indicated in FIG. 24, the processor 102 includes a coprocessor interface 2406 adapted for coupling to signal lines of the coprocessor bus 2404.

In general, the processor 102 and the coprocessor 2402 cooperate to achieve a desired result. For example, as described in detail below, the coprocessor 2402 may extend or augment a computational capability of the processor 102. Alternately, or in addition, steps of a computational algorithm may be divided among the processor 102 and the coprocessor 2402. For example, computationally demanding steps of an algorithm may be assigned to the coprocessor 2402, relieving the processor 102 of the need to perform the computationally demanding steps. In many cases, a performance of the data processing system 2400 including the processor 102 and the coprocessor 2402 exceeds a performance of the processor 102 alone.

In the embodiment of FIG. 24, the coprocessor bus 2404 includes several signal lines conveying signals between the processor 102 and the coprocessor 2402, including a 1-bit "SYNC" signal, an n-bit "COMMAND" signal (n>1), a 1-bit "VALID" signal, a 32-bit "SOURCEA" signal, a 32-bit "SOURCEB" signal, a 32-bit "RESULT" signal.

In general, the SYNC signal indicates whether the processor 102 expects the coprocessor 2402 to produce a result, and to provide the result via the RESULT signal, within a certain amount of time. The n-bit COMMAND signal specifies an n-bit, user-defined command, and is provided by the processor 102 and the coprocessor 2402. The user-defined command includes multiple ordered bits, wherein the values of the bits are assigned by a user. In general, the coprocessor 2402 is configured to interpret the user-defined command specified by the n-bit COMMAND signal, and to perform a corresponding function. Performance of the corresponding function may, for example, produce the result.

The VALID signal indicates whether the n-bit COMMAND signal is valid. The 32-bit SOURCEA and SOURCEB signals convey data from the processor 102 to the coprocessor 2402. For example, in response to a valid n-bit COMMAND signal, the coprocessor 2402 may perform a function on data conveyed by the 32-bit SOURCEA and SOURCEB signals, thereby producing a result. The RESULT signal is used to convey a result produced by the coprocessor 2402 to the processor 102.

In the embodiment of FIG. 24, the coprocessor interface 2406 of the processor 102 generates the SYNC signal, the n-bit COMMAND signal, the VALID signal, and the SOURCEA and SOURCEB signals, and receives the RESULT signal from the coprocessor 2402.

As indicated in FIG. 24, the coprocessor 2402 may also produce a 1-bit "STALL" signal received by the processor 102. The coprocessor 2402 may assert the STALL signal when a previous SYNC signal indicated the processor 102 expects the coprocessor 2402 to provide a result via the RESULT signal within a certain amount of time, and the coprocessor 2402 is not able to provide the result within the allotted amount of time. In this situation, the coprocessor 2402 may continue to assert the STALL signal until the result is produced. As indicated in FIG. 24, the processor 102 receives the STALL signal via the coprocessor interface 2406.

In the embodiment of FIG. 24, the processor 102 is coupled to the memory system 110. As described above, in general, the processor 102 fetches and executes instructions of a predefined instruction set stored in the memory system 110. As illustrated in FIG. 24, the memory system 110 includes a software program (i.e., code) 112 including instructions from the instruction set. The code 112 includes a coprocessor (COP) instruction 2408 of the instruction set.

As described in detail below, the coprocessor instruction 2408 includes a user-defined command directed to the coprocessor 2402. The user-defined command includes multiple ordered bits having values assigned by the user. During execution of the coprocessor instruction 2408, the processor 102 provides the user-defined command to the coprocessor 2402. In response to the user-defined command, the coprocessor 2402 performs a predetermined function.

In "tightly coupled" embodiments of the data processing system 2400, the coprocessor 2402 may depend on the processor 102 to access the memory system 110 and to provide data from the memory system 110 to the coprocessor 2402. In other "loosely coupled" embodiments of the data processing system 2400, the coprocessor 2402 may be coupled to the memory system 110 as indicated in FIG. 24, and may access the memory system 110 directly.

In the loosely coupled embodiments of the data processing system 2400, the processor 102 typically does not expect the coprocessor 2402 to produce a result within a certain amount of time. In this situation, the coprocessor 2402 may assert an "INTERRUPT" signal when the coprocessor 2402 to produces the result. In response to the INTERRUPT signal, the processor 102 may obtain the result from the coprocessor 2402 (e.g., via the RESULT signal) as described in detail below.

The processor 102 may be, for example, one of several functional blocks or units (i.e., "cores") formed on an integrated circuit. It is now possible for integrated circuit designers to take highly complex functional units or blocks, such as processors, and integrate them into an integrated circuit much like other less complex building blocks.

Figure 25:
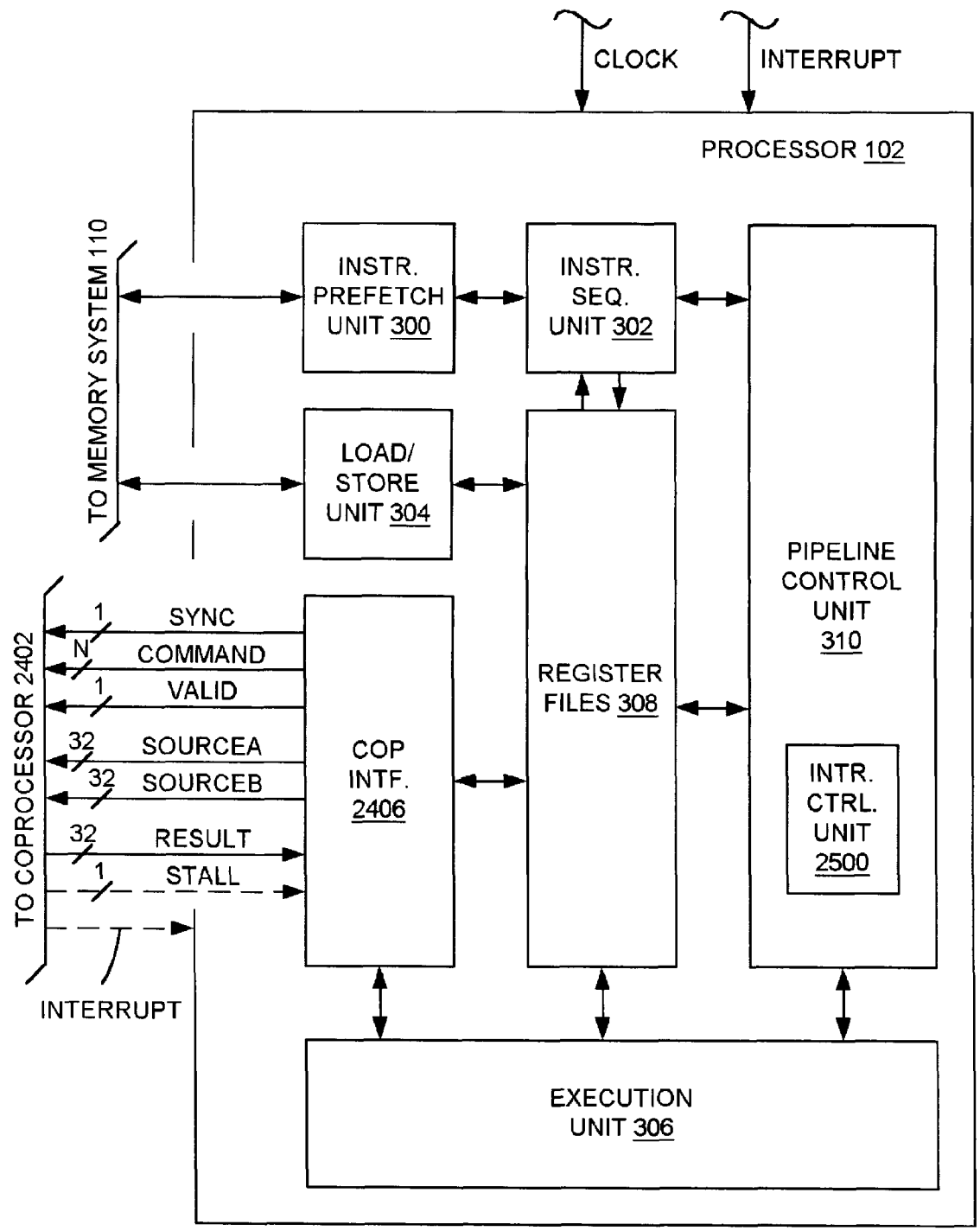
FIG. 25 is a diagram of one embodiment of the processor of FIG. 24.

FIG. 25 is a diagram of one embodiment of the processor 102 of FIG. 24. As indicated in FIG. 2, the processor 102 receives the above described clock signal CLOCK and executes instructions dependent upon the CLOCK signal. Mores specifically, the processor 102 includes several functional units described below, and operations performed within the functional units are synchronized by the CLOCK signal. The processor 102 also receives other interrupt signals (e.g., from devices other than the coprocessor 2402).

In the embodiment of FIG. 25, in addition to the coprocessor interface 2406 of FIG. 24, the processor 102 includes the following functional units shown in FIG. 3 and described above: the instruction prefetch unit 300, the instruction sequencing unit 302, the load/store unit (LSU) 304, the execution unit 306, the register files 308, and the pipeline control unit 310.

In the embodiment of FIG. 25, the processor 102 is a pipelined superscalar processor core. That is, the processor 102 implements the instruction execution pipeline of FIG. 6 and described above. The instruction execution pipeline of FIG. 6 includes multiple pipeline stages, concurrently executes multiple instructions in different pipeline stages, and is also capable of concurrently executing multiple instructions in the same pipeline stage.

In general, as described above, the pipeline control unit 310 controls the instruction execution pipeline. In the embodiment of FIG. 25, the pipeline control unit 310 includes an interrupt control unit 2500. The interrupt control unit 2500 receives the INTERRUPT signal from the coprocessor 2402 of FIG. 24, and interrupt signals from other devices as indicated in FIG. 25.

In general, the interrupt control unit 2500 implements a vectored priority interrupt system in which higher priority interrupts are handled (i.e., serviced) first. A non-maskable interrupt (NMI) signal has the highest priority of all the interrupt signals. In one embodiment, the interrupt control unit 2500 includes a 16-bit interrupt request register having bit locations corresponding to 2 non-maskable interrupt signals and 14 maskable interrupt bit locations. The 2 non-maskable interrupt signals include the NMI signal and a device emulation interrupt (DEI) signal. When an interrupt signal is received, the corresponding bit location in the interrupt request register is set to '1'. Each bit location in the interrupt request register is cleared only when the processor 102 services the corresponding interrupt signal, or explicitly by software.

In one embodiment, the interrupt control unit 2500 also includes an interrupt mask register containing mask bit locations for each of the 14 maskable interrupts. A mask bit value of '0' (i.e., a cleared bit) prevents the corresponding interrupt from being serviced (i.e., masks the corresponding interrupt signal). The INTERRUPT signal may be one of the 14 maskable interrupt signals.

In one embodiment, the interrupt control unit 2500 also includes two 16-bit interrupt priority registers. Consecutive bit locations in each of the interrupt priority registers are used to store user-defined priority levels associated with the 14 maskable interrupt signals. Software programs may write to the bit locations of the interrupt priority registers. User-defined interrupt priorities may range from 0b00 (i.e., decimal '0') to 0b11 (i.e., decimal '3'), with 0b00 being the lowest and 0b11 being the highest. (The NMI signal has a fixed priority level of decimal '5', and the DEI signal has a fixed priority level of decimal '4'.)

Once the interrupt control unit 2500 decides to service an interrupt, the interrupt control unit 2500 signals the instruction sequencing unit 302 of FIG. 25 to stop grouping instructions in the grouping (GR) stage of the execution pipeline. Instructions fetched and partially decoded up to and including those in the grouping (GR) stage are flushed. Executions of instructions in the operand read (RD) stage, the address generation (AG) stage, the memory access 0 (M0) stage, the memory access 1 (M1) stage, and the execution (EX) stage are completed normally before instructions of the service routine are fetched and executed.

In one embodiment, the instruction set executable by the processor 102 of FIG. 24 includes two special types of instructions facilitating communication between the processor 102 and the coprocessor 2402: a "CPCOM" instructions and "CPOUT" instructions. The coprocessor instruction 2408 of FIG. 24 may be, for example, a. CPCOM instruction or a CPOUT instruction. In general, the CPCOM instructions are used to obtain a result from the coprocessor 2402 via the RESULT signal within a certain amount of time. More specifically, the CPCOM instructions are used to obtain a result from the coprocessor 2402 via the RESULT signal during pipeline execution of the CPCOM instruction as described in more detail below. Certain CPCOM instructions described below may be used to both provide data to the coprocessor 2402 via the SOURCEA and SOURCEB signals, and to obtain a result from the coprocessor 2402 via the RESULT signal during pipeline execution of the CPCOM instruction.

The CPOUT instructions, on the other hand, are generally used to provide data to the coprocessor 2402 of FIG. 24 via the SOURCEA and SOURCEB signals of FIGS. 24 and 25. The CPOUT instructions might be used, for example, in a loosely-coupled embodiment of the data processing system 2400 of FIG. 24. As described above, in such loosely coupled embodiments, the coprocessor 2402 may assert the INTERRUPT signal of FIGS. 24 and 25 when the coprocessor 2402 produces the result. In response to the INTERRUPT signal, the interrupt control unit 2500 of FIG. 25 may initiate execution of a corresponding interrupt service routine within the processor 102 of FIGS. 24 and 25. The interrupt service routine may include a CPCOM instruction that obtains the result from the coprocessor 2402 via the RESULT signal.

FIGS. 26A–27C illustrate exemplary embodiments of the coprocessor instruction 2408 of FIG. 24, wherein the coprocessor instruction 2408 is a CPCOM instruction or a CPOUT instruction. In the embodiments of FIGS. 26A–27C, the register files 308 of FIG. 25 includes an address register file and a general purpose register file. The address register file includes 8 32-bit address registers, and the general purpose register file includes 16 16-bit general purpose registers. The 16 16-bit registers of the general purpose register file can be paired to form 8 32-bit general purpose registers. Each of the 16 16-bit general purpose registers can be specified using 3 bits, and each of the 8 32-bit address registers and the 8 32-bit general purpose registers can be specified using 3 bits.

Figure 26A:
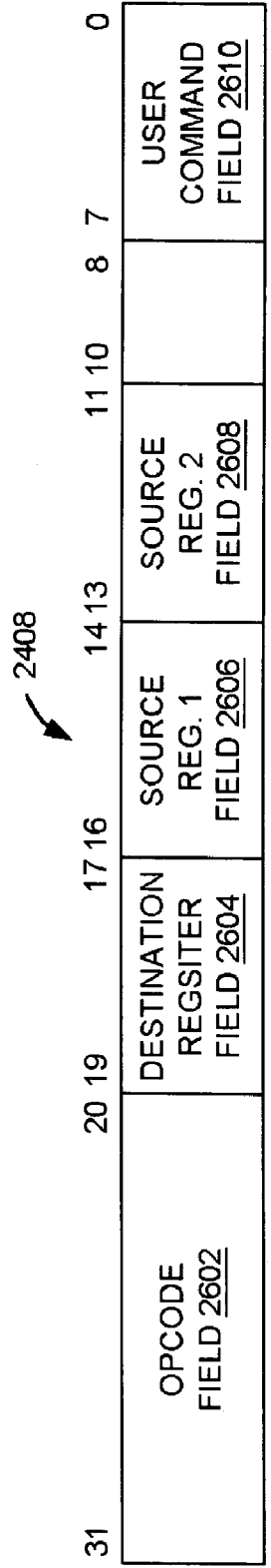

FIG. 26A is a diagram of one embodiment of the coprocessor instruction 2408 of FIG. 24, wherein the coprocessor instruction 2408 is a CPCOM instruction. In the embodiment of FIG. 26A, the coprocessor instruction 2408 includes an opcode field 2602, a destination register field 2604, a source register 1 field 2606, a source register 2 field 2608, and an 8-bit user command field 2610.

The opcode field 2602 contains a value identifying the instruction as a CPCOM instruction, and specifying the particular embodiment of the coprocessor instruction 2408 of FIG. 26A. The destination register field 2604 specifies a register of the register files 308 of FIG. 25 into which a result produced by the coprocessor 2402 of FIG. 24 and conveyed by the RESULT signal is to be saved.

The source register 1 field 2606 specifies a register of the register files 308 of FIG. 25 containing data to be sent to the coprocessor 2402 of FIG. 24 via the SOURCEA signal. The source register 2 field 2608 specifies another register of the register files 308 containing data to be sent to the coprocessor 2402 via the SOURCEB signal.

The 8-bit user command field 2610 is used to hold an 8-bit, user-defined command to be sent to the coprocessor 2402 via the COMMAND signal of FIGS. 24 and 25 (n=8). In the embodiment of FIG. 26A, the user-defined command includes 8 ordered bits, the values of which are assigned by the user. During execution of the coprocessor instruction 2408 of FIG. 26A by the processor 102 of FIG. 24, the coprocessor interface 2406 of FIG. 24 drives the 8 bits of the user command field 2610 on 8 corresponding signal lines conveying the COMMAND signal from the processor 102 to the coprocessor 2402.

Figure 26B:
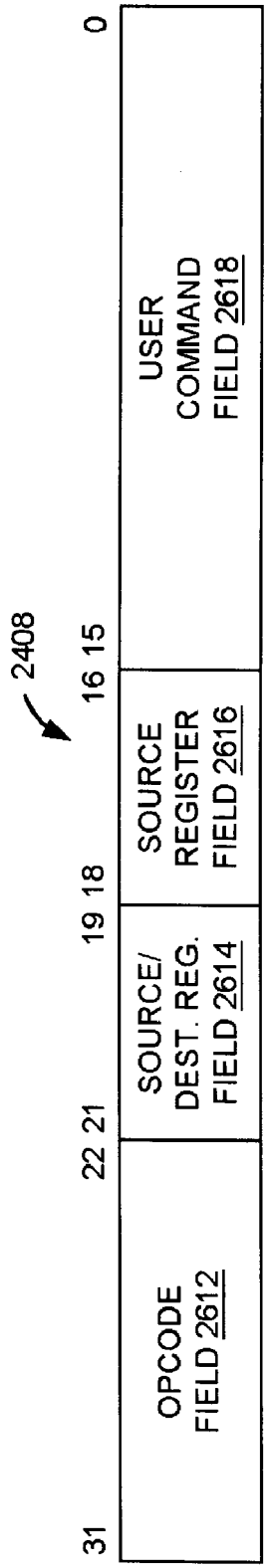

FIG. 26B is a diagram of another embodiment of the coprocessor instruction 2408 of FIG. 24, wherein the coprocessor instruction 2408 is a CPCOM instruction. In the embodiment of FIG. 26B, the coprocessor instruction 2408 includes an opcode field 2612, a source/destination register field 2614, a source register field 2616, and a 16-bit user command field 2618.

The opcode field 2612 contains a value identifying the instruction as a CPCOM instruction, and specifying the particular embodiment of the coprocessor instruction 2408 FIG. 26B. The source/destination register field 2614 both: (i) specifies a register of the register files 308 of FIG. 25 containing data to be sent to the coprocessor 2402 of FIG. 24 via the SOURCEA signal, and (ii) specifies a register of the register files 308 of FIG. 25 into which a result produced by the coprocessor 2402 of FIG. 24 and conveyed by the RESULT signal is to be saved. The source register field 2616 specifies another register of the register files 308 containing data to be sent to the coprocessor 2402 via the SOURCEB signal.

The 16-bit user command field 2618 is used to hold 16-bit, user-defined command to be sent to the coprocessor 2402 via the COMMAND signal of FIGS. 24 and 25 (n=16). In the embodiment of FIG. 26B, the user-defined command includes 16 ordered bits, the values of which are assigned by the user. During execution of the coprocessor instruction 2408 of FIG. 26B by the processor 102 of FIG. 24, the coprocessor interface 2406 of FIG. 24 drives the 16 bits of the user command field 2618 on 16 corresponding signal lines conveying the COMMAND signal from the processor 102 to the coprocessor 2402.

Figure 26C:
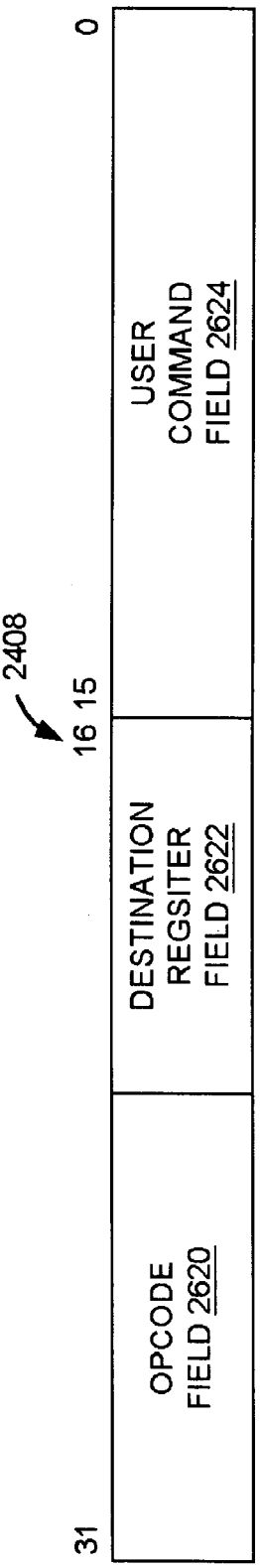

FIG. 26C is a diagram of a third embodiment of the coprocessor instruction 2408 of FIG. 24, wherein the coprocessor instruction 2408 is a CPCOM instruction. In the embodiment of FIG. 26C, the coprocessor instruction 2408 includes an opcode field 2620, a destination register field 2622, and a 16-bit user command field 2624. The coprocessor instruction 2408 of FIG. 26C is used to obtain a result from the coprocessor 2402 of FIG. 24 via the RESULT signal.

The opcode field 2620 contains a value identifying the instruction as a CPCOM instruction, and specifying the particular embodiment of the coprocessor instruction 2408 FIG. 26C. The destination register field 2622 specifies a register of the register files 308 of FIG. 25 into which a result produced by the coprocessor 2402 of FIG. 24 and conveyed by the RESULT signal is to be saved.

The 16-bit user command field 2624 is used to hold a 16-bit, user-defined command to be sent to the coprocessor 2402 via the COMMAND signal of FIGS. 24 and 25 (n=16). In the embodiment of FIG. 26C, the user-defined command includes 16 ordered bits, the values of which are assigned by the user. During execution of the coprocessor instruction 2408 of FIG. 26C by the processor 102 of FIG. 24, the coprocessor interface 2406 of FIG. 24 drives the 16 bits of the user command field 2624 on 16 corresponding signal lines conveying the COMMAND signal from the processor 102 to the coprocessor 2402.

FIG. 27A is a diagram of one embodiment of the coprocessor instruction 2408 of FIG. 24, wherein the coprocessor instruction 2408 is a CPOUT instruction. In the embodiment of FIG. 27A, the coprocessor instruction 2408 includes an opcode field 2702, a source register 1 field 2704, a source register 2 field 2706, and a 16-bit user command field 2708.

The opcode field 2702 contains a value identifying the instruction as a CPOUT instruction, and specifying the particular embodiment of the coprocessor instruction 2408 FIG. 27A. The source register 1 field 2704 specifies a register of the register files 308 of FIG. 25 containing data to be sent to the coprocessor 2402 of FIG. 24 via the SOURCEA signal. The source register 2 field 2706 specifies another register of the register files 308 containing data to be sent to the coprocessor 2402 via the SOURCEB signal.

The 16-bit user command field 2708 is used to hold an 16-bit, user-defined command to be sent to the coprocessor 2402 via the COMMAND signal of FIGS. 24 and 25 (n=16). In the embodiment of FIG. 27A, the user-defined command includes 16 ordered bits, the values of which are assigned by the user. During execution of the coprocessor instruction 2408 of FIG. 27A by the processor 102 of FIG. 24, the coprocessor interface 2406 of FIG. 24 drives the 16 bits of the user command field 2708 on 16 corresponding signal lines conveying the COMMAND signal from the processor 102 to the coprocessor 2402.

FIG. 27B is a diagram of another embodiment of the coprocessor instruction 2408 of FIG. 24, wherein the coprocessor instruction 2408 is a CPOUT instruction. In the embodiment of FIG. 27B, the coprocessor instruction 2408 includes an opcode field 2710, a source register field 2712, and a 16-bit user command field 2714.

The opcode field 2710 contains a value identifying the instruction as a CPOUT instruction, and specifying the particular embodiment of the coprocessor instruction 2408 FIG. 27B. The source register field 2712 specifies a register of the register files 308 containing data to be sent to the coprocessor 2402 via the SOURCEA signal.

The 16-bit user command field 2714 is used to hold a 16-bit, user-defined command to be sent to the coprocessor 2402 via the COMMAND signal of FIGS. 24 and 25 (n=16). In the embodiment of FIG. 27B, the user-defined command includes 8 ordered bits, the values of which are assigned by the user. During execution of the coprocessor instruction 2408 of FIG. 27B by the processor 102 of FIG. 24, the coprocessor interface 2406 of FIG. 24 drives the 16 bits of the user command field 2714 on 16 corresponding signal lines conveying the COMMAND signal from the processor 102 to the coprocessor 2402.

FIG. 27C is a diagram of a third embodiment of the coprocessor instruction 2408 of FIG. 24, wherein the coprocessor instruction 2408 is a CPOUT instruction. In the embodiment of FIG. 27C, the coprocessor instruction 2408 includes an opcode field 2716 and a 16-bit user command field 2718. The coprocessor instruction 2408 of FIG. 27C is used to send a user-defined command to the coprocessor 2402 of FIG. 24 via the COMMAND signal of FIGS. 24 and 25.

The opcode field 2716 contains a value identifying the instruction as a CPOUT instruction, and specifying the particular embodiment of the coprocessor instruction 2408 FIG. 27C. The 16-bit user command field 2718 is used to hold a 16-bit, user-defined command to be sent to the coprocessor 2402 via the COMMAND signal of FIGS. 24 and 25 (n=16). In the embodiment of FIG. 27C, the user-defined command includes 16 ordered bits, the values of which are assigned by the user. During execution of the coprocessor instruction 2408 of FIG. 27C by the processor 102 of FIG. 24, the coprocessor interface 2406 of FIG. 24 drives the 16 bits of the user command field 2718 on 16 corresponding signal lines conveying the COMMAND signal from the processor 102 to the coprocessor 2402.

Figure 28:
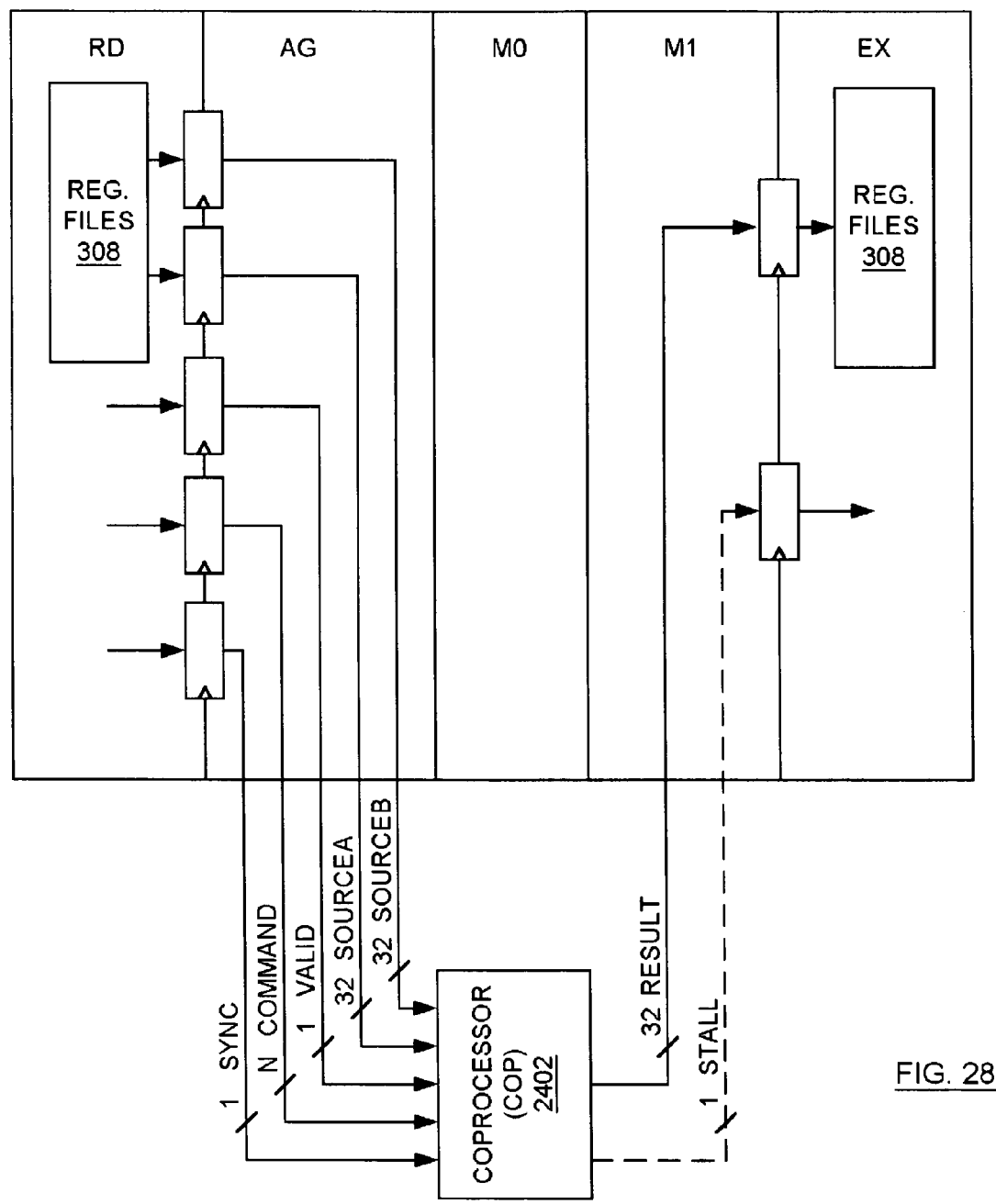
FIG. 28 is a diagram illustrating how operations of the coprocessor of FIG. 24 are synchronized with operations of the processor of FIGS. 24 and 25 during execution of the coprocessor instruction of FIG. 24.

FIG. 28 is a diagram illustrating how operations of the coprocessor 2402 are synchronized with operations of the processor 102 of FIGS. 24 and 25 during execution of the coprocessor instruction 2408 of FIG. 24. The execution pipeline of the processor 102, shown in FIG. 6 and described above, includes the operand read (RD), the address generation (AG), the memory address 0 (M0), the memory address 1 (M1), and the execution (EX) stages illustrated in FIG. 6.

As indicated in FIG. 28, when the coprocessor instruction 2408 provides data to the coprocessor 2402, values stored in registers of the register files 308 of FIG. 25 specified by source register fields of the coprocessor instruction 2408 are obtained during the operand read (RD) pipeline stage, and used to generate the SOURCEA and SOURCEB signals. The SYNC, COMMAND, and VALID signals are also generated during the operand read (RD) pipeline stage. The 1-bit SYNC signals specifies whether the coprocessor instruction 2408 is a CPCOM instruction or a CPOUT instruction.

At the end of the operand read (RD) stage, the generated SOURCEA, SOURCEB, SYNC, COMMAND, and VALID signals are stored in registers (i.e., "registered") as indicated in FIG. 28, and provided to the coprocessor 2402 at the beginning of the address generation (AG) stage.

When the coprocessor instruction 2408 of FIG. 24 is a CPCOM instruction, the coprocessor 2402 is expected to generate the RESULT signal before or during the memory address 1 (M1) stage. At the end of the memory address 1 (M1) stage, the RESULT signal produced by the coprocessor 2402 is registered as indicated in FIG. 28, and provided to other logic within the processor 102 at the beginning of the execution (EX) stage. During the execution (EX) stage, the processor 102 stores the result value conveyed by the RESULT signal in a register of the register files 308 of FIG. 25 specified by the destination register field of the coprocessor instruction 2408 (i.e., of the CPCOM instruction).

When the coprocessor 2402 is expected to generate the RESULT signal before or during the memory address 1 (M1) stage and is not able to do so, the coprocessor 2402 may assert the STALL signal. In response to the STALL signal, the execution pipeline of the processor 102 is stalled (e.g., by the pipeline control unit 310 of FIG. 25). The coprocessor 2402 may continue to assert the STALL signal until the coprocessor 2402 is able to generate the RESULT signal. When the coprocessor 2402 deasserts the STALL signal, the execution pipeline is resumed (e.g., by the pipeline control unit 310), and the processor 102 stores the result value conveyed by the RESULT signal in the register of the register files 308 of FIG. 25 specified by the destination register field of the coprocessor instruction 2408 of FIG. 24 (i.e., of the CPCOM instruction).

Figure 29:
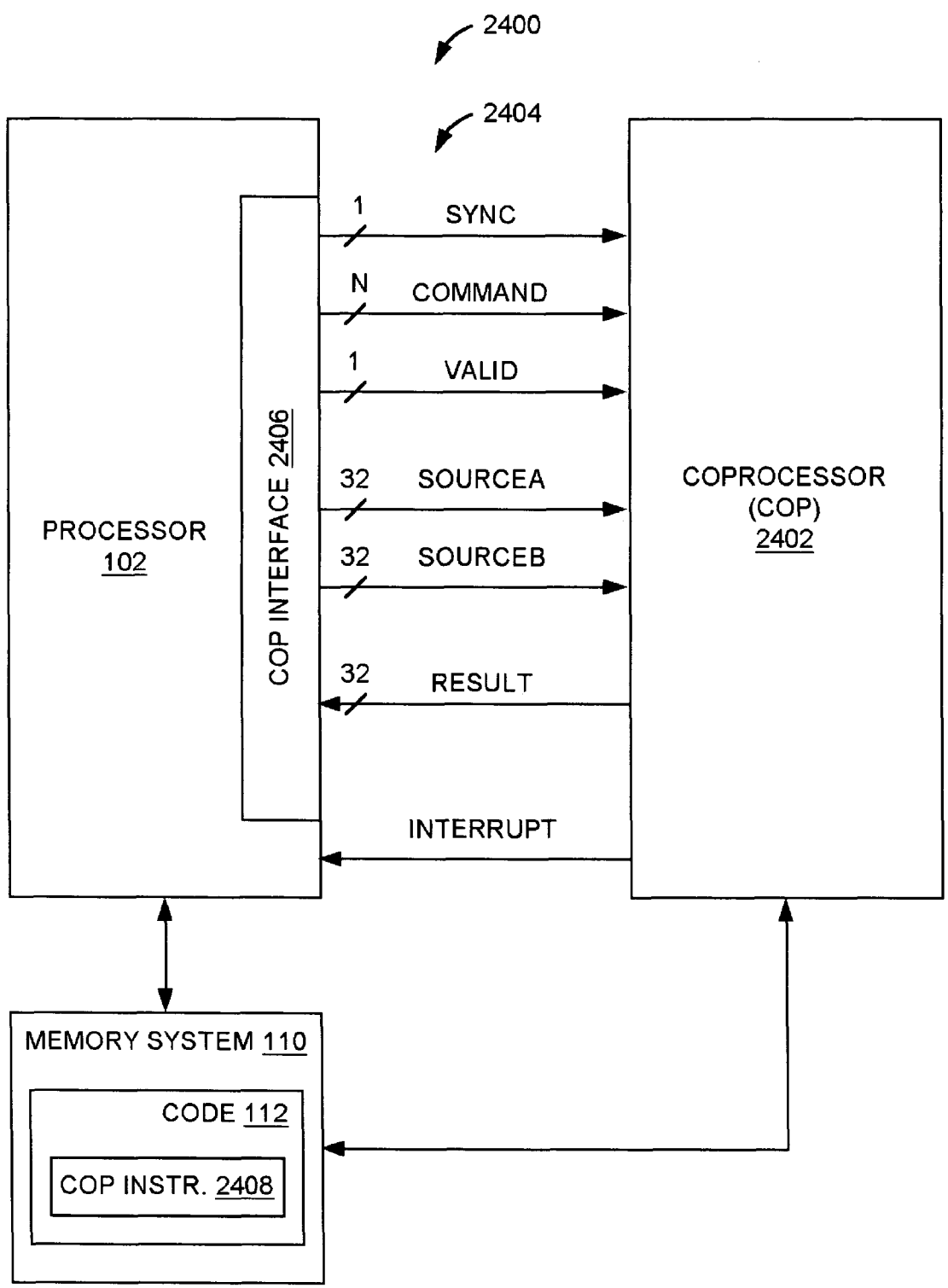
FIG. 29 is a diagram of one embodiment of the data processing system of FIG. 24 wherein the processor and the coprocessor are loosely coupled.

FIG. 29 is a diagram of one embodiment of the data processing system 2400 of FIG. 24 wherein the processor 102 and the coprocessor 2402 are loosely coupled. In the embodiment of FIG. 29, the coprocessor 2402 accesses the memory system 110 directly.

In the embodiment of FIG. 29, the processor 102 executes a software application program wherein the coprocessor instruction 2408 is a CPOUT instruction. The coprocessor instruction 2408 (i.e., the CPOUT instruction) causes the processor 102 to provide a command and/or data to the coprocessor 2402 via the COMMAND and SOURCEA and SOURCEB signals. In general, the processor 102 does not expect the coprocessor 2402 to produce a result, and to generate the RESULT signal, within a certain amount of time.

In the embodiment of FIG. 29, when the coprocessor 2402 produces a result, the coprocessor 2402 asserts the INTERRUPT signal. In response to the INTERRUPT signal, the interrupt control unit 2500 of FIG. 25 initiates execution of a corresponding interrupt service routine within the processor 102. The interrupt service routine includes a CPCOM instruction that obtains the result from the coprocessor 2402 via the RESULT signal. It is noted that in the loosely-coupled embodiment of FIG. 29, the STALL signal of FIGS. 24, 25, and 28 is not used.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What we claim as our invention is:

1. A processor having a bus interface, the processor configured to execute an instruction comprising a user-defined value and to provide the user-defined value during execution of the instruction, wherein the user-defined value is either an address or a command, and the bus interface has an input bus adapted to receive input data from a peripheral device and an output bus adapted to provide output data to the peripheral device: and
   a dedicated bit manipulation unit coupled between the input bus and the output bus, wherein the dedicated bit manipulation unit is adapted to receive the input data at an earlier stage of an instruction execution pipeline, perform a bit manipulation operation on the input data, and provide manipulated data to the output bus at a later stage of the instruction execution pipeline.

2. The processor as recited in claim 1, wherein the user-defined value comprises a plurality of ordered bits, and wherein values of the bits are assigned by a user.

3. The processor as recited in claim 1, wherein the processor comprises a bus interface adapted far coupling to a bus having a plurality of signal lines, and wherein the processor is configured to drive the user-defined value upon at least one signal line of the bus during execution of the instruction.

4. The processor as recited in claim 1, wherein the user-defined value is an address of an addressable register.

5. The processor as recited in claim 4, wherein the addressable register is accessed in response to the user-defined value.

6. The processor as recited in claim 1, wherein the processor is configured to provide the user-defined value, data corresponding to the user-defined value, and an asserted write control signal during execution of the instruction, and wherein the data is stored in the addressable register in response to the user-defined value, the data corresponding to the user-defined value, and the asserted write control signal.

7. The processor as recited in claim 1, wherein the user-defined value is a command having a corresponding predetermined function.

8. The processor as recited in claim 7, wherein the predetermined function corresponding to the command is performed in response to the user-defined value.

9. The processor as recited in claim 7, wherein the predetermined function produces a result and wherein the processor is configured to receive the result.

10. The processor as recited in claim 9, wherein the processor is configured to provide the user-defined value and data corresponding to the user-defined value during execution of the instructions and wherein the predetermined function uses the data to produce the result.

11. The processor as recited in claim 9, wherein the result is generated during execution of the instruction.

12. The processor as recited in claim 9, wherein the processor is configured to receive the result during execution of the instruction.

13. The processor as recited in claim 12, wherein the processor is configured to execute the instruction via a plurality of pipeline stages performed in sequence, and wherein the processor is configured to provide the user-defined value during a first one of the pipeline stages.

14. The processor as recited in claim 13, wherein the processor is configured to receive the result during a second one of the pipeline stages.

15. A processor, comprising:
a bus interface adapted for coupling to a bus having a plurality of signal lines, wherein:
the processor is configured to execute an instruction comprising a user-defined address, and to drive the user-defined address upon at least one signal line of the bus via the bus interface during execution of the instruction; and
the bus interface comprises a dedicated bit manipulation unit coupled between an input data bus and an output data bus, wherein the bit manipulation unit is adapted to receive an input value from the input data bus at an earlier stage of an instruction execution pipeline, perform a bit manipulation operation on the input value, and provide manipulated data to the output data bus at a later stage of the instruction execution pipeline.

16. The processor as recited in claim 15, wherein the user-defined address comprises a plurality of ordered bits, and wherein values of the bits are assigned by a user.

17. The processor as recited in claim 15, wherein the user-defined address is an address of an addressable register.

18. The processor as recited in claim 17, wherein the addressable register is accessed in response to the user-defined address.

19. The processor as recited in claim 15, wherein the processor is configured to provide the user-defined address, data corresponding to the user-defined address, and an asserted write control signal during execution of the instruction, and wherein the corresponding data is stored in the addressable register in response to the user-defined address, the corresponding data, and the asserted write control signal.

20. A data processing system, comprising:
a processor configured to execute an instruction comprising a user-defined address and to provide the user-defined address during execution of the instruction, wherein the processor comprises a bus interface having a dedicated bit manipulation unit coupled between an input bus and an output bus, wherein the bit manipulation unit is adapted to receive an input value from the input bus at an earlier stage of an instruction execution pipeline, perform a bit manipulation operation on the input value, and provide manipulated data to the output bus at a later stage of the instruction execution pipeline; and
a functional block comprising an addressable register, wherein the functional block is coupled to receive the user-defined address and configured to access the addressable register in response to the user-defined address.

21. The data processing system as recited in claim 20, wherein the functional block comprises a peripheral device, and wherein the peripheral device comprises the addressable register.

22. The data processing system as recited in claim 21, wherein the peripheral device comprises a timer, a serial port, or a parallel port.

23. The data processing system as recited in claim 21, wherein the addressable register is a control register, a status register, or a data register.

24. The data processing system as recited in claim 21, wherein the functional block comprises a data management unit coupled between the peripheral device and the processor and configured to receive read data from the peripheral device and to provide the read data to the processor.

25. The data processing system as recited in claim 21, wherein the peripheral device is configured to produce a first interrupt signal when in need of service, and wherein the functional block comprises an interrupt control unit coupled between the peripheral device and the processor and configured to receive the first interrupt signal from the peripheral device and to provide a second interrupt signal to the processor in response to the first interrupt signal.

26. The data processing system as recited in claim 25, wherein the first interrupt signal has a corresponding priority, and wherein the second interrupt signal comprises a value specifying the priority.

27. The data processing system as recited in claim 25, wherein the processor comprises a plurality of registers and logic for controlling the registers, wherein the logic is configured to operate the registers in response to the second interrupt signal such that in the event an interrupt request having a higher priority than an interrupt request currently being handled is received, an interrupt service routine of the interrupt request having the higher priority is completed before an interrupt service routine of the interrupt request currently being handled.

28. The data processing system as recited in claim 20, wherein the processor is configured to execute the instruction via an instruction execution pipeline comprising a plurality of pipeline stages performed in sequence.

29. The data processing system as recited in claim 28, wherein in the event the instruction specifies a read operation, the processor is configured to provide the user-defined address and an asserted read control signal during a first one of the pipeline stages, and to receive read data obtained from the addressable register during a second one of the pipeline stages.

30. The data processing system as recited in claim 29, wherein the bus interface is adapted for coupling to a bus having a plurality of signal lines, and wherein the processor is configured to drive the user-defined address and the asserted read control signal upon signal lines of the bus during the first one of the pipeline stages.

31. The data processing system as recited in claim 30, wherein the bus interface comprises stall logic adapted to receive a ready signal from the device and configured to assert a stall signal in the event the ready signal is not asserted during the second one of the pipeline stages, and wherein in response to the stall signal the instruction execution pipeline is stalled.

32. The data processing system as recited in claim 28, wherein in the event the instruction specifies a read-modify-write operation, the processor is configured to provide the user-defined address, an asserted read control signal, and an asserted write control signal during a first one of the pipeline stages, to receive data obtained from the addressable register as read data during a second one of the pipeline stages, to modify the data during a third one of the pipeline stages, and to provide the modified data as write data during a fourth one of the pipeline stages.

33. The data processing system as recited in claim 32, wherein the bus interface is adapted for coupling to a bus having a plurality of signal lines, and wherein the processor is configured to drive the user-defined address, the asserted read control signal, and the asserted write control signal upon signal lines of the bus during the first one of the pipeline stages, to receive the read data during the second one of the pipeline stages, and to drive the write data upon signal lines of the bus during the fourth one of the pipeline stages.

34. A method for obtaining an input value stored in an addressable register, comprising:

driving an address of the addressable register on a plurality of address signal lines of a bus, and an asserted read control signal on a read control signal line of the bus, during a first stage of an instruction execution pipeline; and receiving the input value via a plurality of input data signal lines of the bus when a corresponding ready signal driven on a ready signal line of the bus is asserted during a second stage of the instruction execution pipeline subsequent to the first stage, and performing a bit manipulation operation on the input value using a dedicated bit manipulation unit coupled between the input data signal lines and an output bus, wherein the bit manipulation unit is adapted to receive an input value from the input data signal lines at an earlier stage of the instruction execution pipeline, perform a bit manipulation operation on the input value, and provide manipulated data to the output bus at a later stage of the instruction execution pipeline.

35. The method as recited in claim 34 wherein a time period between the first and second stages of the instruction execution pipeline is extended in the event of a stall condition.

36. A method for storing a value in an addressable register, comprising:

driving an address of the addressable register on a plurality of address signal lines of a bus, and an asserted write control signal on a write control signal line of the bus, during a first stage of an instruction execution pipeline; and driving the value to be stored in the addressable register on a plurality of output data signal lines of the bus, and an asserted ready signal on a ready signal line of the bus, during a second stage of the instruction execution pipeline subsequent to the first stage, wherein, prior to the driving of the value, a bit manipulation operation is performed on the value using a dedicated bit manipulation unit coupled between input data signal lines and the output data signal lines, wherein the bit manipulation unit is adapted to receive an input value from the input data signal lines at an earlier stage of the instruction execution pipeline, perform a bit manipulation operations on the input value, and provide manipulated data to the output bus at a later stage of the instruction execution pipeline.

37. The method as recited in claim 36 wherein a time period between the first and second stages of the instruction execution pipeline is extended in the event of a stall condition.

38. A method for storing a value in an addressable register, comprising:

receiving an address driven on a plurality of address signal lines of a bus when a write control signal driven on a write control signal line of the bus is asserted during a first stage of an instruction execution pipeline;

if the address is an address of the addressable register, receiving the value via a first plurality of data signal lines of the bus when a corresponding ready signal driven on a ready signal line of the peripheral bus is asserted during a second stage of the instruction execution pipeline subsequent to the first stage, wherein the value is generated by a dedicated bit manipulation unit of a processor coupled between the first plurality of data signal lines and a second plurality of data signal lines, wherein the dedicated bit manipulation unit is adapted to receive an input value from the second plurality of data signal lines at an earlier stage of an instruction execution pipeline, perform a bit manipulation operation on the input value, and provide manipulated data to the first plurality of data signal lines at a later stage of the instruction execution pipeline; and storing the value in the addressable register.

39. A method for modifying a value stored in an addressable register, comprising:

driving an address of the addressable register on a plurality of address signal lines of a bus, an asserted read control signal on a read control signal line of the bus, and an asserted write control signal on a write control signal line of the bus during a first stage of an instruction execution pipeline;

receiving the value via a first plurality of data signal lines of the bus when a corresponding ready signal driven on a ready signal line of the bus is asserted during a second stage of the instruction execution pipeline subsequent to the first stage; modifying the value during a third stage of the instruction execution pipeline subsequent to the second stage;

modifying the value during a third stage of the instruction execution pipeline subsequent to the second stage; and driving the modified value on a second plurality of data signal lines of the bus, and an asserted ready signal on a ready signal line of the bus, during a fourth stage of the instruction execution pipeline subsequent to the third stage, wherein the modification is performed by a dedicated bit manipulation unit coupled between the first plurality of input data signal lines and the second plurality of data signal lines, wherein the dedicated bit manipulation unit is adapted to receive an input value from the first plurality of data signal lines at an earlier stage of the instruction execution pipeline, perform a bit manipulation operation on the input value, and provide manipulated data to the second plurality of data signal lines at a later stage of the instruction execution pipeline.

40. The method as recited in claim 39 wherein a time period between the first and second stages of the instruction execution pipeline is extended in the event of a stall condition.

41. The method as recited in claim 39 wherein a time period between the third and fourth stages of the instruction execution pipeline is extended in the event of a stall condition.

* * * * *